US011667482B2

(12) United States Patent
Kobayashi et al.

(10) Patent No.: US 11,667,482 B2
(45) Date of Patent: Jun. 6, 2023

(54) CONSOLIDATED TRANSPORTATION METHOD AND CONSOLIDATION TERMINAL

(71) Applicant: TOSHIBA DIGITAL SOLUTIONS CORPORATION, Kawasaki (JP)

(72) Inventors: Megumi Kobayashi, Kodaira (JP); Yasuto Hatafuku, Kawasaki (JP); Hideo Ando, Hino (JP); Hideki Kubo, Fuchu (JP); Motokazu Iwasaki, Chiba (JP); Yoko Ikeda, Bunkyo (JP); Shinsuke Iuchi, Yokohama (JP); Tatsuki Shiraishi, Tama (JP); Kiyoshi Takemoto, Setagaya (JP); Kaori Kitami, Kunitachi (JP); Keishi Higashi, Hino (JP); Michiyo Sato, Yokohama (JP); Masaru Watabiki, Yokohama (JP)

(73) Assignee: TOSHIBA DIGITAL SOLUTIONS CORPORATION, Kawasaki (JP)

( * ) Notice: Subject to any disclaimer, the term of this patent is extended or adjusted under 35 U.S.C. 154(b) by 122 days.

(21) Appl. No.: 17/026,466

(22) Filed: Sep. 21, 2020

(65) Prior Publication Data
US 2021/0002088 A1    Jan. 7, 2021

Related U.S. Application Data

(63) Continuation of application No. PCT/JP2019/011896, filed on Mar. 20, 2019.

(30) Foreign Application Priority Data

Mar. 22, 2018    (JP) .............................. JP2018-054991

(51) Int. Cl.
*B65G 61/00*    (2006.01)
*G06Q 50/30*    (2012.01)

(52) U.S. Cl.
CPC ............. *B65G 61/00* (2013.01); *G06Q 50/30* (2013.01)

(58) Field of Classification Search
None
See application file for complete search history.

(56) References Cited

U.S. PATENT DOCUMENTS 6,539,360 B1    3/2003   Kadaba
10,824,982 B1*  11/2020  Whitehouse ....... G06Q 10/0832
(Continued)

FOREIGN PATENT DOCUMENTS

| CN | 106628693 A | 5/2017 |
| JP | 5973837 B2 | 8/2016 |
| JP | 2019-101868 A | 6/2019 |

OTHER PUBLICATIONS

Cheng, "Logistics Transport Management", Shanghai Fiscal University Press, Mar. 31, 2016, pp. 115-120 (with unedited computer generated English translation).

*Primary Examiner* — William R Harp
(74) *Attorney, Agent, or Firm* — Maier & Maier, PLLC

(57) ABSTRACT

According to one embodiment, a consolidated transportation method arranges a plurality of baggage in a same transportation area and performs transportation. A consolidation determination item is defined. A first baggage corresponding to an easily transferred baggage item in the consolidation determination item is arranged in a first transportation area and transported. A second baggage corresponding to a highly sensitive baggage item in the consolidation determination item is arranged in a second transportation area and transported. A first transporter includes the first transportation area. A second transporter includes the second transportation area. The first transportation area and the second transportation area are physically separated.

4 Claims, 32 Drawing Sheets

(56) References Cited

U.S. PATENT DOCUMENTS

2014/0207701 A1\* 7/2014 Kadaba ............ G06Q 10/06316
705/333
2015/0379468 A1\* 12/2015 Harvey ............ G06Q 10/08355
705/338

\* cited by examiner

Consolidation determination item list

| Item classification | Individual consolidation determination items JITM |
|---|---|
| Properties and attributes transfer ATR | Smell transfers SML |
| | Heat (temperature) propagates HET |
| | Colors transfer CLR ··· when in contact due to vibration at transportation |
| | Tastes transfer TST ··· when in contact due the vibration at transportation |
| Mediation of fine movable body MOV | Radioactive materials (radioactivity) RAD |
| | Fine particles (glass dust (asbestos, etc.), garbage, dust, etc.) PAR |
| | Viruses VRS |
| | Microorganisms (bacteria, mold fungus, Trichophyton fungus, Escherichia coli, etc.) MCB |
| | Insects (ticks, ants, etc.) INS |
| | Others OTH |

F I G. 5

(a) Consolidation determination item examples

| Consolidation determination items JITM | Easily transferred baggage items TOUT | Highly sensitive baggage items TIN |
|---|---|---|
| Smell transfers SML | Hydraulically operated machine | Clothes (including underwear), food packaging members |
| Heat (temperature) propagates HET | Oxidation heating element (such as iron powder) may be broken due to vibration during transportation or contact with adjacent baggage | Chocolate (including wrapping part) |

⇨

Combination example 1 of consolidation in transportation vehicle (b)

| Transportation vehicle A_6 | Transportation vehicle B_8 |
|---|---|
| Hydraulically operated machine, Oxidation heating element (such as iron powder) | Clothes (including underwear), Chocolate |

Combination example 2 of consolidation in transportation vehicle (c)

| Transportation vehicle A_6 | Transportation vehicle B_8 | Transportation vehicle C_10 |
|---|---|---|
| Hydraulically operated machine | Oxidation heating element (such as iron powder), Clothes (including underwear) | Chocolate (including wrapping part) |

F I G. 6

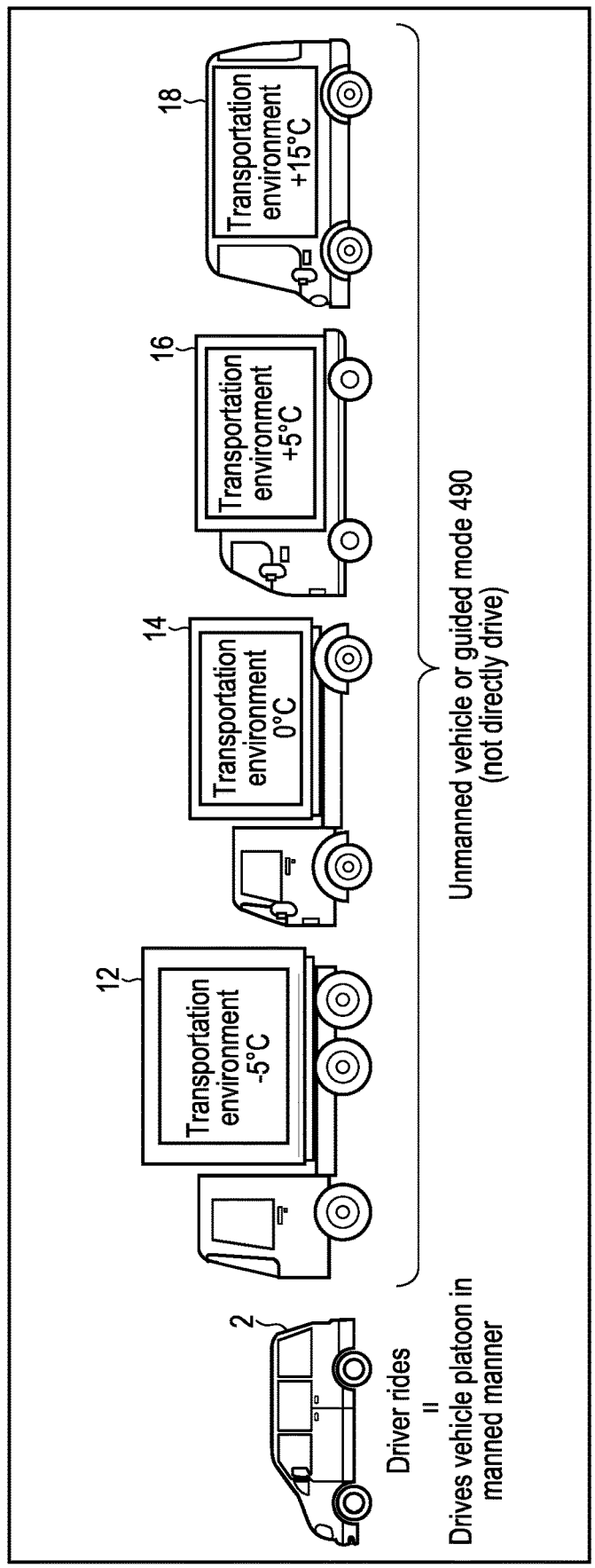
F I G. 11

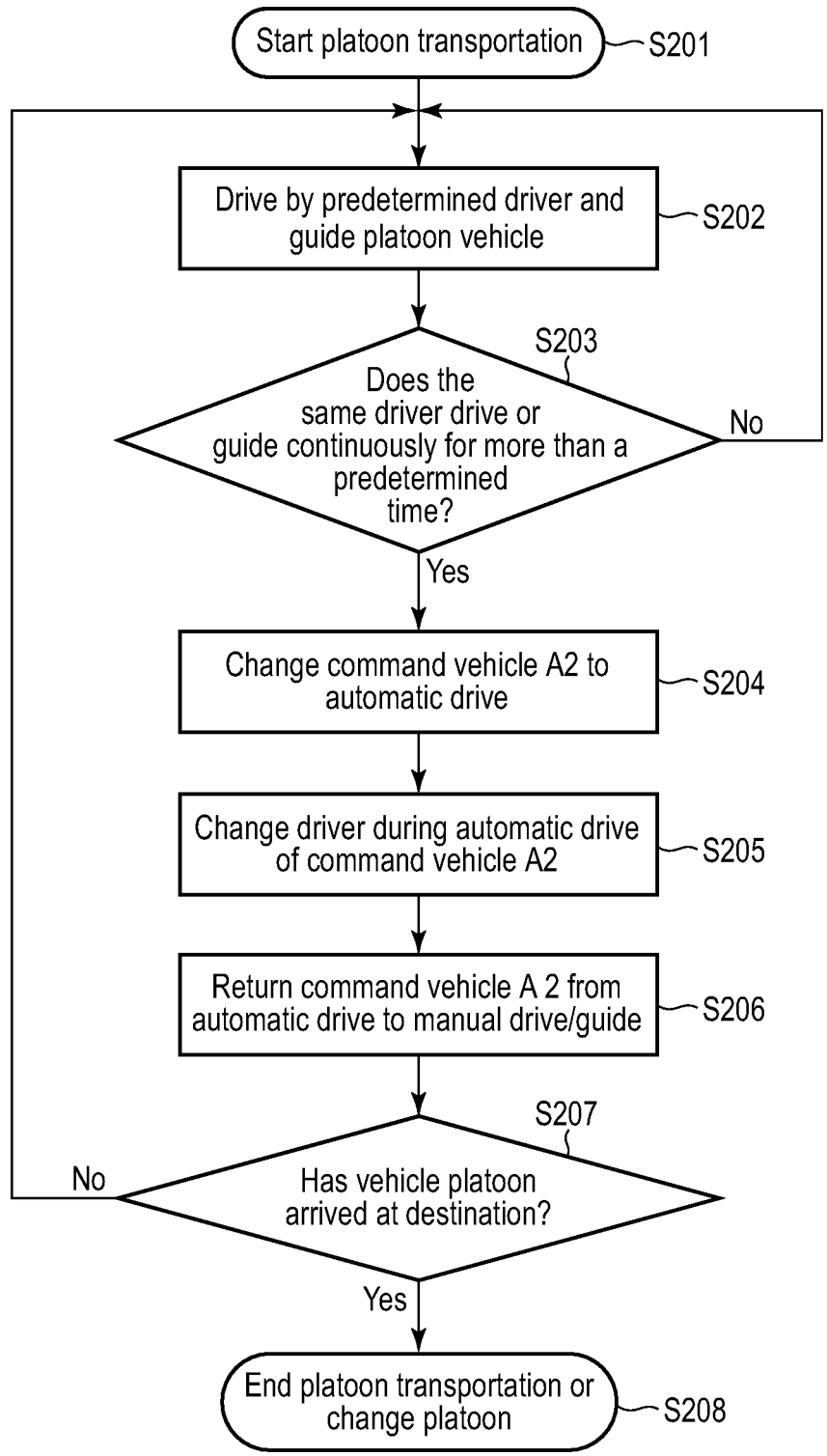
F I G. 12

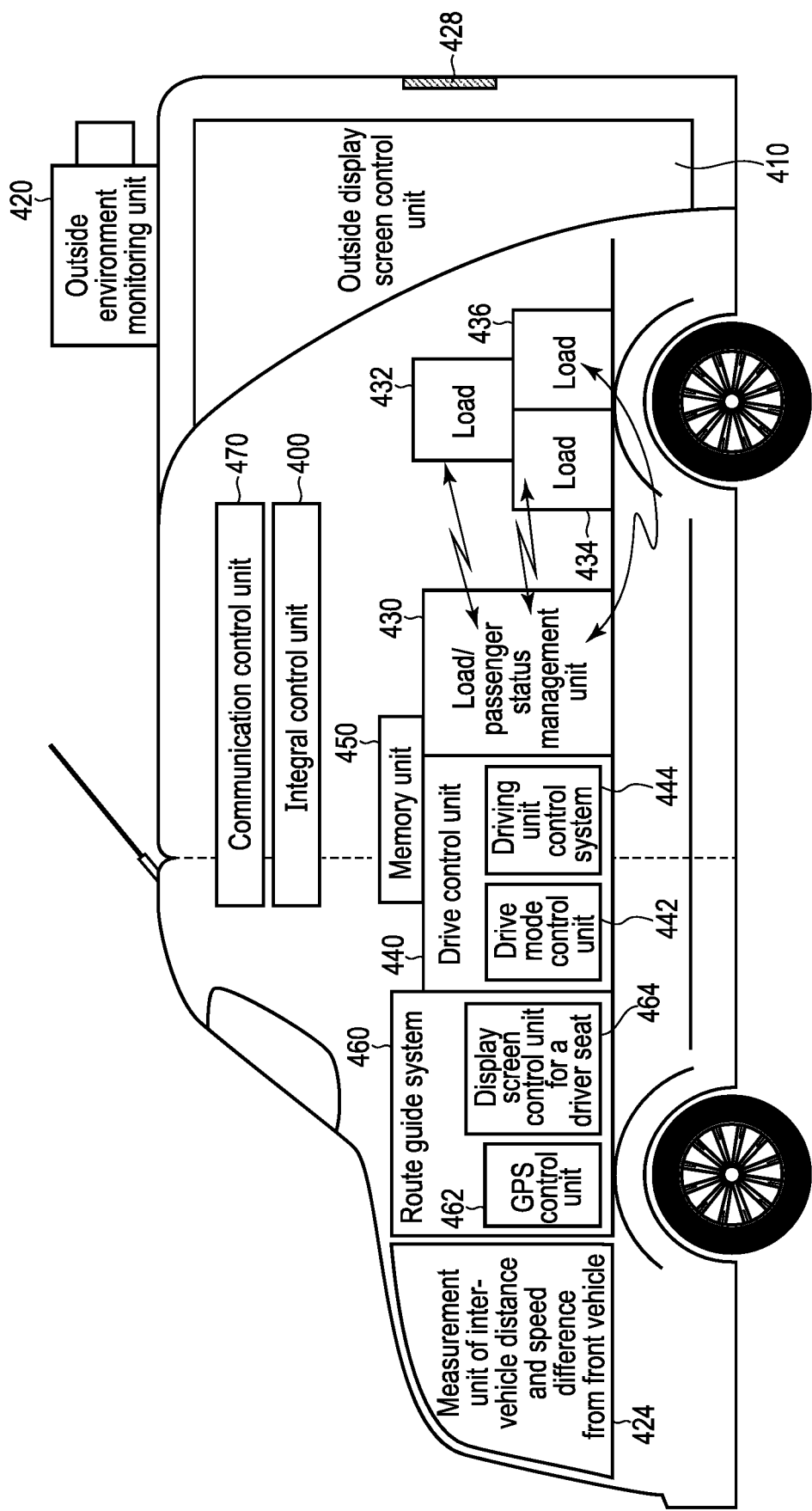
F I G. 14

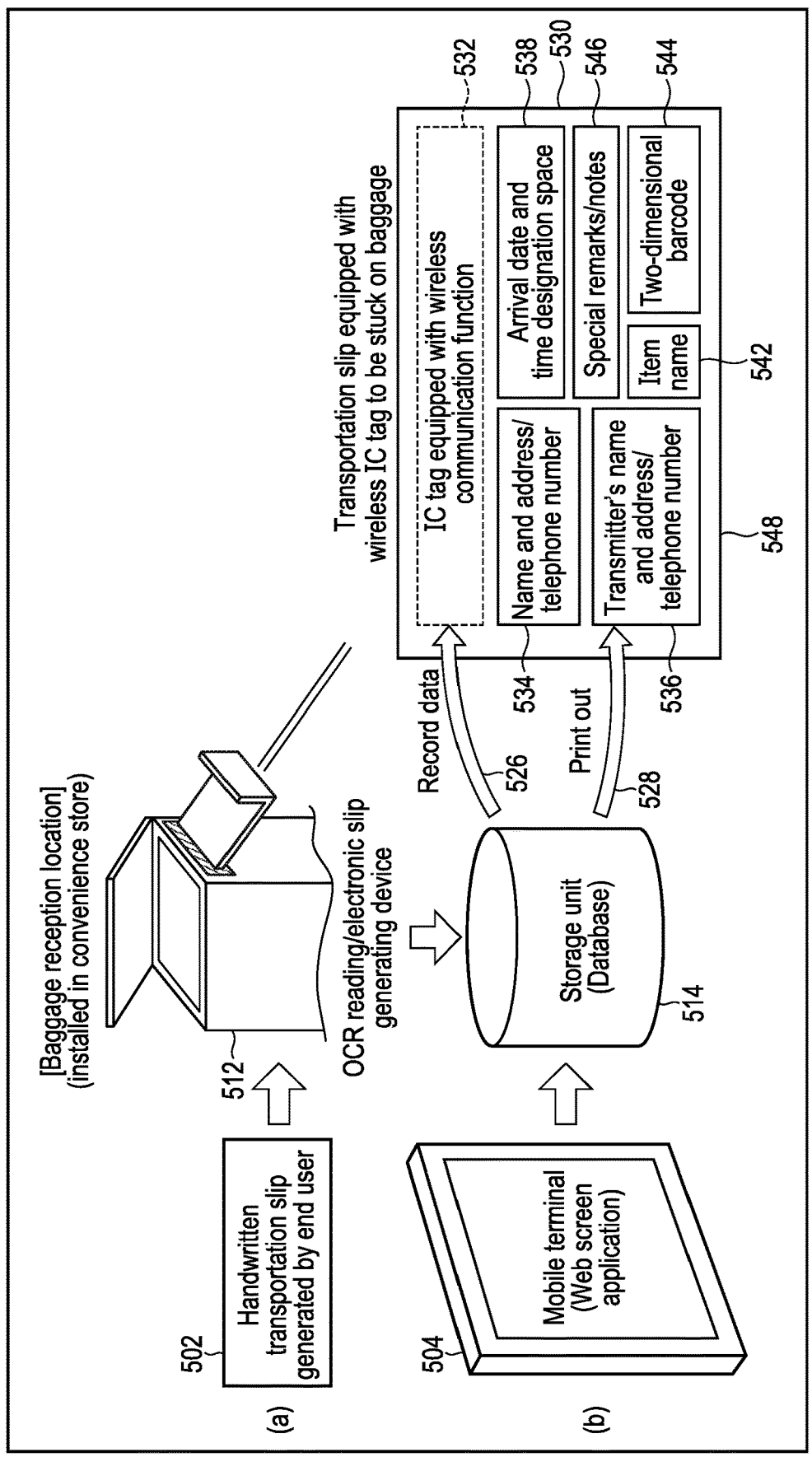
F I G. 15

F.I.G. 16

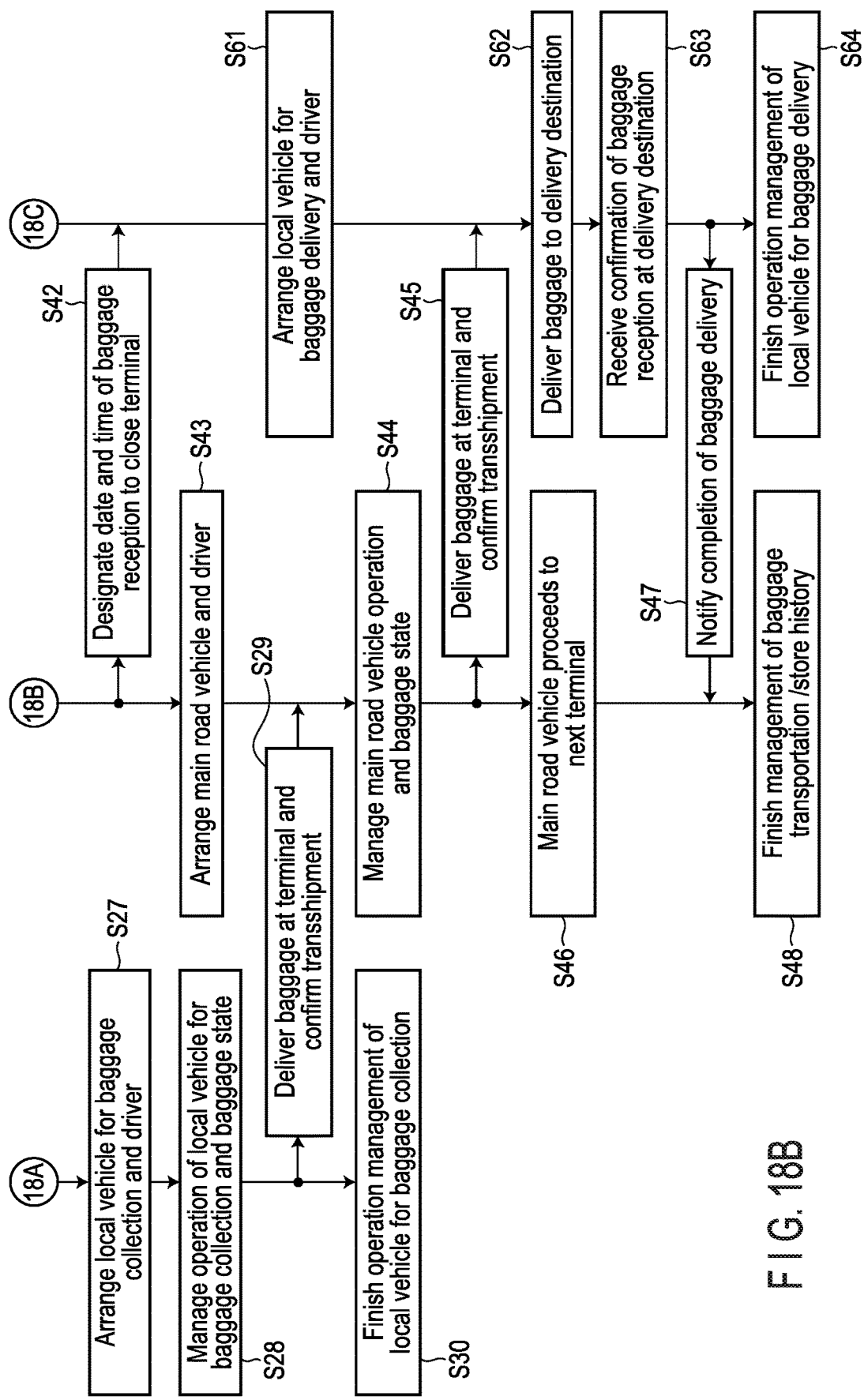
F I G. 18B

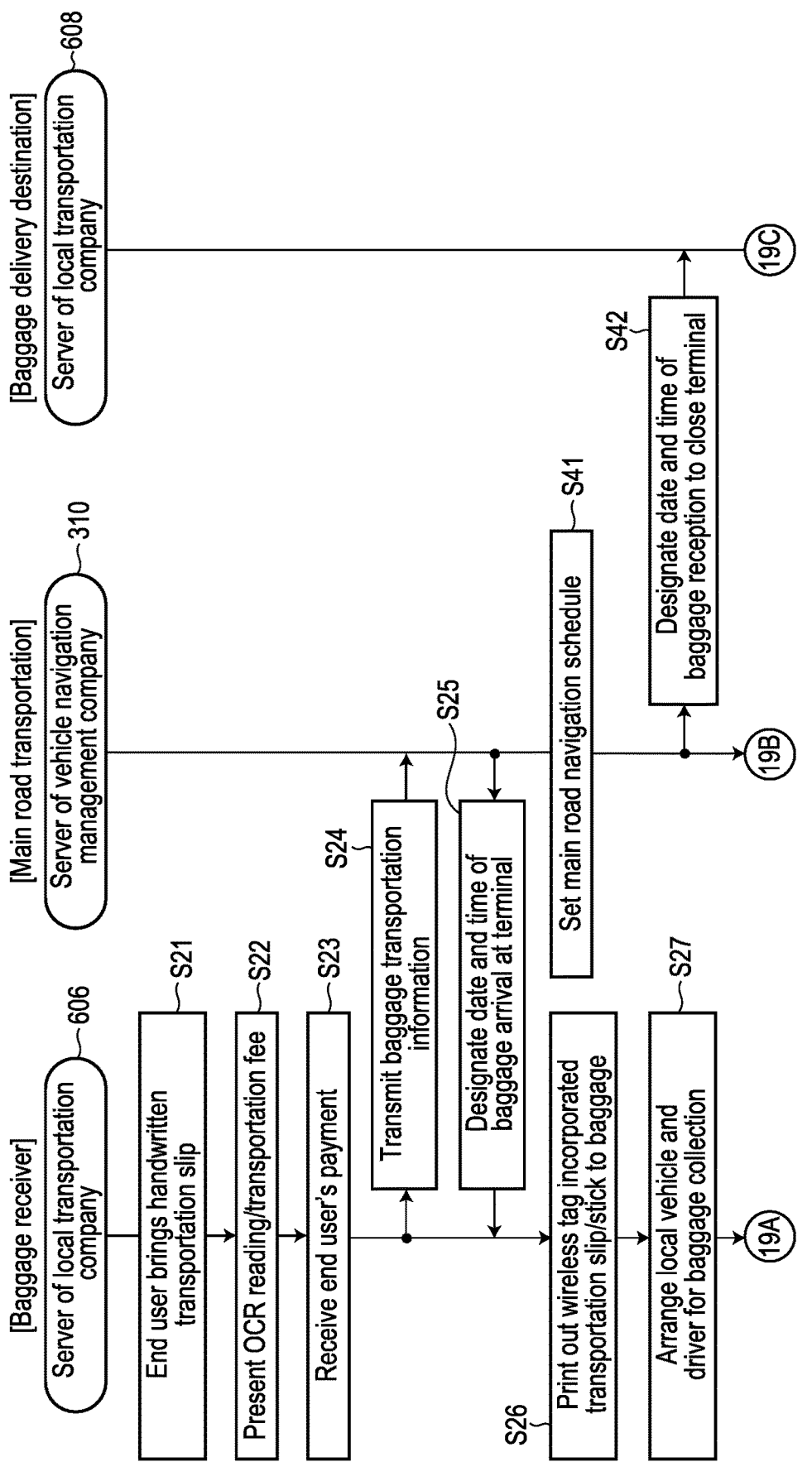
F I G. 19A

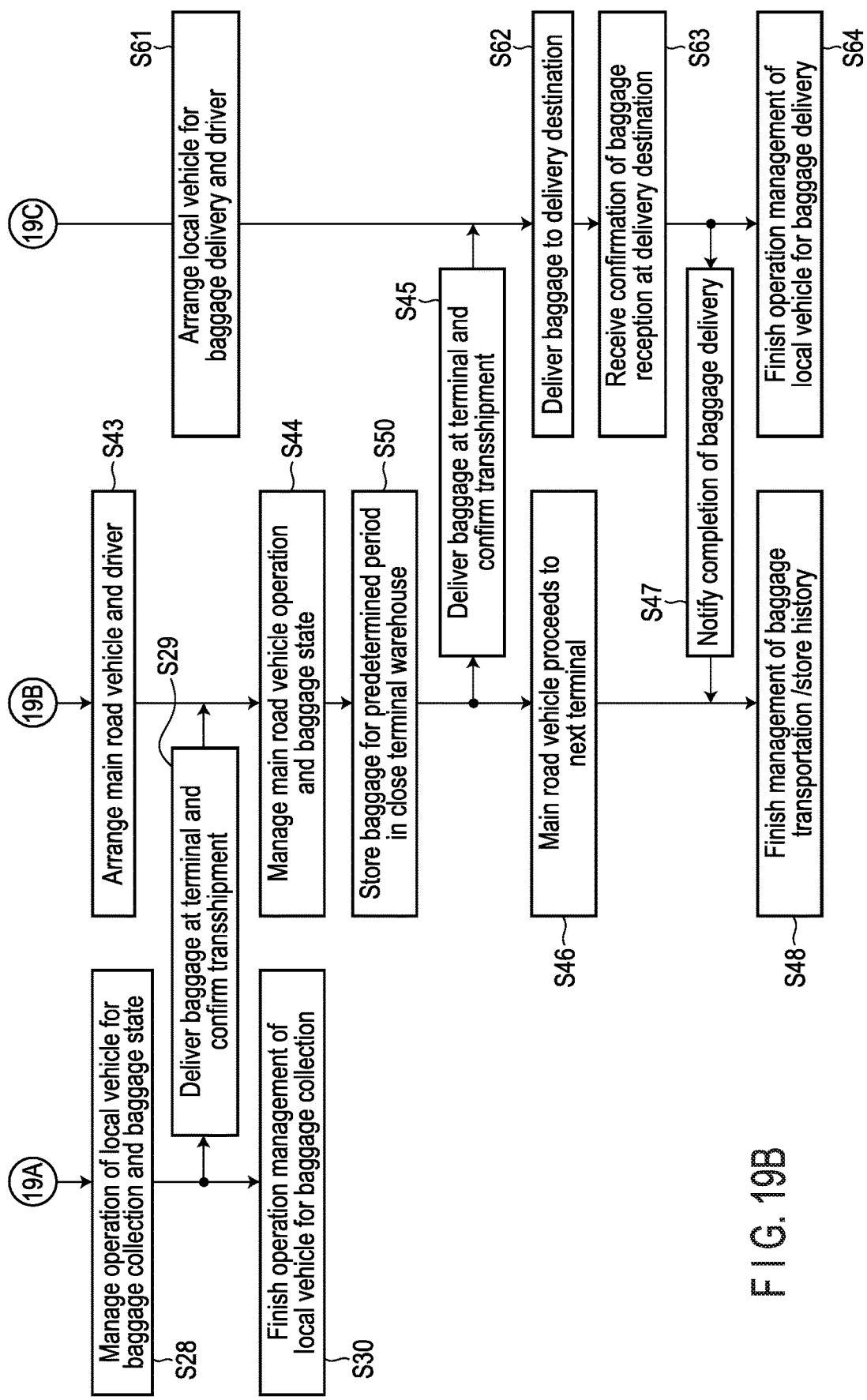
F I G. 19B

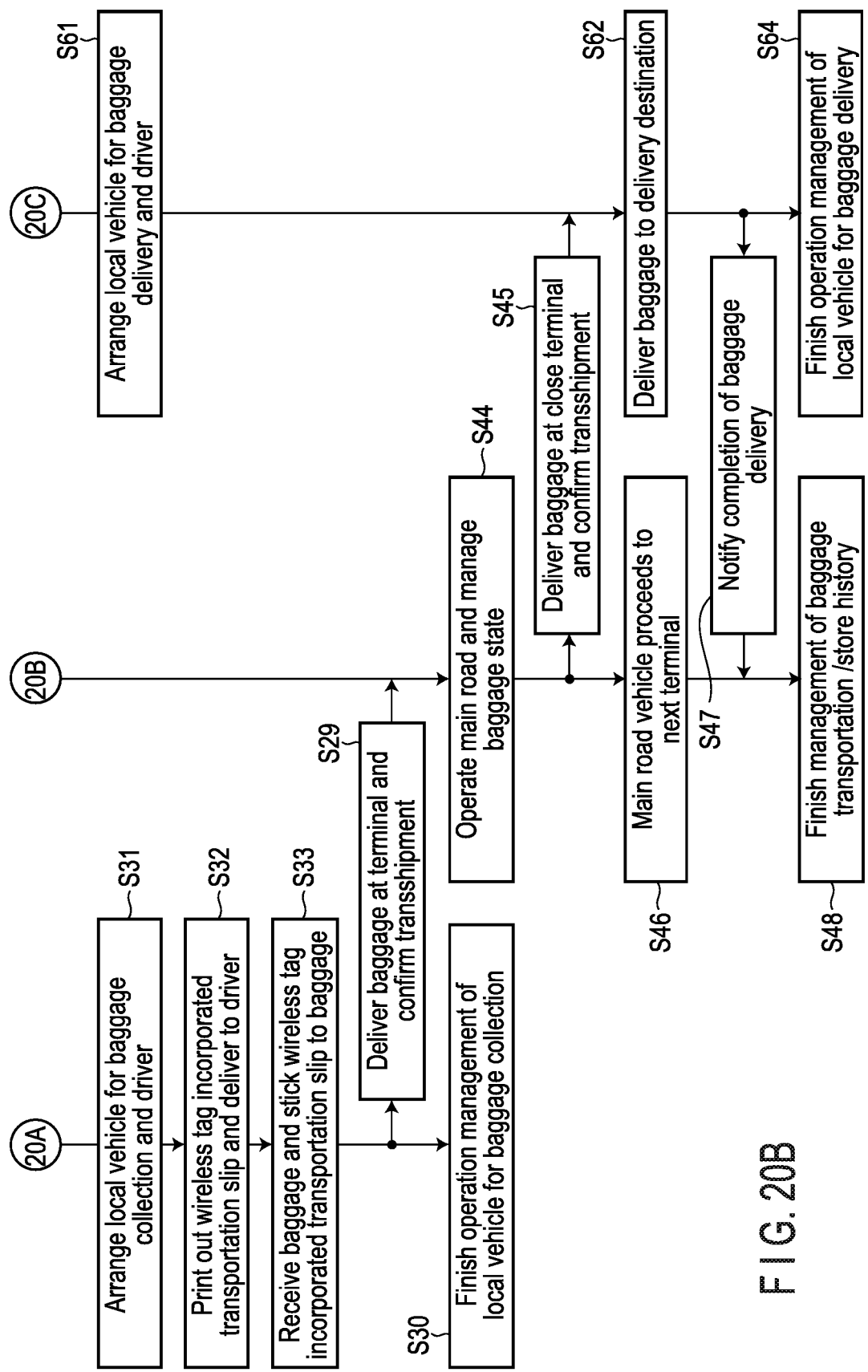
F I G. 20B

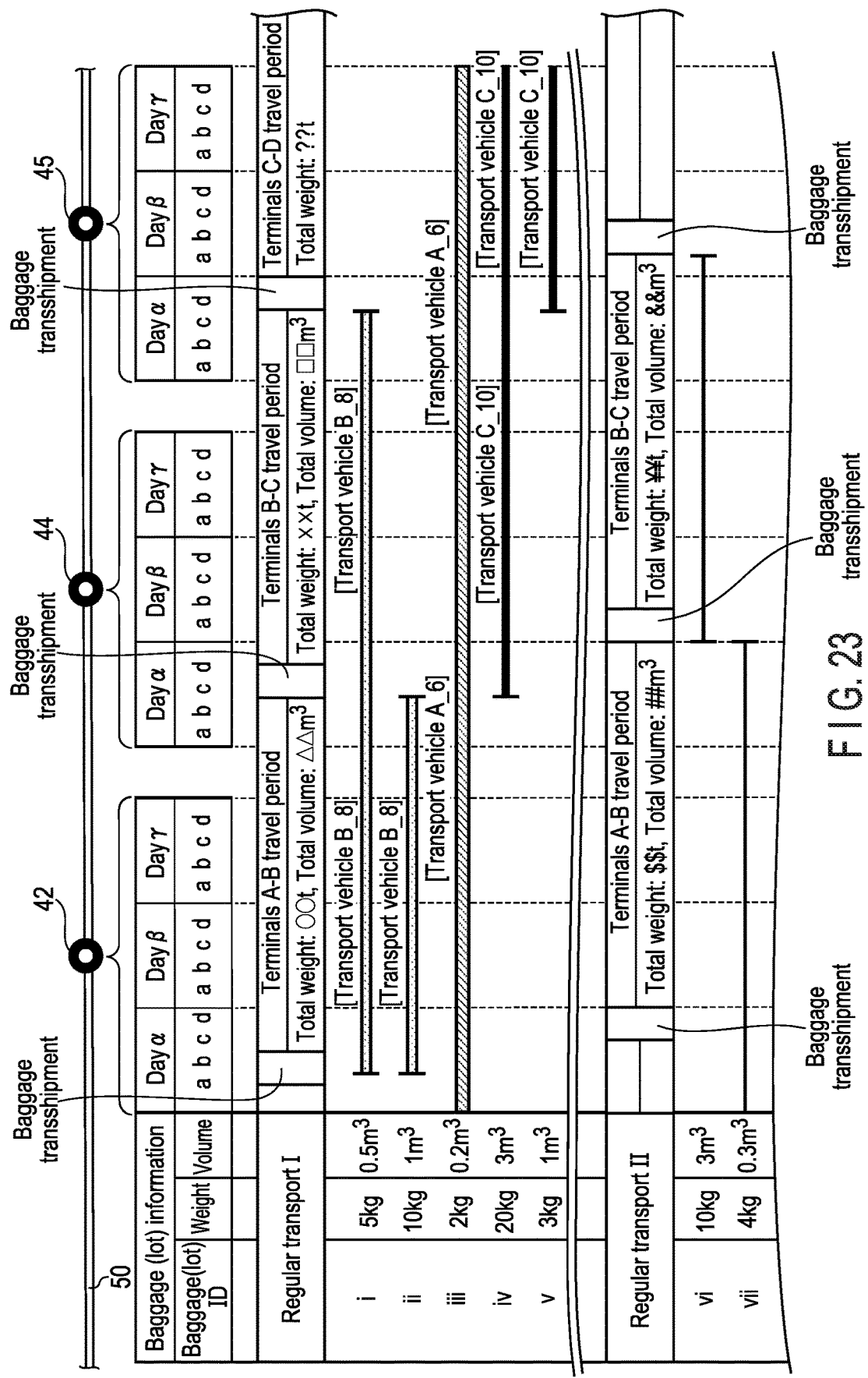
F I G. 23

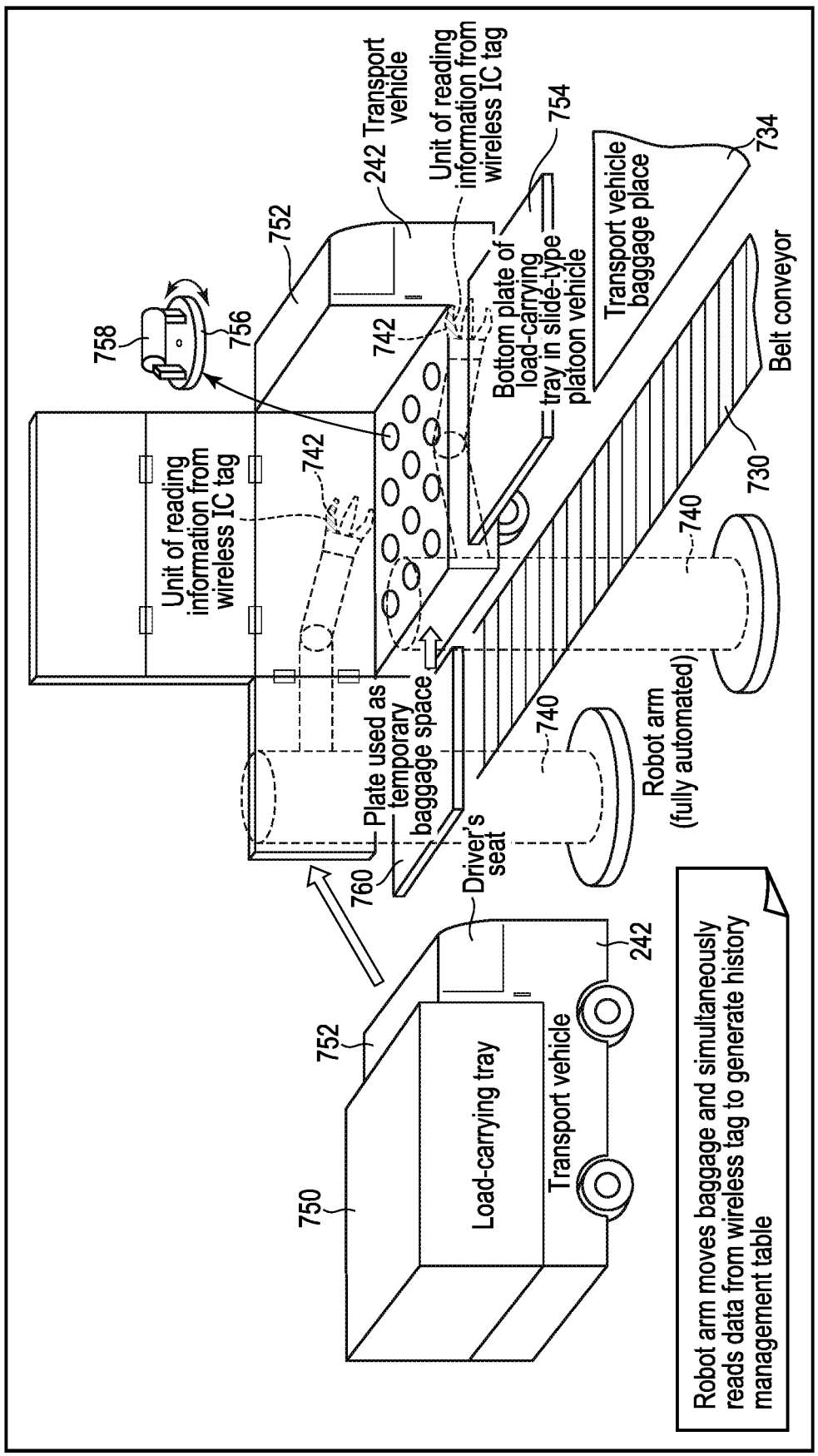
F I G. 26

|  |  | i | ii | iii | iv | v |
|---|---|---|---|---|---|---|
| 770 | ID of each baggage (lot) |  |  |  |  |  |
| Baggage (or lot) information | Weight(kg) | 5 | 10 | 2 | 20 | 3 |
|  | Volume(m³) | 0.5 | 1 | 0.2 | 3 | 1 |
|  | Attribute |  |  | Fragile |  |  |
|  | Possibility of loading on upper part | YES | YES | NO | YES | NO |
| 780-1 Terminal A transshipment history | Arrival date and time | Day α, 10 o'clock | Day α, 9 o'clock | Day α, 10 o'clock |  |  |
|  | Delivery confirmer | TOSHIBA Taro | TOSHIBA Taro | TOSHIBA Taro |  |  |
|  | Departure date and time | Day α, 13 o'clock | Day α, 13 o'clock | Day α, 13 o'clock |  |  |
|  | Load confirmer | TOSHIBA Taro | TOSHIBA Taro | TOSHIBA Taro |  |  |
| 780-2 Terminal B transshipment history | Arrival date and time | Day α, 17 o'clock | Day α, 17 o'clock | Day α, 17 o'clock | Day α, 15 o'clock |  |
|  | Delivery confirmer | KOYAMA Hayata | NIHON Kazuo | KOYAMA Hayata | KOYAMA Hayata |  |
|  | Departure date and time | Day α, 18 o'clock | Day α, 21 o'clock | Day α, 18 o'clock | Day α, 18 o'clock |  |
|  | Load confirmer | NANTO Yuji | KOYAMA Hayata | NANTO Yuji | NANTO Yuji |  |

F I G. 27

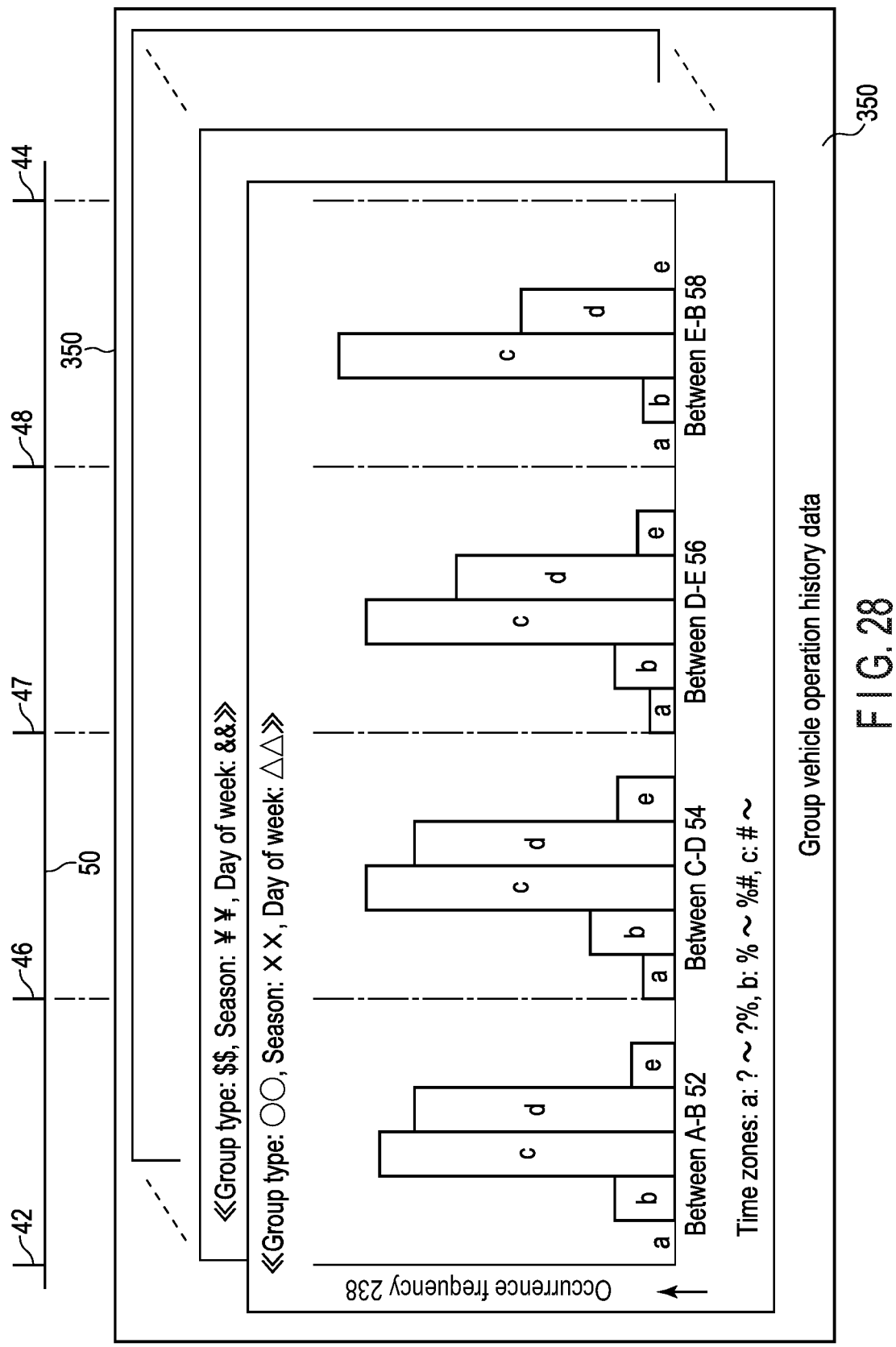
F I G. 28

CONSOLIDATED TRANSPORTATION METHOD AND CONSOLIDATION TERMINAL

CROSS-REFERENCE TO RELATED APPLICATIONS

This application is a Continuation Application of PCT Application No. PCT/JP2019/011896, filed Mar. 20, 2019 and based upon and claiming the benefit of priority from Japanese Patent Application No. 2018-054991, filed Mar. 22, 2018, the entire contents of all of which are incorporated herein by reference.

FIELD

Embodiments described herein relate generally to a consolidated transportation method and consolidation terminal.

BACKGROUND

For example, when a plurality of packages are transported by transporter such as ships, vehicles (trucks, trains, etc.), airplanes, etc., consolidated transportation of the plurality of packages in can be efficiently carried out when a plurality of packages are consolidated and transported in a transportation area (container) of the transporter enables the transportation with good efficiency. When the consolidated transportation is performed in a long distance, the plurality of packages are maintained in the same transportation environment for a long time. For this reason, particularly in the long-distance transportation, the transportation environment at the consolidation is important.

When perishable foods are transported in a long distance, refrigerator cars are often used. Then, when perishable foods are transported in a frozen storage environment, an effect of preventing corrosion of perishables can be obtained. Thus, the consolidated transportation methods according to the characteristics of the packages are improved.

In addition, baggage collection places or terminals where baggage is transshipped are often used at the start or end location of the consolidated transportation. In addition, to efficiently carry out the baggage transshipment work, structures inside the baggage collection places and terminals are improved.

According to a consolidated transportation method disclosed in JP 5973837 B, baggage having a heavy weight and baggage having a light weight are consolidated in the same delivery truck, based on a database. Efficient consolidated transportation can be performed by this method.

In the above method, however, providing a transportation environment adapted to the characteristics of the consolidated baggage is difficult. For example, consolidating an industrial machine which smells oily (e.g., a hydraulically driven movable machine or the like) as the baggage having a heavy weight and underwear, vegetables, etc., capable of easily absorbing odors as the baggage having a light weight will be considered. When consolidated and transported over a long distance, there is a risk that an oily odor may transfer to the baggage having a heavy weight since both of them are held in an enclosed space for a long time.

BRIEF DESCRIPTION OF THE DRAWINGS

FIG. 5 is a table showing an example of a consolidation determination item list used in the system of the present embodiment.

FIG. 6 is a table showing an example of a relationship in combination which allows consolidation with easily movable packages and highly sensitive packages registered in the consolidated determination items.

FIG. 11 is an explanatory view showing a method capable of inexpensive transportation while maintaining an optimum transportation environment.

FIG. 12 is a flowchart showing a method capable of long-distance transportation while maintaining an optimum transportation environment.

FIG. 14 is a diagram showing an example of a cooperatively driving vehicle used in the present vehicle group operation system.

FIG. 15 is a diagram showing an example of progress from an end user's package transportation application to issuing a transport slip.

FIG. 18B is an explanatory view showing a processing method in a case where an end user directly carries a package along with a handwritten transport slip (FIG. 2).

FIG. 19A is an explanatory view showing a processing method in a case where a baggage arrival date and time is designated in a handwritten transport slip carried by an end user together with a package (FIG. 1).

FIG. 19B is an explanatory view showing a processing method in a case where a baggage arrival date and time is designated in a handwritten transport slip carried by an end user together with a package (FIG. 2).

FIG. 20B is a first diagram showing a processing method including a baggage receiving service on a Web.

FIG. 23 is an explanatory view showing a temporary vehicle allocation plan displaying method after determining the consolidation and calculating the combination capable of consolidation.

FIG. 26 is a view showing an example of a structure on the periphery of a load-carrying tray of a platoon vehicle which facilitates the baggage transshipment.

FIG. 27 is a table showing an example of transport history check list for each package (or each lot).

FIG. 28 is an explanatory view showing an example in the operation history data of the grouped vehicle.

DETAILED DESCRIPTION

Embodiments will be described hereinafter with reference to the accompanying drawings.

In general, according to one embodiment, a consolidated transportation method arranges a plurality of pieces of baggage in a same transportation area and performs transportation. A consolidation determination item is defined. A first piece of the baggage corresponding to an easily transferred baggage item in the consolidation determination item is arranged in a first transportation area and transported. A second piece of the baggage corresponding to a highly sensitive baggage item in the consolidation determination item is arranged in a second transportation area and transported. A first transporter includes the first transportation area. A second transporter includes the second transportation area. The first transportation area and the second transportation area are physically separated.

A method (embodiment) of preventing a predetermined characteristic and attribute or a minute movable body from moving across baggage (or lot) in the consolidated transportation performed by arranging a plurality of packages (or a plurality of lots) in a predetermined transportation area (container) will be described below.

Figure 1:
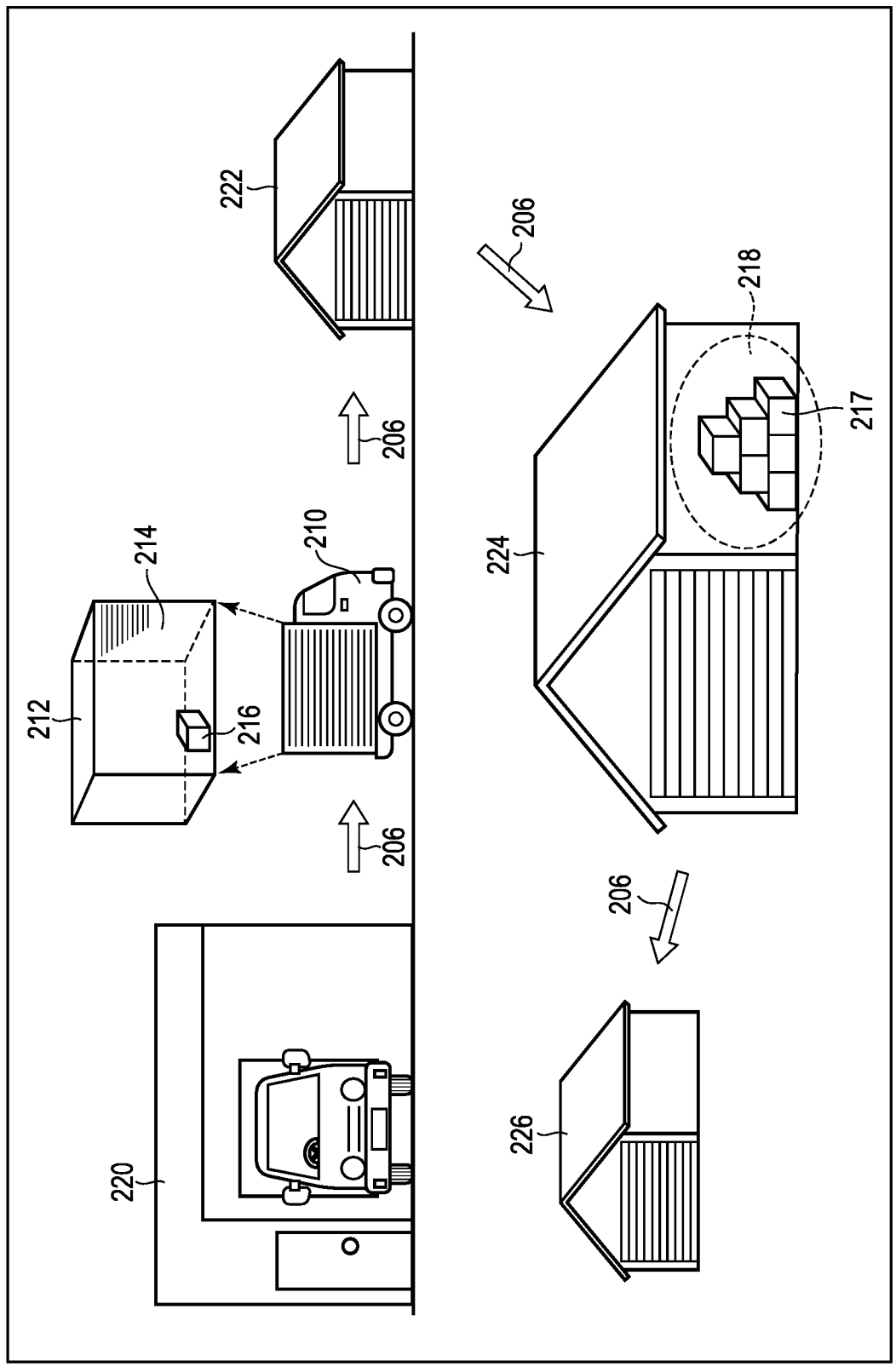
FIG. 1 is a diagram showing an example of a relationship between the transportation area and transportation environment and the baggage.

In advance, terms to be used in the following descriptions will be defined with reference to FIG. 1 to FIG. 3. As shown in FIG. 1, a means comprising a transportation area (container) 212 and being capable of moving by itself is referred to as a transporter (transport vehicle) 210. The transporter (transport vehicle) 210 implies a bicycle, a motorcycle, a vehicle, a bus, a truck, a special vehicle, or the like. This special vehicle may imply a military vehicle such as a military truck and a tank, and an emergency vehicle such as a police patrol car, an ambulance, and a fire engine. Therefore, a means moving by work of an external force, such as a basket, a bucket and a cart, is excluded from objects of the transporter (transport vehicle) 210.

Baggage 216, a lot 218, a living thing such as an animal or a plant or the like is transported in the form of being arranged (held) in the transportation area (container) 212 of the transporter (transport vehicle) 210.

A divisible minimum unit of the object to be transshipped inside or outside the transportation area (container) 212 is referred to as the baggage 216. The present embodiment is not limited thereto, but a predetermined packaging unit may also be referred to as the baggage 216.

In contrast, an assembly composed of one or more packages 217 is referred to as the lot 218. Then, as for a plurality of packages 217 constituting the same lot 218, transportation routes A 202 (to be described later with reference to FIG. 3) correspond in many cases. That is, as for at least a part of the plurality of packages 217 constituting the same lot 218, the destination of reception corresponds to the destination of delivery.

However, the present embodiment is not limited to this, but a handling unit of (one or more) packages handled by the same (transport) agent during transportation may also be defined as the lot 218. Alternatively, a lot 218 may also be defined as a generic name of (one or more) packages handled by the same (transport) agent during transportation. In this case, the lot 218 differs for each transport agent.

A number of packages 217 constituting the same lot 218 may be transported in the same transportation area (container) 212. In addition, a portion of the plurality of packages 217 constituting the same lot 218 may be distributed and transported between different transportation areas (containers) 212 of different transporter (transport vehicles) 210.

In contrast, when the total volume (and total weight) of the lot 218 is relatively small, a plurality of lots different from each other may be placed together and arranged in the same transportation area (container) 212 and transported (consolidated).

In the present embodiment, the environment inside the transportation area (container) 212 is referred to as a transportation environment 214. Examples of the controllable attribute in the transportation environment 214 include temperature, humidity, atmospheric pressure, air flow, air composition ratio (e.g., an environment in a nitrogen atmosphere or of high oxygen concentration), and the like. For example, when the transport vehicle 210 is a refrigerator car or a freezer car, the transportation environment 214 is controlled (to maintain a low temperature). In general, however, the transportation environment 214 in the same transportation area (container) 212 does not need to be uniform and, for example, the temperature gradient in the same transportation area (container) 212 is permitted.

The transportation area (container) 212 in the present embodiment does not need to be an airtight space. For example, in a flatbed truck 240 of FIG. 2, a transportation area (container) 212 is exposed to the outside, and parts of baggage 216 and lot 218 hit an external wind while transported.

A form in which a plurality of different pieces of baggage 216 (or different lots 218) are transported in a manner of being provided together (arranged or held) in the same transportation area (container) 212 is referred to as consolidated transportation.

An example of occurrence of the consolidated transportation is shown in FIG. 1. FIG. 1 shows an example of a drive route 206 through which a transport vehicle (transport vehicle) 210 passes. The transporter (transport vehicle) 210 leaves at a departure point 220 and repeats transsshipment of the baggage 216 (or lot 218) at a plurality of concentrated baggage collection places 222, 224, and 226. In this process, a plurality of different pieces of baggage 216 (or different lots 218) are provided together (arranged or held) in the transportation area (container) 212.

Figure 2:
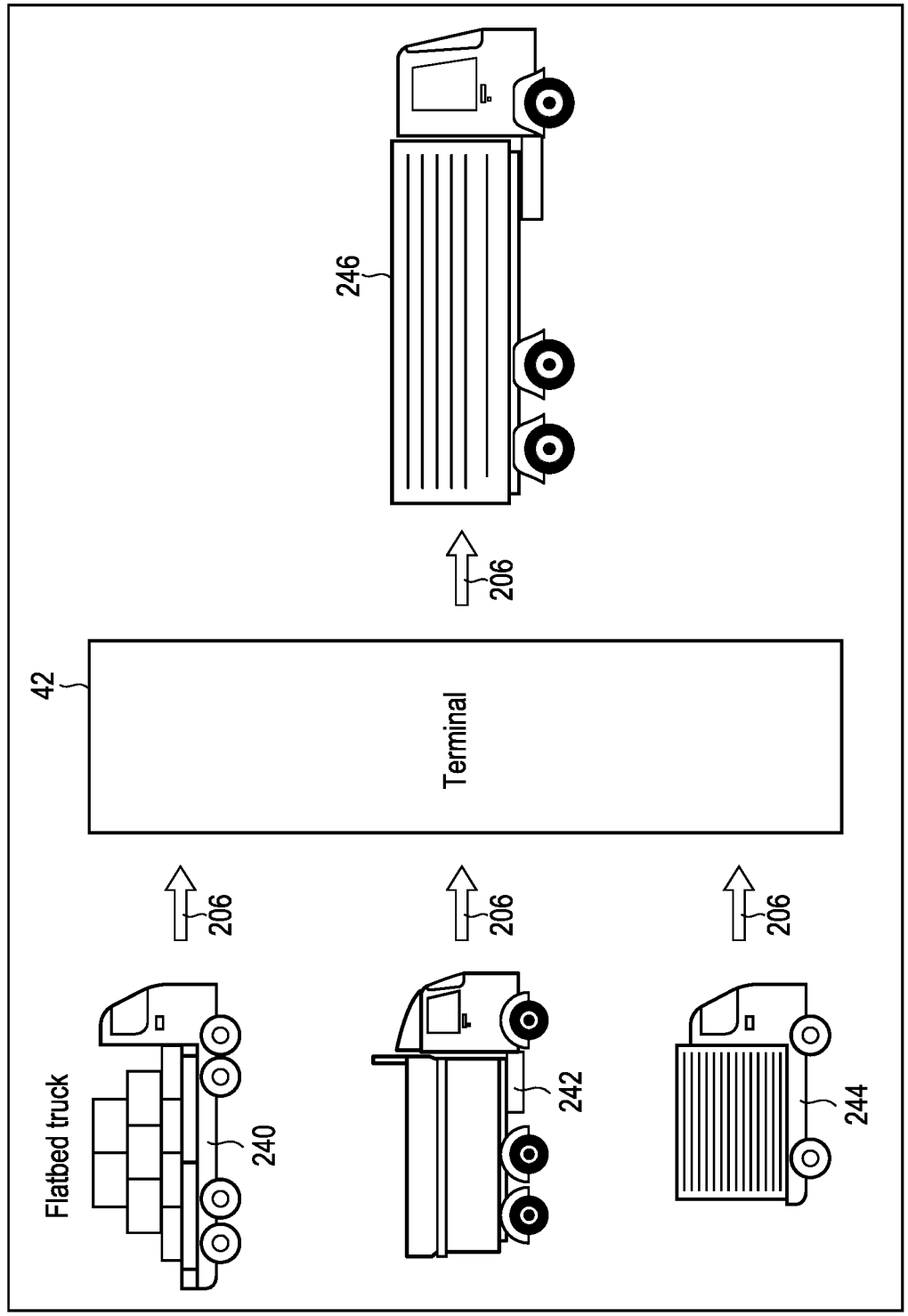
FIG. 2 is a diagram showing another example of a consolidated transportation scene.

Another example of occurrence of the consolidated transportation is shown in FIG. 2. For example, not only baggage loaded on the flatbed truck 240, but also baggage loaded on other transport vehicles (transporter) 242 and 244 are collected in a terminal 42. When all pieces of the collected baggage 216 (or lots 218) are loaded and transported on a large transport vehicle (transporter) 246, consolidated transportation is also performed.

Transporting all the pieces of baggage (lots) in the same direction in a long distance will be considered. When long-distance transportation is performed using the flatbed truck 240 and the other transport vehicles (transporter) 242 and 244, a driver is required for each of the vehicles. In particular, in the long-distance transportation, (driver's) labor costs increase when an empty vehicle out of service is also considered. In contrast, when all the pieces of the baggage are consolidated and transported at once by the large transport vehicle (transporter) 246, labor costs can be saved significantly.

In the system of the present embodiment, transportation companies handling the baggage 216 (lots 218) loaded on the flatbed truck 240 and the other transport vehicles (transporter) 242 and 244 may be different. In this case, the consolidated transportation is performed across a plurality of transportation companies.

When all the piece of the baggage cannot be loaded on one large transport vehicle (transporter) 246 at the consolidated transportation, the consolidated transportation is performed by constituting a vehicle platoon 200 or a vehicle group 300 of a plurality of transport vehicles (transporter), in the system of the present embodiment.

Figure 3:
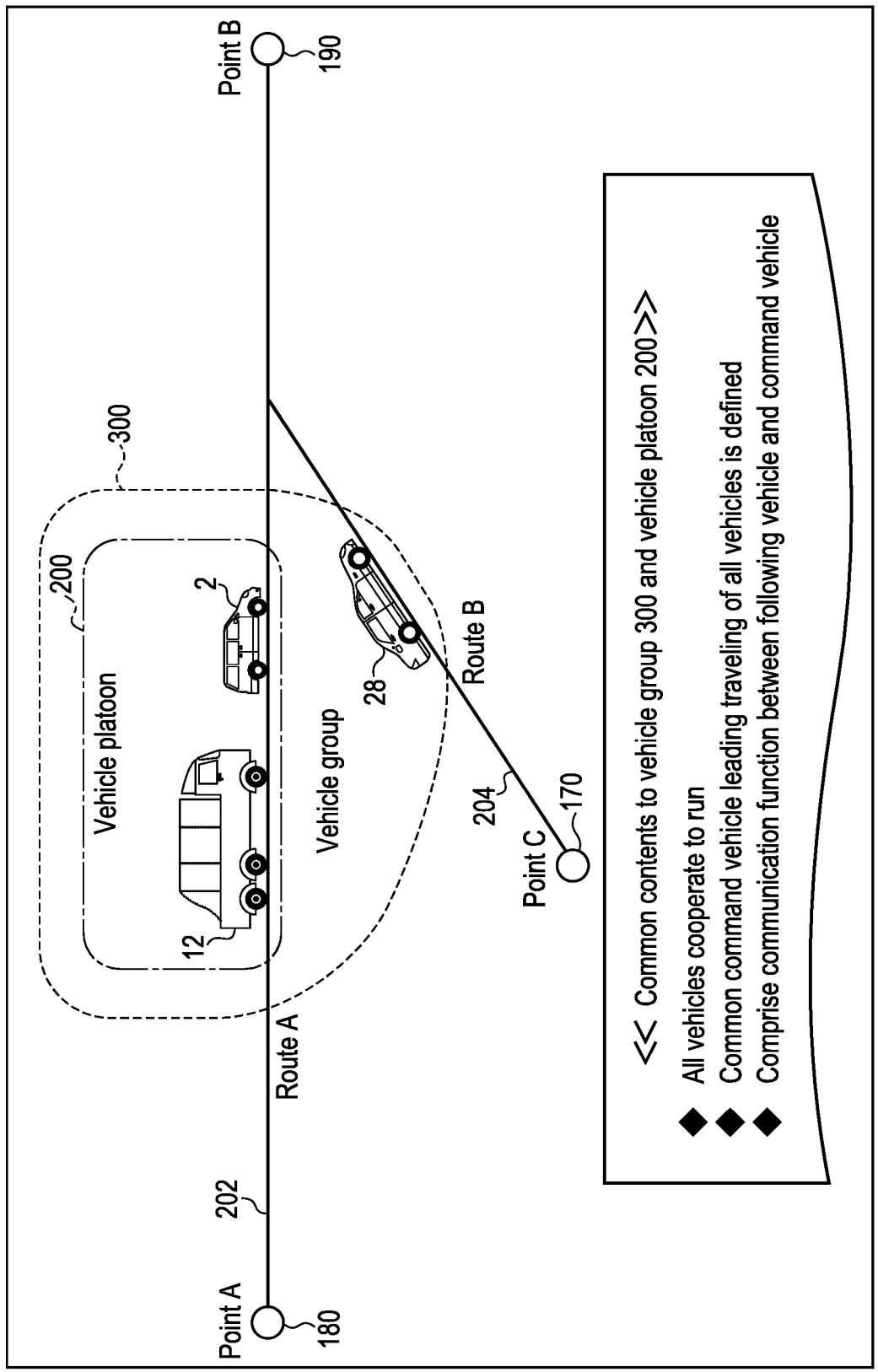
FIG. 3 is an explanatory view showing a difference between a vehicle group and a vehicle platoon according to the present embodiment.

As shown FIG. 3, the vehicle group 300 and the vehicle platoon 200 have a common feature that "all vehicles constituting them cooperate to travel". A command vehicle A 2 (or a portable grouped vehicle guidance machine 320 (described later with reference to FIG. 13)) is used as a master (command vehicle) for stably and integrally controlling the cooperative travel. Furthermore, information transmission is performed using wireless communication between a following vehicle A 12 (or a following vehicle Z 28) guided by the master (command vehicle) and the master (command vehicle A 2 (or the portable grouped vehicle guidance machine 320)). As a physical layer of the wireless communication system, short-range wireless communication such as ZigBee (registered trademark), Bluetooth (registered trademark), Ultra-Wide Band (UWB), and Z-WAVE, or middle-range wireless communication such as Wireless Fidelity (Wi-Fi) and EnOcean may be used.

A plurality of vehicles traveling on a common route A 202 from point A 180 to point B 190 constitute "vehicle platoon 200" while having the above-described common feature. A plurality of vehicles constituting the vehicle platoon do not need to be close to each other. In addition, individual vehicles constituting the vehicle platoon are referred to as "platoon vehicles".

In comparison with this, the vehicles (grouped vehicles) constituting the "vehicle group 300" do not need to travel on the same route A 202. For example, the command vehicle A 2 and the following vehicle A 12 that travel on the route A 202, and the following vehicle Z 28 may constitute the same vehicle group 300. That is, as shown in the example of FIG. 3, a route B 204 from a point C 170 to the point B 190 on which the following vehicle Z 28 travels is different from the route A 202 on which the command vehicle A 2 and the following vehicle A 12 travel. In this case, too, the command vehicle A 2 (or the portable grouped vehicle guidance machine 320) can perform "remote guidance" of the following vehicle Z 28 traveling in the different route B 204.

When the command vehicle A 2 guiding all the vehicles that belong to the vehicle platoon 200 or the vehicle group 300 is set as described above, the traveling of all the vehicles can be efficiently cooperated. However, the present embodiment is not limited thereto, but the command vehicle A 2 may not be set in the vehicle platoon 200 or the vehicle group 300 and all the vehicles may be cooperated with each other with an equal positioning.

When the consolidated transportation is performed by using a plurality of vehicles (a plurality of transporter 210) that constitute the vehicle group 300 (or the vehicles platoon 200), in the present embodiment, the baggage is loaded separately on the plurality of vehicles in accordance with the characteristics (and attributes) of the consolidated baggage 216 (or lot 218).

For example, transportation of a lot A (or baggage A) and a lot B (or baggage B) from the point A 180 to the point B 190 will be considered. When the lot A (baggage A) and the lot B (baggage B) correspond to a easily transferred baggage item TOUT and a highly sensitive baggage item TIN in specific consolidation determination items JITEM to be described later with reference to FIG. 6, both of them are not provided together in the transportation area (container) 214 of the same transport vehicle (for example, the following vehicle A 12) and are not consolidated and transported.

In the above-described case, in the present embodiment, the lot A (baggage A) and the lot B (baggage B) are separated and loaded in different transportation areas (containers) 212 of the plurality of transport vehicles (transporter) 210 for transportation. More specifically, the lot A (baggage A) may be loaded in the transportation area (container) 212 of the following vehicle A 12 and the lot B (baggage B) may be loaded in the transportation area (container) 212 of the command vehicle A 2 for transportation. Furthermore, the baggage 216 (or the lot 218 containing the same) which does not correspond to the designated baggage items TOUT and TIN in the consolidation determination items JITM may be consolidated in the command vehicle A 2 and the following vehicle A 12 for transportation.

Each transport vehicle (transporter) 210 (e.g., in the command vehicle A 2 and the following vehicle A 12) has a separate transportation area (container) 212. Since an individual transportation area (container) 212 corresponding to characteristics (or attributes) of each of a plurality of pieces of the baggage 216 (or lot 218) to be contaminated can be selected, the consolidated transportation can be performed under an appropriate environment.

A process of determining possibility of loading in unit of lots 218 or baggage unit 216 in association with the above-described consolidation determination items JITM and an allocation to the appropriate transporter (transport vehicles) 210 based on the determination result will be described below.

For example, when a large amount of cultured cells or the like are transported in a state of being exposed, transportation in the transportation environment 214 in which a sterile state is secured is desired. On the other hand, when an animal (or a person) who needs to be isolated because of suffering from an infectious disease, an influenza or the like is transported, contamination together with the other baggage (or animals or persons) in the same transportation area (container) 212 is also difficult. Similarly, transportation of gasoline, oil, hazardous materials or the like requires a dedicated transport vehicle (transporter) 210. Thus, some pieces of the baggage 216 (or lot 218) for which the consolidated is prohibited exist.

It is difficult for the transportation company alone to determine the baggage 216 (or lot 218) for which the consolidated transportation is prohibited. Therefore, at the stage of receiving a transport request, the transportation company preliminarily receives from a customer whether or not the lot 218 (or the target baggage 216) is prohibited from being consolidated and transported.

Figure 4:
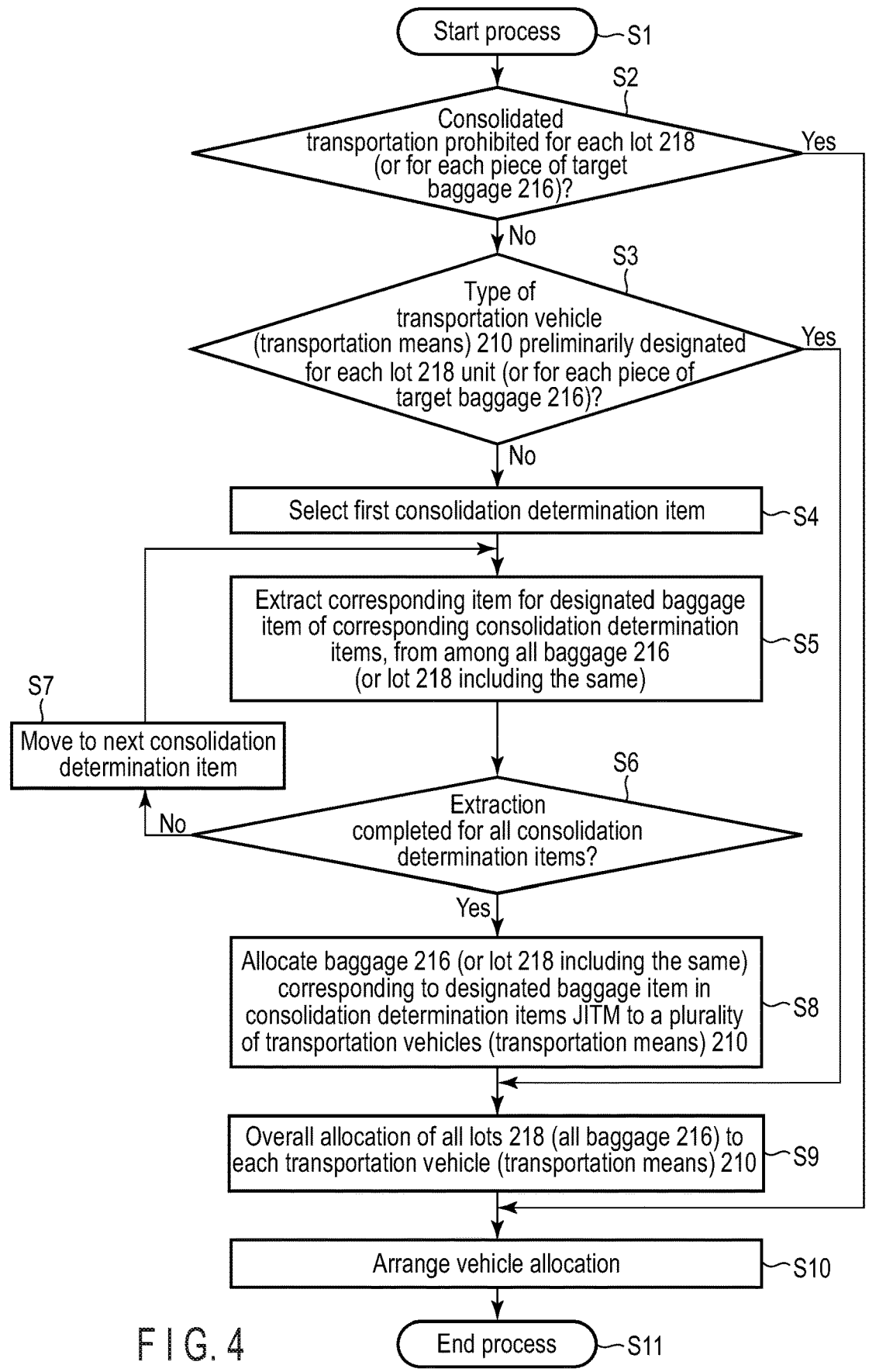
FIG. 4 is an explanatory view showing a process to the determination of possibility of consolidation in units of lots (or in units of packages) and the allocation to an appropriate transporter.

FIG. 4 shows a procedure up to allocation to each transport vehicle (transporter) 210 in accordance with characteristics (or attributes) of each piece of the baggage 216 (or lot 218) in the present embodiment.

As described above, some pieces of the baggage 216 (or lot 218) for which the consolidated is prohibited may also exist. Accordingly, when an allocation process of each piece of the baggage 216 (or lot 218) to the transport vehicle (transporter) 210 starts in step S1, extraction of the lot 218 (or the target baggage 216) for which the consolidated transportation is prohibited is performed as described above (S2).

For the lot 218 (or the target baggage 216) for which the consolidated transportation is prohibited (i.e., when the determination result in S2 is Yes), the arrangement of vehicle allocation (S10) of the dedicated transporter (transport vehicle) 210 is performed. In contrast, for the lot 218 (or the target baggage 216) for which the consolidated transportation is not prohibited (i.e., when the determination result in S2 is No), the process proceeds to step S3.

Perishable foods and the like are desirably transported in a low temperature transportation environment 214. In this case, as the type of the transport vehicle (transporter) 210, a refrigerator car (or a temperature (temperature and humidity) adjustable vehicle capable of being controlled at a low temperature, which is required as the transportation environment 214) is designated.

At the stage of a transport request, a customer often designates the type of the transport vehicle (transporter) 210 (a refrigerator car, a temperature and humidity adjustable vehicle, or the like). However, the present embodiment is not limited thereto, but the transportation company or the like may independently determine (independently designate) the type of the corresponding dedicated transport vehicle (transporter) 210, based on the information on the baggage item to be acquired at the reception stage of the transport request.

In step S3, it is determined whether or not the type of the transport vehicle (transporter) 210 is designated in advance for each unit of the lot 218 (or each target baggage 216) which can be consolidated and transported. When the type of the transport vehicle (transporter) 210 is designated in advance (i.e., when the determination result in S3 is Yes), allocation (S9) of the lot 218 (or the baggage 216) corresponding to the designated vehicle is performed. In contrast, when the transport vehicle (transporter) 210 is not designated in advance (i.e., when the determination result in S3 is No), the process proceeds to next step S4.

For example, consolidated transportation of apples and cabbages in a long distance will be considered. These perishable foods can be consolidated and transported in the same transportation environment 214 at a low temperature. On the other hand, the situation is different in the consolidated transportation of fish and lettuce. That is, some types of fish emit a fishy odor to the circumference depending on freshness under a low temperature environment. Therefore, there is a risk that when fish severely emitting a fishy odor and lettuce are made to be placed together in an enclosed space (the same transportation area (container) 212) for a long time the odor may transfer to the lettuce. Thus, for example, consolidated transportation of the baggage (or lot including this) "easily emitting an odor (corresponding to the easily transferred baggage items TOUT in FIG. 6)" and the baggage (or the lot containing the same) "easily allowing an odor to be transferred thereto (corresponding to the highly sensitive baggage items TIN in FIG. 6)" is undesirable even in the low temperature transportation environment 214.

When hot baggage and cold baggage are placed together in an enclosed space for a long time, not only the above-described odor (an example of the consolidation determination items JITM), but heat easily transfer. Thus, an item of a characteristic (or attribute), a state, or a movable body which can move when the baggage is made to be placed together in an enclosed space (the same transportation area (container) 212) for a long time is referred to as a consolidation determination item JITEM. In the above example, "movement of odor" and "propagation of heat" correspond to the individual consolidation determination items JITM.

When a plurality of consolidation determination items JITM are set as described above, the first consolidation determination item JITM is selected in step S4. In the above-described example, either of the "transfer of odor" and "transfer of heat" may be selected as the first consolidation determination item JITM. In addition, the present invention is not limited thereto, but the other item may be set as the first consolidation determination item JITM.

For all the pieces of the lot 218 or all the pieces of the baggage 216 for which the consolidated transportation is not prohibited (i.e., the determination result in S2 corresponds to "No"), corresponding articles to the designated baggage items (i.e., easily transferred baggage items TOUT and highly sensitive baggage items TIN to be described later with reference to FIG. 6(a)) in the consolidation determination items JITM are extracted in step S5.

When a plurality of consolidation determination items JITM are set, a similar extraction process (S5) is sequentially repeated for the other consolidation determination items JITM (S7). When the extraction process for all the consolidation determination items JITM is completed in step S6 (i.e., when the determination result in S6 is Yes), the process proceeds to next step S8.

Allocation of the "baggage 216 corresponding to the designated baggage item in the consolidation determination items JITM or the lot 218 containing the same" extracted in step S5 to a plurality of transport vehicles (transporter) 210 is first performed in step S8.

In step S9, an overall allocation including the baggage 216 (or the lot 218) which does not correspond to the designated baggage in all the consolidation determination items JITM is performed, based on the allocation process of the transport vehicles (transporter) in step S8. The overall allocation of all the pieces of lot 218 (all the pieces of baggage 216) to the respective transport vehicles (transporter) 210 is completed by the process of step S9.

Then, in step S10, arrangement of vehicle allocation of the transport vehicles (transporter) 210 is performed by using the result. After that, the allocation process to each transport vehicle (transporter) 210 is finished (S11).

In step S2 and step S3, detailed descriptions are partially omitted. That is, in step S2, the lot 218 (baggage 216) for which the consolidated transportation is prohibited is extracted from all the lots 218 or the baggage 216 to be consolidated and transported in the same vehicle platoon 200 (or in the same vehicle group). Then, the process proceeds to step S10 for the extracted lot 218 (baggage 216)

for which the consolidated transportation is prohibited. In contrast, the process proceeds to step S3 for the lot 218 (baggage 216) for which the consolidated transportation is permitted.

Similarly, in step S3, the process proceeds to step S9 for the lot 218 (baggage 216) for which the type of the transport vehicle (the transporter 210) is designated in advance from among all the lots 218 or the baggage 216 to be consolidated and transported. In contrast, the process proceeds to step S4 for the lot 218 (baggage 216) for which the type of the transport vehicle (transporter 210) is not designated in advance.

FIG. 5 shows an example of the consolidation determination items JITM in the present embodiment. An item which can be a medium and which can transfer or transmit between predetermined pieces of the baggage when placed together for a long time in the enclosed space (or the same transportation area (container) 212) is referred to as a consolidation determination item JITM.

The consolidation determination item group can be classified into two types according to the type of the medium which is moved, conducted, and transferred between the predetermined pieces of baggage. That is, the item group relating to the movement (change) ATR of characteristics, attributes or states of the predetermined piece of baggage is included in the first classification. For example, a physical medium such as light, thermal energy, vibrational energy or the like, or a chemical or physicochemical medium such as a chemical substance at a single molecular level is interposed as a medium which is moved, conducted and transferred. As a next classification, a microobject MOV that moves directly across different pieces of baggage 216 becomes a medium which is moved, conducted, and transferred.

As examples of the consolidation determination items related to movement (change) ATR of the characteristics, attributes or states, movement of odor SML, propagation of heat (temperature) HET, movement of colors CLR, tastes TST, etc., are raised. Adjacent pieces of baggage may contact due to vibration at the time of transportation in an enclosed space (the same transportation area (container) 212), and the colors CLR and tastes TST may transfer.

In addition, the medium MOV of the minute movable body implies radioactive material (radioactivity) RAD, fine particles PAR such as glass powder such as asbestos, garbage and dust, virus VRS, microorganisms MCB such as bacteria, mold bacteria, athletes's bacteria, *E. coli*, and insects such as mites and ants.

Incidentally, a concrete example of the medium MOV of the minute movable body is not limited to the above, but any other medium may be used as the OTH. For example, the medium may imply PM 2.5 (Particulate Matter; a fine particle like substance having a particle size of 2.5 µm or less as defined by WHO) or smoke (black smoke, cigarette smoke, smoke of an insecticide that emits smoke, or the like), a reactive substance in a vaporized state (discoloring a dough by reacting with light, oxygen, water, or the like), and the like.

The list of the consolidation determination items JITM and the classifications of the consolidation determination items JITM shown in FIG. 5 are mere examples. Therefore, any other arbitrary consolidation determination items JITM and other classification methods may also be used.

FIG. 6(*a*) shows examples of the designated baggage items set in the specific consolidation determination items JITM. In addition, FIG. 6(*b*) and FIG. 6(*c*) show an example of allocation to a plurality of transport vehicles (transporter) 210. In the allocation to a plurality of transport vehicles (transporter) 210 constituting the same vehicle platoon 200 (or the vehicle group 300), which is performed for the baggage 216 (or the lot 218 containing the same) as performed in step S8 of FIG. 4, a consolidation combination method shown in FIG. 6(*b*) and FIG. 6(*c*) is applied.

The easily transferred baggage item TOUT and the highly sensitive baggage item TIN are designated for each consolidation determination item JITM. The easily transferred baggage items TOUT include items of the baggage which can easily release a physical medium, a chemical medium, a physicochemical medium or a minute movable body. In contrast, the highly sensitive baggage items TIN include items of the baggage which can easily absorb the physical medium, the chemical medium, the physicochemical medium, and the minute movable body. The baggage items designated as the easily transferred baggage items TOUT and the highly sensitive baggage items TIN are preliminarily set based on requests from users, previous transportation experiences and the like, and are stored in a database form in advance.

In the consolidated transportation method of the present embodiment, transportation areas (containers) 212 or transportation environment 214, and the transport vehicles (transporter) 210 are separated for the baggage 216 corresponding to the easily transferred baggage and the baggage 216 corresponding to the highly sensitive baggage relating to at least one of the predetermined characteristic (or attribute) and state, and the movable body. Alternatively, the transportation areas (containers) 212 or the transportation environment 214, and the transport vehicle (transporter) 210 are separated for the lot 218 containing the easily transferred baggage and the lot 218 containing the highly sensitive baggage. That is, the corresponding transportation areas (containers) 212 are physically separated for the baggage 216 (lot 218 containing the same) corresponding to the easily transferred baggage items TOUT and the baggage 216 (lot 218 containing the same) corresponding to the highly sensitive items TIN, in the same consolidation determination items JITM.

As a method of separating the transportation areas (containers) 212 or the transportation environment 214, and the transport vehicles (transporter) 210, the baggage is separated in different vehicles (for example, the command vehicle A 2 and the following vehicle A 12, or the following vehicle A 12 and the following vehicle Z 28) in the same vehicle group 300 (or the same vehicle platoon 200) and then loaded.

FIG. 6(*a*) shows examples of baggage items designated as easily transferred baggage items TOUT and highly sensitive baggage items TIN. A hydraulically operated machine that releases an "oil odor" may be designated as the easily transferred baggage item TOUT. In contrast, clothes such as underwear, food packaging members, and the like may be designated as highly sensitive baggage items TIN since they can easily absorb the "oil odor".

When a hydraulically operated machine and the clothes and food packaging members are made to coexist in an enclosed space (the same transportation area (container) 212) for a long period of time, there is a risk that the clothes and the food packaging members may smell "oily". Therefore, desirably, the hydraulically operated machine and the food packaging members (or clothes) are separated to the other transportation area (container) 212 in the same vehicle platoon 200 (or the same vehicle group 300) for transportation. For example, the hydraulically operated machine is loaded in the following vehicle A 12 of FIG. 3, and the clothes such as underwear, the food packaging members and the like are loaded in the command vehicle A 2 or the following vehicle Z 28, and transported.

Incidentally, when iron powder (in a non-oxidized state) contained in a sealed container in which the air is blocked is exposed to the air, the iron powder is oxidized and heated. When an oxidation heating element (such as iron powder), which is stored in a sealed state, is transported, heat may be generated if a packaging portion is broken due to vibration during transportation or contact with adjacent baggage. In contrast, packaged chocolate is easily melted with a slight temperature rise. For this reason, the oxidation heating elements (such as iron powder) and chocolate are desirably transported separately in different transportation areas (containers) 212.

FIG. 6(b) and FIG. 6(c) show examples of consolidation combinations in a case where these pieces of baggage are consolidated and transported. Separation of the transportation area (container) 212 (i.e., transport vehicle (transporter) 210) is desired for the baggage 216 (or the lot 218 containing the same) corresponding to the easily transferred baggage items TOUT and the baggage 216 (or the lot 218 containing the same) corresponding to the highly sensitive baggage items TIN, of the same consolidation determination items JITM.

That is, the first baggage (for example, a hydraulically operated machine) corresponding to the easily transferred baggage item in the same consolidation determination item JITM (for example, movement of odor SML) is arranged in the first transportation area (container) included in the first transporter (for example, following vehicle A 12) belonging to the same vehicle group 300 (or the vehicle platoon 200) and transported (FIG. 6(b)).

In addition, the second baggage (for example, clothes (including underwear)) corresponding to the highly sensitive baggage item in the same consolidation determination item JITM (for example, movement of odor SML) is arranged in the second transportation area (container) included in the second transporter (for example, following vehicle Z 28) belonging to the same vehicle group 300 (or the vehicle platoon 200) and transported. Then, the first transportation area and the second transportation area are physically separated.

Incidentally, when the consolidation determination items JITM are different in the baggage 216 (or the lot 218 containing the same) corresponding to the easily transferred baggage items TOUT and the baggage 216 (or the lot 218 containing the same) corresponding to the highly sensitive baggage items TIN, the consolidated transportation that the baggage is placed together in the same transportation area (container) 212 is often permitted.

For example, even if an oxidation heating element (such as iron powder) sealed in a plastic bag and a hydraulic operating machine coexist in the same transportation area (container) 212 for a long period of time, there is small risk that the oxidation heating element may smell "oily". In addition, even when the temperature of the oxidation heating element rises slightly at this time, the influence to the hydraulically operated machine is small. Similarly, no problem arises when the packaged chocolate and clothes are placed in the same transportation area (container) 212 and consolidated and transported.

For the above reason, a hydraulically operated machine and an oxidation heating element (such as iron powder) may be arranged in the same transportation area (container) 212 in a transport vehicle A_6 and consolidated and transported as shown in FIG. 6(b). Similarly, clothes (including underwear) and packaged chocolate may be placed in the same transportation area (container) 212 in a transport vehicle B_8 and consolidated and transported.

In addition, when the consolidation determination items JITM are different, the baggage (or lot) corresponding to the easily transferred baggage item and the baggage (or lot) corresponding to the highly sensitive baggage item may be placed together in the transportation area (container) 212 in the same transport vehicle (transporter 210) and consolidated and transported.

That is, even if the oxidation heating element (such as iron powder) corresponding to the easily transferred baggage item TOUT with respect to propagation of heat (temperature) HET as the consolidation determination item JITEM is slightly heated, an adverse effect on the clothes (including underwear) corresponding to the highly sensitive baggage item TIN with respect to the movement of odor SML is small. At this time, the clothes become slightly warm and no serious problems arise. Therefore, as shown in FIG. 6(c), both pieces may be placed together in the same transportation area (container) 212 in the same transport vehicle B_8 and consolidated and transported.

As the other examples of the easily transferred baggage items TOUT of the consolidation determination items JITM shown in FIG. 6(a), baggage items generating strong odor, heat, and light (including radioactivity), and animals and plants in a living state may be designated. In addition, as the other examples of the highly sensitive baggage items TIN, foods (including perishable foods), materials of clothes, clothes products and the like may be designated. However, the present embodiment is not limited thereto, but baggage items may be arbitrarily designated (set) based on contents designated by the user, a guarantee system of a transportation company for a transported article, and the like.

In step S2 of FIG. 4, extraction of an item for which consolidated transportation is prohibited is performed. In particular, consolidated transportation with general baggage is prohibited in the transportation of hazardous materials. The hazardous materials are classified into Category 1 to Category 6. The hazardous materials classified into Category 1 correspond to oxidizing solids.

In addition, combustible solids are also classified into Category 2 of the hazardous materials. A solid substance which is easily ignited and highly flammable is generally referred to as a combustible solid. This combustible solid also implies a solid which causes dust explosion and spontaneous combustion. In general, a number of reducing substances are liable to be oxidized as combustible solids. Therefore, hazardous materials classified into Category 2 need to avoid mixture and contact with oxidizing materials to prevent ignition and explosion.

Spontaneously combustible substances and water-reactive substances are classified into Category 3 of the hazardous materials. The spontaneously combustible substances are indicative of solids or liquids which tend to spontaneously ignite in air. In addition, the water-reactive substances are indicative of solids or liquids which ignite and generate a combustible gas when contacting water.

Inflammable liquids are classified into Category 4 of the hazardous materials. Liquids which are easily ignited are generally referred to as inflammable liquids. When combustible steam is generated from the hazardous materials of Category 4 and an ignition source is made to be close to the combustible steam in a state of being mixed with air, there is a risk that the combustible steam may be ignited and exploded.

Incidentally, "gasoline", "kerosene", "light oil", "heavy oil", "lubricating oil", "Class III petroleums having a flash point of 130° C. or more", "Class IV petroleums", and "oils extracted from animals and plants" are also included in Category 4 described above.

Self-reactive substances in a solid or liquid form are classified into Category 5 of hazardous materials. Since oxygen is contained in molecules of the self-reactive substance, self-combustion is easily performed. Oxidizing liquids are classified into hazardous materials of Category 6. Liquids having a property of oxidizing a reacting partner is generally referred to as oxidizing liquids. A number of oxidizing liquids, which have a non-flammable nature, do not burn even in the presence of a fire source, but are classified as hazardous materials.

Drivers who transport these hazardous materials are required to be qualified as hazardous materials engineers. Three classes, i.e., Class A, Class B, and Class C are set for this qualification. A Class A hazardous materials engineer can handle hazardous materials of all categories, Category 1 to Category 6.

In addition, a Class B hazardous materials engineer can handle hazardous materials of the types for which the engineer has acquired the license. Then, a driver qualified as a Class C hazardous materials engineer can transport only specific Type 4 hazardous materials from the "gasoline" to the "oils extracted from animals and plants".

In the same transportation area (container) 212 (FIG. 1) in the present embodiment, the hazardous materials contained in only the same type can be collectively transported. For example, since light oil and kerosene are the hazardous materials of the same type (Category 4), the oils can be consolidated and transported in the same transportation area (container) 212.

In contrast, consolidated transportation of the hazardous materials in Category 1 to Category 6 and other substances (in the same transportation area (container) 212) is basically prohibited. When these hazardous materials and the other materials are consolidated and transported (i.e., placed together in the same transportation area (container) 212), the risk of fire increases. For example, in the system of the present embodiment, "oils extracted from plants" (classified into Category 4) used in cooking of a general household are not consolidated and transported with the other substances.

Even when the above hazardous materials are transported alone (in the single transportation area (container) 212), the sum of heights of stack inside the transportation area (container) 212 is set to 3 m or less. In addition, even when racks or the like are used in the transportation area (container) 212, the hazardous materials are transported while setting the total height to 6 m or less.

Incidentally, in the present embodiment, when different categories of hazardous materials are consolidated and transported (in the same transportation area (container) 212), only the following combinations are allowed.

Category 1 and Category 5 excluding alkali metal peroxides and their components
Category 1 and Category 6
Category 2 and yellow phosphorus and products containing the same (spontaneously combustible articles)
Category 2 and Category 4
Alkyl aluminum and the like, and products containing alkyl aluminum or the like in Category 4
Category 4 and Category 5

Even when consolidated transportation is performed in the above combinations, the sum of the heights of stack in the transportation area (container) 212 is set to 3 m or less. In addition, even when racks or the like are used in the transportation area (container) 212, the hazardous materials are transported while setting the total height to 6 m or less.

Thus, when transporting hazardous materials, a combination condition (qualified person) of the baggage 216 (lot 218) to be transported and the driver is added. Besides this, in the system of the present embodiment, calculation of combination 808 of the optimum vehicles in the vehicle platoon 200 (or the vehicle group 300) may be calculated based on combinations of a number of conditions.

Figure 7:
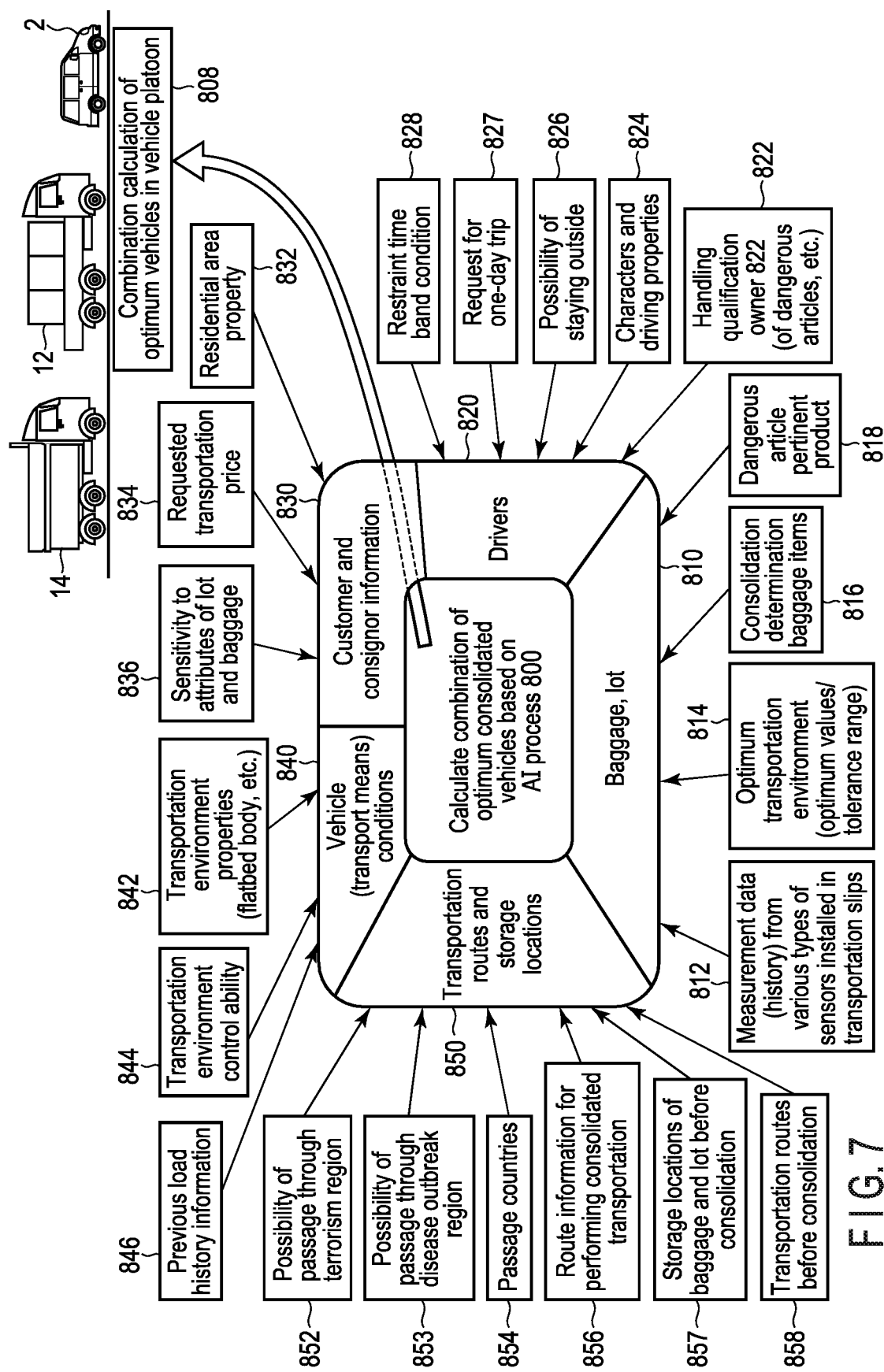
FIG. 7 is an explanatory view showing an example of a method of calculating the vehicle combination in a consolidated vehicle platoon.

A result of calculation of combination 808 of the optimum vehicles in the vehicle platoon 200 (or the vehicle group 300) is obtained based on the result of the calculation of combination 800 of the optimum consolidated vehicles. Various parameters necessary for the combination calculation 800 of the optimum consolidated vehicles are shown in FIG. 7. Then, in the system of the present embodiment, the calculation of combination 800 of the optimum consolidated vehicles using an artificial intelligence (AI) process is performed.

As shown in FIG. 7, various parameters necessary for calculation are exist, and a plurality of types and numbers of combined vehicles to be output as calculation results are also provided. Therefore, adopting a technique corresponding to multiple inputs and multiple outputs at the same time as the above described AI process is desirable. As a specific AI process method, for example, a deep learning method may be used. However, the present embodiment is not limited thereto, but any method may be used. In addition, a plurality of processors processing in the conventional Neumann type may be made to perform processing in parallel.

When the above-mentioned hazardous material corresponding article 818 is included in the parameters of the baggage or lot 810 that is to be the consolidated transportation target, a license holder 822 for handling (of the hazardous materials and the like) is an essential condition (i.e., an essential parameter to be selected) as the corresponding driver 820.

In addition, as other parameters related to the baggage and the lot 810, consolidation determination baggage items 816 corresponding to the easily transferred baggage items TOUT and the highly sensitive baggage items TIN (FIG. 6(a)) are provided.

Then, when transporting chocolate, perishable foods and the like, transportation environment conditions such as temperature and humidity which are optimum for transportation are predetermined. The optimum values of the temperature, humidity and the like determined for each of these pieces of baggage or lot 810, or allowable ranges thereof correspond to parameters of the optimum transportation environment 814.

The air conditioning of the transportation area (container) 212 may be broken while the baggage or lot 810 for which the optimum transportation environment 814 is determined is transported. In the system of the present embodiment, various sensors may be incorporated into the transport slips to be attached to the individual pieces of baggage to avoid the risk and to ensure the quality of the baggage or lot 810 during transportation. Thus, when measurement data from various sensors is collected in real time during transportation, immediate anomaly processing can be performed. Furthermore, histories of the transportation environment 214 and the storage environment at a time before the consolidated transportation can be collected by utilizing the measurement data from various sensors. The measurement data (history) 812 from various types of sensors installed in the transport slips are also important parameters.

A concrete example of practical use of the measurement data (history) 812 from various types of sensors installed in the transport slips will be described below. For example, attaching a transport slip 530 equipped with a wireless IC for attachment to the baggage to a surface of a packing box of underwear and using an odor sensor 584 therein will be considered (details will be described later with reference to FIG. 15 and FIG. 16). It is assumed that a plurality of pieces of underwear packed in the box are consolidated and transported after stored in advance in a warehouse. If the underwear is stored for a long period at an adjacent location of a hydraulically operated machine in a warehouse, the odor of oil may seep into the underwear. When the underwear impregnated with the odor of oil is consolidated and transported together with other underwear, the odor of oil is transferred to the other underwear.

When the odor of oil is transferred from the adjacent hydraulically operated machine in the warehouse, the odor sensor 584 detects the odor and the information is left as a measured data history 812. If the measurement data history 812 from the various sensors is used, it is possible to avoid the risk of mistakenly performing consolidated transportation of the underwear with the odor of the oil into the other underwear.

As described above, the previous transportation routes and the storage locations 850 also give a large influence to the calculation of combination 800 of the optimum consolidated vehicles. For example, when the storage location 857 of the baggage 216 and the lot 218 to be consolidated is placed in a fish market, there is a high possibility that the "fishy odor" may be transferred into the baggage 216 (or the lot 218 containing the same) corresponding to the highly sensitive baggage item TIN (see FIG. 6(a)) relating to the odor movement SML in the consolidation determination item JITM. In addition, when an odor area or a high-temperature area is included in the transportation route 858 before consolidation, there is a possibility that the attributes (odor, shape, and the like) of the package 216 and the lot 218 to be consolidated may be affected.

As regards the transportation routes and the storage locations 850, not only the previous history described above, but also the routes of consolidated transportation and temporary storage locations of the consolidated transportation to be performed executed are significantly affected. For example, it is assumed that congestion information and an accident occurrence situation can be confirmed in advance with respect to the route information 856 for performing the consolidated transportation. When an accident or congestion occurs in the transportation route 850 where consolidated transportation is performed by organizing the vehicle platoon 200 (or the vehicle group 300), the number of organized vehicles of the vehicle platoon 200 (or the vehicle group 300) is reduced as much as possible to attempt a smooth operation.

In addition, in a case of passing through a disease outbreak region 853, it is desirable to select a transport vehicle (transporter) 210 having a high enclosure property in the transportation area (container) 212. On the other hand, if passage of a terrorism region 852 is needed, it is desirable to select a transport vehicle (transporter) 210 with a strong exterior which is difficult for the bullet to penetrate. Furthermore, when a country where terrorism occurs frequently, a country where an epidemic occurs frequently, or a country where nasty smell strength is high is included in a passage country 854, selection of the transport vehicles (transporter) 210 needs to be deeply considered.

Conditions 840 of the transport vehicle (transporter) 210 also gives a large influence to the calculation of combination 800 of the optimum consolidated vehicles. As previous load history information 846, it is assumed that, for example, "baggage in which a poisonous spider or a poisonous ant is detected" has been loaded in the past. In this case, since there is a risk that a poisonous spider or a poisonous ant may remain in the transportation area (container) 212 where the baggage has been loaded, it is desirably excluded from the means for consolidated transportation.

In addition, as for the baggage and lot 810 making much requirement for an optimum transportation environment 814 (optimum value and tolerance range), selection of the transport vehicle (transporter) 210 having a high control capability 844 for the transportation environment 214 (such as an air conditioning function) is desirable. Similarly, a transportation environment property 842 is also one of the important parameters. For example, some baggage and lot 810 are inapplicable to the transportation form using the flatbed body 240 (FIG. 2).

In addition, the information 830 on customers and the consignors is also a large factor. In particular, sensitivity 836 of the customers and consignors to the attributes of the lot and package is a large factor (parameter). This is because a special transportation environment 214 needs to be considered for "a customer who dislikes goods having a slight odor" or "a customer sensitive to a slight change in shape".

Oppositely, for the customers and consignors who want to have the requested transport price 834 lowered rather than the quality and the attribute of the lot and the baggage, it is necessary to consider the transportation price more important than the consideration of the transportation environment 214 (not to consider the transportation environment 214, but to select the transport vehicle 210 inexpensive in transportation price).

The sensitivity 836 of the customers and consignors to the attributes of the lot and baggage is also influenced by the nationality. Therefore, a residential area property 832 of the customers and consignors is also a large parameter.

A combination of drivers 820 driving the vehicle platoon 200 (or vehicle group 300) is also of great importance. It has been described that the driver's qualification is required for the transportation of the hazardous materials. In particular, in the case of consolidated transportation including fragile articles such as a hazardous material or a glass product, gentle and careful driving is required. For this reason, the driver's characteristics and driving properties 824 are important parameters for the calculation of combination 800 of the optimum consolidated vehicles.

Besides this, a restraint time zone condition 828 of the driver 820 according to the transportation range is also an important parameter. The restraint time of the driver 820 also includes the out-of-service time of the transport vehicle. Therefore, in long-distance transportation, whether or not the driver 820 can make a one-day trip (whether or not the driver 820 has a one-day trip request 827) has a large influence on the allocation of the drivers 820. Similarly, the information of possibility of staying out 826 per driver 820 is a parameter necessary for the calculation of combination 800 of the mixed vehicles.

The vehicle group or vehicle platoon has been defined with reference to FIG. 3. Next, an example of form of the vehicle group 300 or the vehicle platoon 200 will be described with reference to FIG. 8. In the cooperative traveling, grouped vehicles 2, 12, and 14 belonging to the vehicle group 300 are electrically connected to each other by radio communication.

In the communication form of the upper layer to the physical layer of the wireless communication, among the grouped vehicles 2, 12, and 14, a master-slave (Master-Slave) mode is adopted. That is, a following vehicle (Slave Vehicle) A 12 and a following vehicle B 14 on the slave side are set in an unmanned travel or guided mode 490 in which drivers do not drive directly.

In contrast, a driver directly drives a command vehicle (Master Vehicle) A 2 on the master side. In addition, the same driver guides the subsequent following vehicle A 12 and following vehicle B 14 directly or indirectly while driving the command vehicle A 2. In the example of the embodiment of FIG. 8, the lead vehicle in the vehicle group 300 serves as the command vehicle A 2. However, the present embodiment is not limited thereto, but a vehicle of an arbitrary order in the vehicle group may be the command vehicle A 2. Furthermore, the commanding device on the master side does not necessarily need to be a vehicle and may be, for example, a portable grouped vehicle guidance machine 320 (to be described later with reference to FIG. 13).

Figure 8:
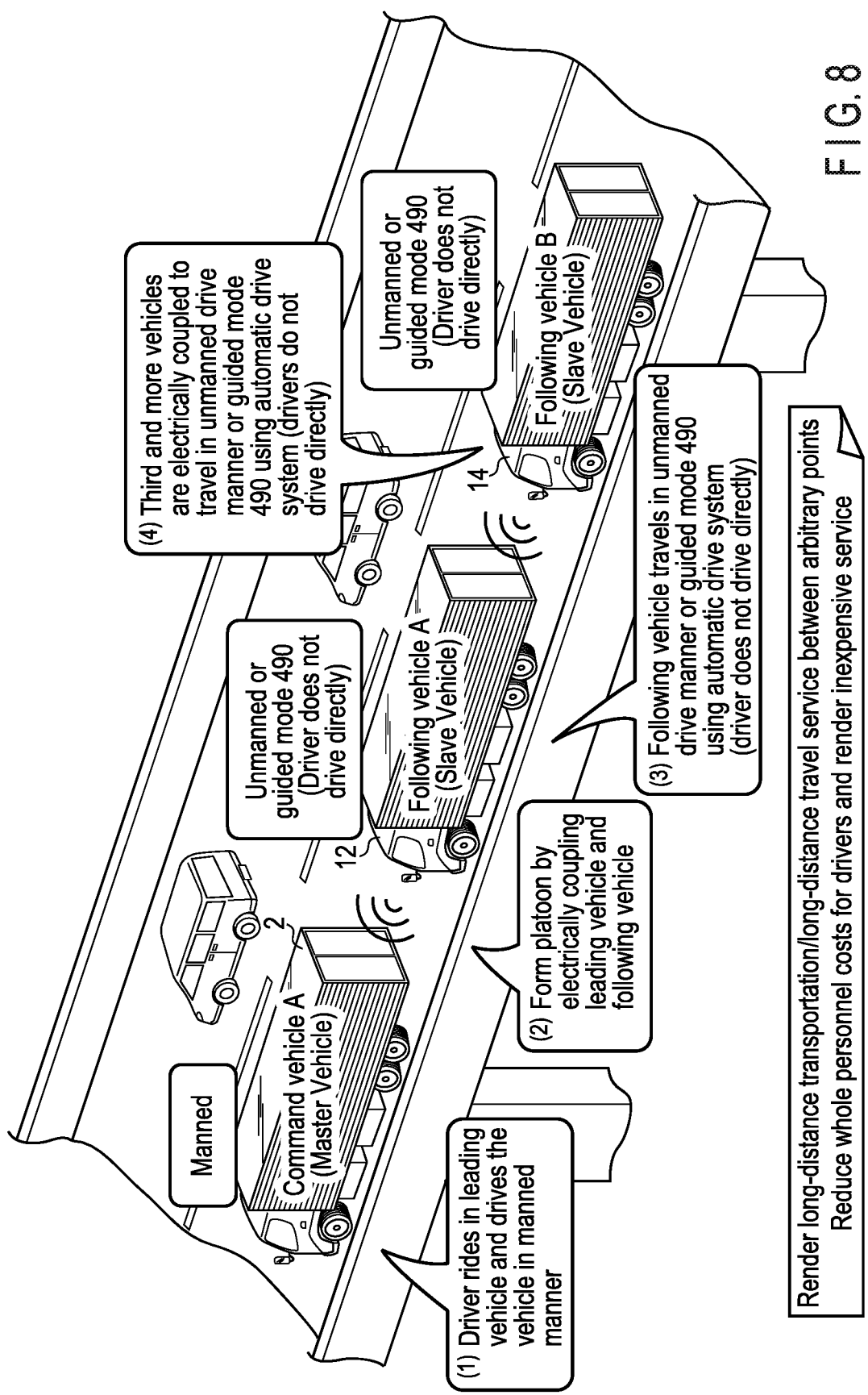
FIG. 8 is an explanatory view showing a basic form in the present embodiment.

In the example illustrated in FIG. 8, for example, one driver operates three vehicles A 2, A 12, and B 14 included in the vehicle group 300. For this reason, the vehicle has an effect of reducing labor costs of drivers (as compared with a conventional system requiring three drivers). As a result, an inexpensive transport service can be rendered to users.

Incidentally, "vehicle (Vehicle)", which is an object in the system of the present embodiment, is indicative of a generic name of the self-driving transporter of every type and every form. In this example, the "self-driving vehicle" capable of driving by itself corresponds to the object. Therefore, for example, a movable body such as a platform truck or a cart which "needs a dynamic action for movement from the outside" falls out of the object of the "vehicle" in the present embodiment. In addition, baggage, a person, an animal, and the like may be optionally selected as the object of the transport.

The concrete examples of the "vehicle" imply bicycles, motorcycles, cars, buses, trucks, trains (railroad), ships, airplanes, rockets, special-purpose vehicles, or the like. The special-purpose vehicles may imply military trucks, tanks, fighters, bombers, artificial satellites, aircraft carriers, battleships, destroyers, submarines, and the like.

Figure 9:
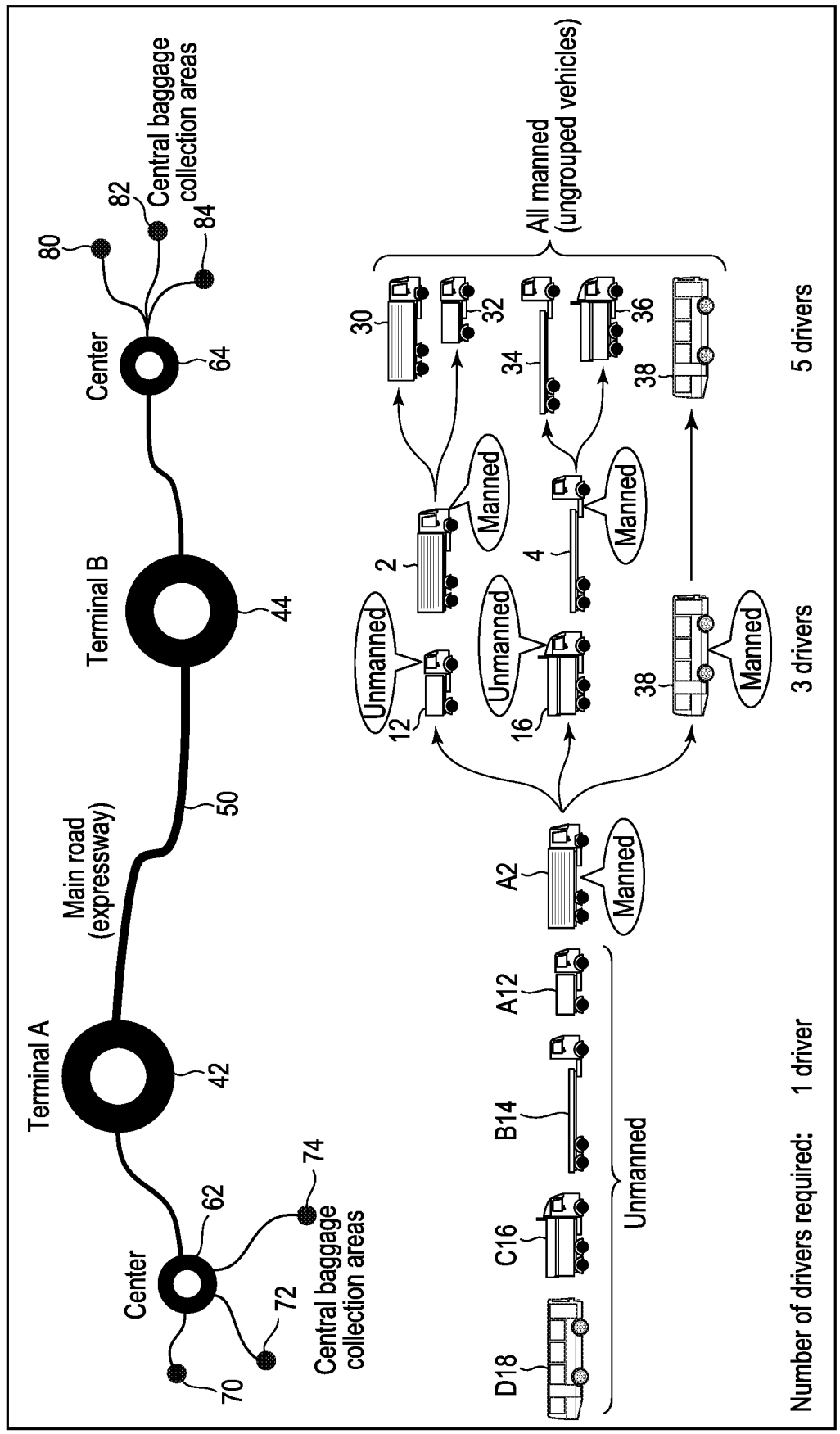
FIG. 9 is an explanatory view showing an example of a relationship between a drive route and a necessary driver in the system of the present embodiment.

An example of a relationship between a drive route and a necessary driver in the system of the present embodiment is illustrated in FIG. 9. For example, five grouped vehicles travel on the main road (expressway) 50 which links a terminal A 42 and a terminal B 44. At this time, one driver controls traveling of the whole vehicle group 300.

This single vehicle group 300 is separated into three vehicle groups at the terminal B 44. At this time, three drivers are required. Furthermore, when the vehicle groups are completely separated at a center 64, five drivers in total are required.

Figure 10:
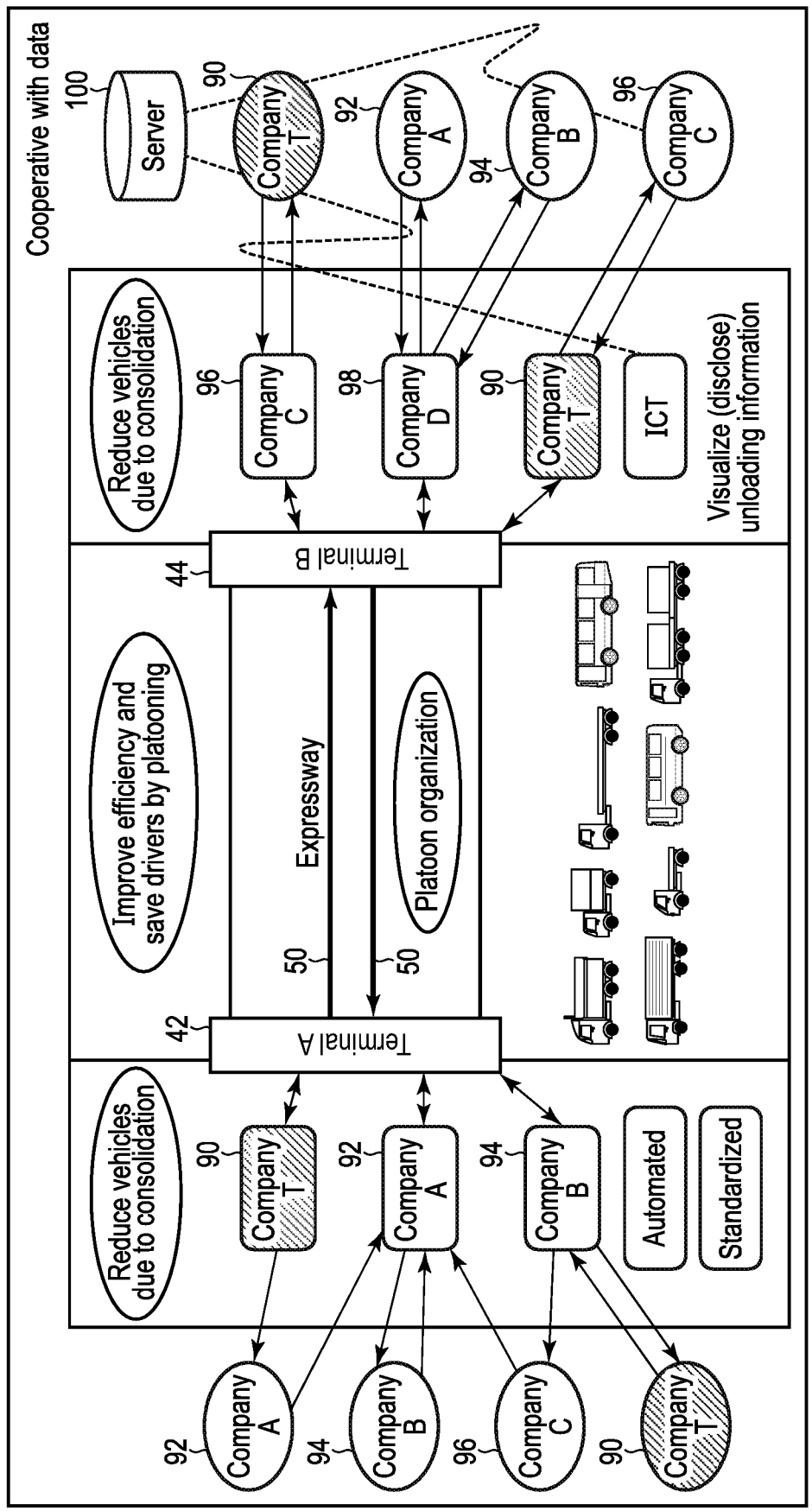
FIG. 10 is an explanatory view showing an example of infrastructural contents that can be provided by the system of the present embodiment.

An example of the transport service method using the cooperative travel of a plurality of vehicles in the system of the present embodiment is illustrated in FIG. 10. For example, conventionally, different transport companies T 90, A 92, B 94, and C 96 have performed long-distance transport using respective transportation trucks. In the example of the transport service method in FIG. 10, reduction of the number of transport trucks is performed by consolidation of the transported baggage. Furthermore, in the expressway (main road) 50 between the terminals A 42 and B 44, a platoon is organized by a plurality of transport trucks to reduce the number of necessary drivers. When the cooperative travel of a plurality of vehicles is used, an effect of reducing the whole labor costs of the drivers and rendering inexpensive service is produced.

For example, in a case where milk chocolate is stored for a long time, if the storage temperature is too low, a milk component may precipitate and a surface may become clouded. Conversely, if it is stored at a high temperature for a long time, it starts melting from the surface and its shape is easily distorted. Therefore, for even chocolate of the same item, an optimum storage temperature is different depending on the ingredients and composition ratio. At the transportation of such delicate baggage 216, transportation maintaining the optimum transportation environment 214 for each piece of the baggage 216 is desired. Thus, long-distance transportation which guarantees the highest quality (or the best attribute) of the delicate baggage 216 can be realized.

In the consolidated transportation method described above, a method of "separating" different transportation areas (containers) 212 for respective pieces of the baggage 216 (or the lot 218 containing the same) to be consolidated, for transportation, has been mainly described. However, the present invention is not limited thereto, but the baggage 216 (or the lot 218 containing the same) having the same optimal transportation environment 214 (such as the optimum temperature) may be "collected" and may be consolidated and transported in the same transportation area (container) 212.

The baggage 216 (or the lot 218) in which the tolerance is included in the same value may correspond to the baggage 216 (or the lot 218) of the same optimum transportation environment 214. In addition, the baggage 216 (or the lot 218) in which a variation range of the numerical value of the optimum transportation environment 214 is 20% or less may be considered to have the "same optimum transportation environment 214".

An example of "collecting" and consolidating and transporting the baggage 216 (or the lot 218) having the same optimum transportation environment 214 is shown in FIG. 11. First, the baggage 216 (or the lot 218) in which the transportation environment 214 of "−5° C." is optimum is collected, consolidated in the following vehicle A 12 and transported. Next, the baggage 216 (or the lot 218) in which the transportation environment 214 of "0° C." is optimum is collected and consolidated in the following vehicle B 14, and the baggage 216 (or the lot 218) in which the transportation environment 214 of "+5° C." is optimum is collected and consolidated in the following vehicle C 16. Then, the remaining baggage 216 (or the lot 218) is collected in a following vehicle D 18 in which the transportation environment 214 is "+15° C.", i.e., close to the normal temperature, and consolidated.

In FIG. 11, an example of the transport temperature is shown as an example of the optimum transportation environment 214. However, the present embodiment is not limited thereto, but, as an example of the optimum transportation environment 214, an arbitrary environmental condition such as humidity, an amount of light irradiation, or an air volume may be set, or a combination of a plurality of environmental conditions may be set. Thus, when the baggage 216 (or the lot 218 containing the same) in which the optimum transportation environment 214 matches is collected and transported in (the transportation areas (containers) 212 in) the same vehicles A 12 to D 18, high quality (best attribute) of the baggage 216 (or the lot 218) at the long-distance transportation can be guaranteed.

The following vehicles A 12 to D 18 may be set to unmanned vehicles or set in the guided mode 490 in which the driver does not directly drive. Then, the driver who guides the vehicle platoon 200 (or the vehicle group 300) is made to ride in the only command vehicle A 2 traveling in the lead. In other words, the only command vehicle A 2 is the vehicle manned and driven and guided (by the driver), of the vehicle platoon 200 (or the vehicle group 300), and all the remaining vehicles from the following vehicle A 12 to the following vehicle D 18 are unmanned vehicles. Therefore, the number of drivers that guide the vehicle platoon 200 (or the vehicle group 300) can be reduced and the reduction of transportation costs, which is based on the reduction of labor costs, can be implemented.

When the consolidated transportation method using the vehicle platoon 200 (or the vehicle group 300) is thus improved, an effect of simultaneously implementing securing the quality of the baggage 216 (or the lot 218) at the long-distance transportation and the reduction of transportation costs is achieved.

Incidentally, in the example shown in FIG. 11, the vehicle set in the transportation environment 214 close to the general environment (e.g., normal temperature) is arranged at the position farthest from the command vehicle A 2 in which the driver rides, and is made to travel. In other words, the vehicles set in the transportation environment 214 which is the farthest from the general environment (e.g., normal temperature) are sequentially arranged at positions closer to the command vehicle A 2, and are made to travel.

During the platooning, the transportation environment 214 in all the following vehicles A 12 to D 18 is monitored as appropriate (details will be described later with reference to FIG. 14). Then, when an anomaly occurs in the transportation environment 214 of any of the vehicles, the driver stops the traveling of the vehicle platoon 200 (or the vehicle group 300) and takes measures. At this time, by making the vehicles close to the command vehicle A 2 in the order of vehicles set to the transportation environment 214 farthest from the general environment (e.g., normal temperature), the effect of preventing damage to the baggage 216 (lot 218) to the minimum level when an anomaly occurs is achieved.

In a case of performing the long-distance transportation in the method of FIG. 11, if the driver's continuous operation and guidance time is prolonged, not only the driver's health is adversely affected, but also the frequency of occurrence of accidents caused due to the driver's fatigue increases. In contrast, the transshipment process in the main road (expressway) 50 of the consolidated baggage 216 (lot 218) is performed only in the terminals 42 and 44. Therefore, as the distance between the terminals 42 and 44 increases, the driver's fatigue increases.

In order to solve the problem, in the present embodiment, the command vehicle A 2 is temporarily switched to an automatic drive in the middle of the platooning (group travel), such that the driver can be replaced. The specific method is shown in FIG. 12.

When the platooning transportation is started (S201), the drive of the command vehicle A 2 and the guidance operation of the following vehicles A 12 to D 18 performed by a predetermined driver are started, as shown in step S202. In step S203, it is checked as needed whether or not the same driver continues driving and guiding for more than a predetermined time. The above predetermined time is set to 30 minutes or more and 24 hours or less. In view of the driver's health condition, however, the predetermined time is desirably set to 1 hour or more and 12 hours or less.

When the continuous driving and guidance time of the same driver is less than or equal to a predetermined time (No in S203), the driving and guidance of the same driver is continued. On the other hand, when the continuous driving and guidance time of the same driver reaches a predetermined time or more (Yes in S203), the command vehicle A 2 is once switched to the automatic drive mode as indicated in step S204.

The driver is replaced in the command vehicle A 2 during the period (S205). Then, when the replacement of the driver is completed, the command vehicle A 2 is returned from the automatic operation mode to the guidance mode of the manual operation mode and the dependent vehicles A 12 to D 18 as indicated in step S206.

This process continues until the vehicle platoon 200 (or the vehicle group 300) reaches the destination (i.e., until S207 is Yes). Then, when the platoon reaches the destination, end of the platoon transportation, rearrangement of the platoon or transshipment of the baggage is performed as indicated by step S208.

Since the replacement of the driver can be thus performed during traveling, the effect of continuing the long-distance transportation for a long time while reducing the degree of fatigue of the driver is generated.

Figure 13:
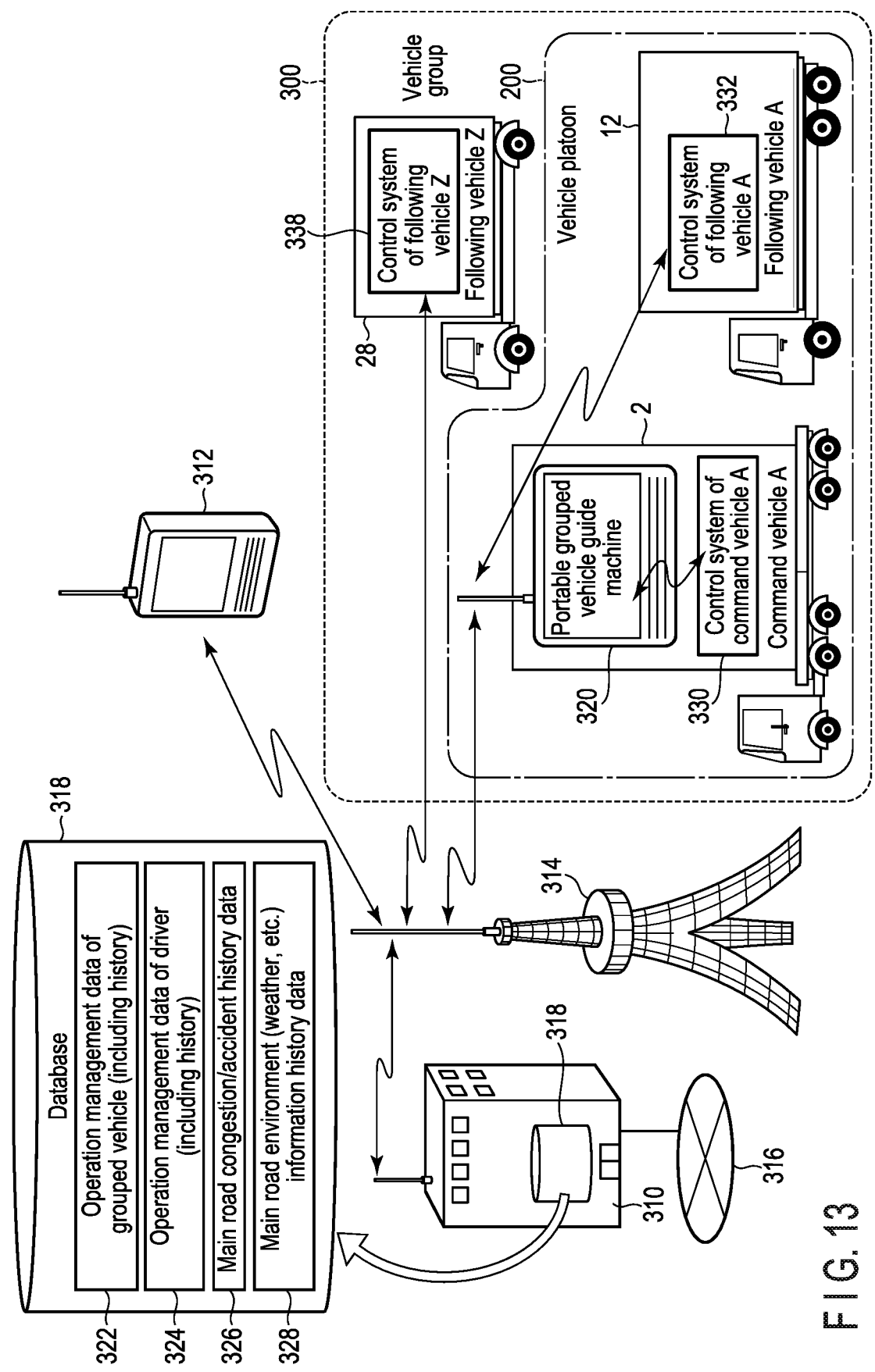
FIG. 13 is an explanatory view showing an example of a vehicle group operation system according to the present embodiment.

An example of the vehicle group operation system according to the present embodiment is shown in FIG. 13. Basically, the system is composed of the server 310 of the vehicle operation management company which the vehicle operation management company manages and the vehicle group 300. Control systems 338 and 332 are preliminarily built in the following vehicle Z 28 which is included in the only vehicle group 300 and the following vehicle A 12 which is included in both the vehicle group 300 and the vehicle platoon 200.

In the embodiment of FIG. 13, the portable group vehicle guidance machine 320 which the driver can carry is present. Then, wireless communication can be executed among the control systems 330, 332, and 338 of the respective vehicles (command vehicle A 2 and following vehicle A 12 and Z 28). Then, the portable grouped vehicle guidance machine 320 guides the cooperative travel of not only the following vehicles A 12 and Z 28 in the vehicle group 300 (vehicle platoon 200), but also the command vehicle A 2. The present embodiment is not limited thereto, but a function of guiding the following vehicles A 12 and Z 28 may be preliminarily built in the control system 330 of the command vehicle A.

Cooperative operation among the units will be described with reference to FIG. 13. The user's reservation application is performed by using a mobile terminal 312 or a computer at home or a workplace (not shown). The server 310 of the vehicle operation management company is notified of the reservation information via a long-distance communication relay machine 314.

In the database 318 managed by the server 310 of the vehicle operation management company, not only grouped vehicle operation management data (including the history) 322, but also driver operation management data (including the history) 324, main road congestion and accident history data 326, main road environment (meteorological information such as rain or snow) information history data 328, and the like are stored. Incidentally, necessary information such as the announced driving property of each vehicle type can be obtained via an Internet line 316.

Incidentally, group type, season, day of the week, time zone, and a service form extra charge table 340 are stored in the above grouped vehicle operation management data (including the history) 322 as described below (with reference to FIG. 29). Therefore, when accepting the reservation application from the user, the server 310 of the vehicle operation management company presents a fee according to the group type, season, day of the week, time zone, and service form which the user uses, by referring to the above charge table 340.

In addition, at acceptance of the reservation application from the user, the server 310 of the vehicle operation management company obtains the information on the corresponding vehicle (following vehicle A 12 and the like) and stores the information in the grouped vehicle operation management data (including the history) 322 in the database 318. Then, the server 310 of the vehicle operation management company performs the vehicle group organization adapted to the vehicle (following vehicle A 12), based on the information. The server 310 of the vehicle operation management company designates the command vehicle A 2 adapted to the vehicle group 300 thus organized.

Incidentally, even if the command vehicle A 2 and the following vehicle A 12 are geographically remote from each other, the command vehicle A 2 can guide travel of the following vehicle A 12 immediately after organizing the vehicle group 300. Then, the command vehicle A 2 departs and leads the following vehicle to the merging while performing guidance (remote operation) of the travel of the following vehicle A 12 and the like.

Details in the control systems 330, 332, and 338 in the respective vehicles shown in FIG. 13 are illustrated in FIG. 14. Unlike the movable bodies which "need a dynamic action from the outside for movement" such as a platform truck and a cart, each vehicle is provided with a drive unit control system 444 capable of self-driving. Then, the self-driving vehicle capable of cooperative travel in the vehicle group 300 (or the vehicle platoon 200) owns the structure or various functions illustrated in FIG. 14. Each of the units illustrated in FIG. 14 may be constituted by dedicated hardware or a dedicated software module for driving a processor.

The vehicle appropriately controls the inter-vehicle distances from adjacent vehicles with a "measurement unit 424 of an inter-vehicle distance and a speed difference from a front vehicle" installed near a front surface of the vehicle and a "reflection unit 428 for measuring an inter-vehicle distance and a speed difference from a subsequent vehicle" installed at a rear part of the vehicle.

In addition, a vehicle outside environment monitoring unit 420 can be used not only at change of the lane, but also be used to monitor extension of the inconvenient length of the vehicle platoon 200, which results from interruption of a general vehicle, and the like. In addition, captured video and images of the vehicle outside environment monitoring unit 420 are appropriately stored in a memory unit 450 and can also be used as evidence references of a drive recorder at the time of the accident-generation.

In addition, "platoon display", "advertisement display", and the like for outside general vehicles may be performed by a function of an outside display screen control unit 410.

The communication control unit 470 comprises both a medium distance wireless function such as Wi-Fi or EnOcean, and a long-distance wireless function such as 2G PDC, a GSM (registered trademark) (Second Generation Personal Digital Cellular, Global System for Mobile Communications), 3G CDMA (Third Generation Code Division Multiple Access), or WiMAX (Worldwide Interoperability for Microwave Access). Then, exchange of the information with other vehicles in the vehicle group 300 can be performed via the communication control unit 470. In addition, the inter-vehicle distance from a front vehicle is controlled via the communication control unit 470.

A GPS control unit 462 and a display screen control unit 464 for a drive seat are installed in a route guide system 460. In particular, when the vehicle is traveling on another route 204 before merging into the vehicle group 300, the current position information of the merging target convoy is sequentially transmitted from the server 310 of the vehicle operation management company via the communication control unit 470. At the same time, the position of the own vehicle can be confirmed by the GPS control unit 462. In the route guide system 460, the route for merging to the target platoon is determined based on the information and the display screen control unit 464 for the drive seat is urged to display the route. A semitransparent organic Electro Luminescence (EL) layer is embedded in the windshield of the driver seat to display the merging route generated by the display screen control unit 464 for the drive seat, though not illustrated.

A drive mode control unit 442 and a drive unit control system 444 exist in the travel control unit 440. The drive unit control system 444 performs not only the drive control of the engine and the motor, but also the brake control and the wheel rotation control (including slip prevention control on a wet road surface and snow-covered road). In addition, the controlled data of each part obtained by the drive unit control system 444 are successively stored in the memory unit 450.

In the present embodiment, a transport slip 530 equipped with a wireless IC tag for attachment on baggage (which will be described later with reference to FIG. 15) attached to the surface of the baggage 432, 434, and 436, or a package body or a container itself in which cargo is collected incorporates a communication function using a short distance radio or near field radio. For example, during transportation of perishable foods, temperature management and humidity management of perishable foods during the transportation become important (i.e., managed by using the measurement data obtained from the temperature and humidity sensor 582 to be described later with reference to FIG. 16). Therefore, a load and passenger status management unit 430 performs the state management of the load and the physical condition management of the passengers using wireless communication. Then, when finding a load condition anomaly (such as storage temperature change of perishable foods, etc.) or poor physical health of the passengers, the load and passenger status management unit 430 gives a warning to the portable grouped vehicle guidance machine 320 via the communication control unit 470.

In the example of the transport service method described with reference to FIG. 10, the vehicle platoon 200 is organized in the expressway (main road) 50 between the terminals A 42 and B 44. Transport in the expressway (main road) 50 which organizes and implements the vehicle platoon 200 is referred to as main road transportation 620 and transport outside of the expressway (main road) 50 is referred to as local transportation 610 (details will be described later with reference to FIG. 17).

As shown in FIG. 15(a), a user brings baggage 216 which the user requests to be transported, together with a handwritten transport slip 502 formed by an end user, to a convenience store of a baggage reception place. Then, the information of the handwritten transport slip 502 formed by the end user is read by an Optical Character Reader (OCR) reading and electronic ticket issuing device 512 of the handwritten transport slip installed in the convenience store and is converted into database in the storage unit 514.

In contrast, when a user makes a transport request using a Web screen of the mobile terminal 504, the data is converted into the database in the storage unit 514. In any transport request route, the transport slip 530 equipped with wireless integrated circuit (IC) tag for attachment on baggage is issued.

Data stored in the storage unit 514 is transferred to an IC tag 532 equipped with the wireless communication function incorporated in the transport slip 530 equipped with wireless IC tag for attachment on baggage. In addition, each of a field 534 of name, destination address, and telephone number, a field 536 of sender's name, address, and telephone number, an arrival date and time designation field 538, a special remarks and notes field 546, an article name field 542, and a two-dimensional bar code printing field 544, which are arranged on the surface, are printed out by an OCR reading and electronic ticket issuing device 512.

Then, a back surface 548 of the transport slip 530 equipped with wireless IC tag for attachment on baggage is an adhesive surface, and can be attached to the surface of each piece of the baggage 216 (or all the baggage in the lot 218).

Figure 16:
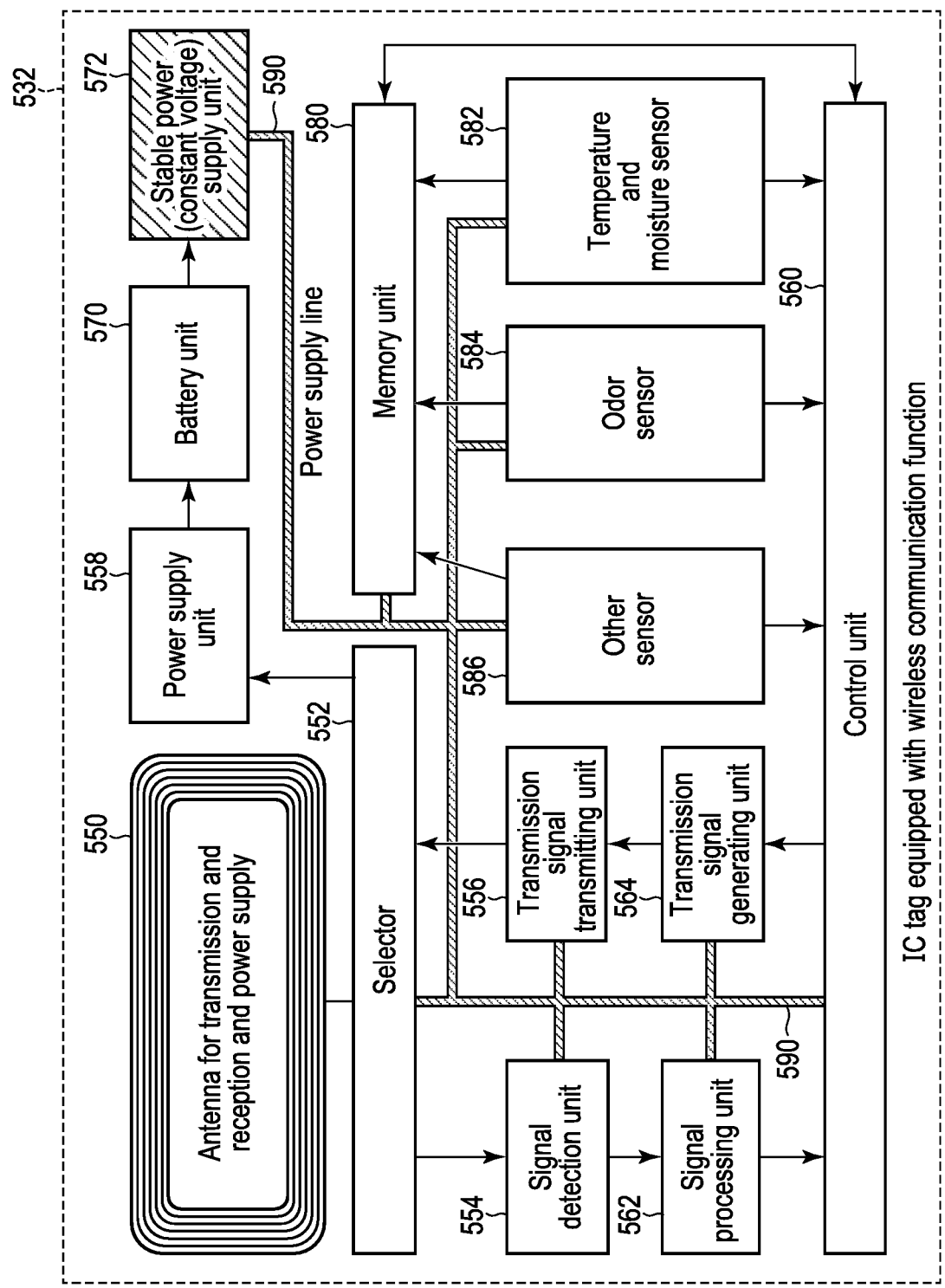
FIG. 16 is an explanatory view showing an example of a structure in an IC tag equipped with a wireless communication function.

An example of a specific structure of the transport slip 530 equipped with wireless IC tag for attachment on baggage is shown in FIG. 16. An antenna 550 for transmission and reception and power supply is arranged inside, and the signal is transmitted and received to and from the outside via the antenna 550.

In addition, the driving power of the internal circuit is supplied by using energy of an electromagnetic wave (e.g., microwave) received from the outside. More specifically, an AC voltage generated inside the antenna 550 is boosted and rectified using a Cockcroft-Walton circuit (both of Cockcroft and Walton are persons' names) in a power supply unit 558.

The DC voltage converted in the power supply unit 558 is stored as power in a battery unit 570. Then, the electric power stored in the battery unit 570 is supplied from a stable power (constant voltage) supply unit 572 to each of the circuits via a power supply line 590.

In the above antenna 550 for transmission and reception and power supply, a circuit connected to a selector 552 is switched according to the role timing. That is, when receiving the supply of the electromagnetic wave energy from the outside by using the antenna 550 for transmission and reception and power supply, the output of the antenna 550 for transmission and reception and power supply is directly connected to the power supply unit 558. In contrast, when a signal is received from the outside, the output of the antenna 550 for transmission and reception and power supply is connected to a signal detection unit 554. In addition, when the information stored in the IC tag 532 equipped with wireless communication function is to be transmitted to the outside, the antenna 550 for transmission and reception and power supply is connected to a transmission signal transmitting unit 556.

A preamplifier circuit and a main amplifier circuit are incorporated inside the signal detection unit 554, which is connected to the antenna 550 for transmission and reception and power supply at the time of receiving an external signal. An amplified signal obtained in the signal detection unit 554 is subjected to binarization in a signal processing unit 562. This binarized signal is subjected to signal processing in the signal processing unit 562, and only necessary information is transmitted to a control unit 560.

In the control unit 560, a series of processing based on information obtained from the outside is performed. In addition, necessary information is transferred to and stored in a memory unit 580 as appropriate.

In the IC tag 532 equipped with the wireless communication function, a temperature and humidity sensor 582, an odor sensor 584, and other sensors 586 are normally provided. The detection signals obtained by the sensors 582 to 586 are sequentially stored in the memory unit 580 as history information.

The stored history information is output to the outside as appropriate in response to a request from the outside. At the same time, the detection signals obtained by the sensors 582 to 586 are also transmitted to the control unit 560 in real time.

For example, when high quality chocolate is transported in a state of being maintained at an optimum temperature, the high quality can be maintained. The transport slip 530 equipped with wireless IC tag for attachment on baggage is stuck on the surface of a packing box of the high quality chocolate, and a surface temperature can be monitored in real time by the temperature and humidity sensor 582 provided inside.

Even if the transportation environment 214 inside the same transportation area (container) 212 is controlled, there is a risk that a slight temperature gradient will occur due to the relationship of the internal wind direction and the like. As described above, the effect of performing a more accurate temperature management can be achieved by accurately performing real-time monitoring of the surface temperature in units of the baggage 216.

If the surface temperature of only the specific baggage 216 deviates from an optimum temperature (or falls outside a tolerance) during transportation, the load and passenger status management unit 430 (FIG. 14) detects an anomaly and notifies the driver who is on the command vehicle A 2 of the anomaly.

In contrast, it is assumed that the packed high quality chocolate, in a state of being stored in a warehouse before consolidated transportation, is placed at a location adjacent to an object emitting a strong odor (e.g., a hydraulically operated machine of FIG. 6). In this case, the odor sensor 584 detects an "oily odor" and stores it as history information in the memory unit 580.

By reading the above odor history at the time of the baggage transshipment in the terminal 42 (for example, by a unit 742 of reading information from the wireless IC tag in FIG. 26), an effect of performing an optimum rearrangement of consolidation can be achieved.

In this case, the history information stored in the memory unit 580 is once taken into the control unit 560. Then, the only information to be transmitted to the outside is transmitted to the transmission signal generating unit 564. In the transmission signal generating unit 564, information to be transmitted is converted into a predetermined format, and the converted data is modulated and converted into a transmission signal. This transmission signal is amplified to high output power by the transmission signal transmitting unit 556 and transmitted to the outside via the antenna 550 for transmission and reception and power supply.

Figure 17:
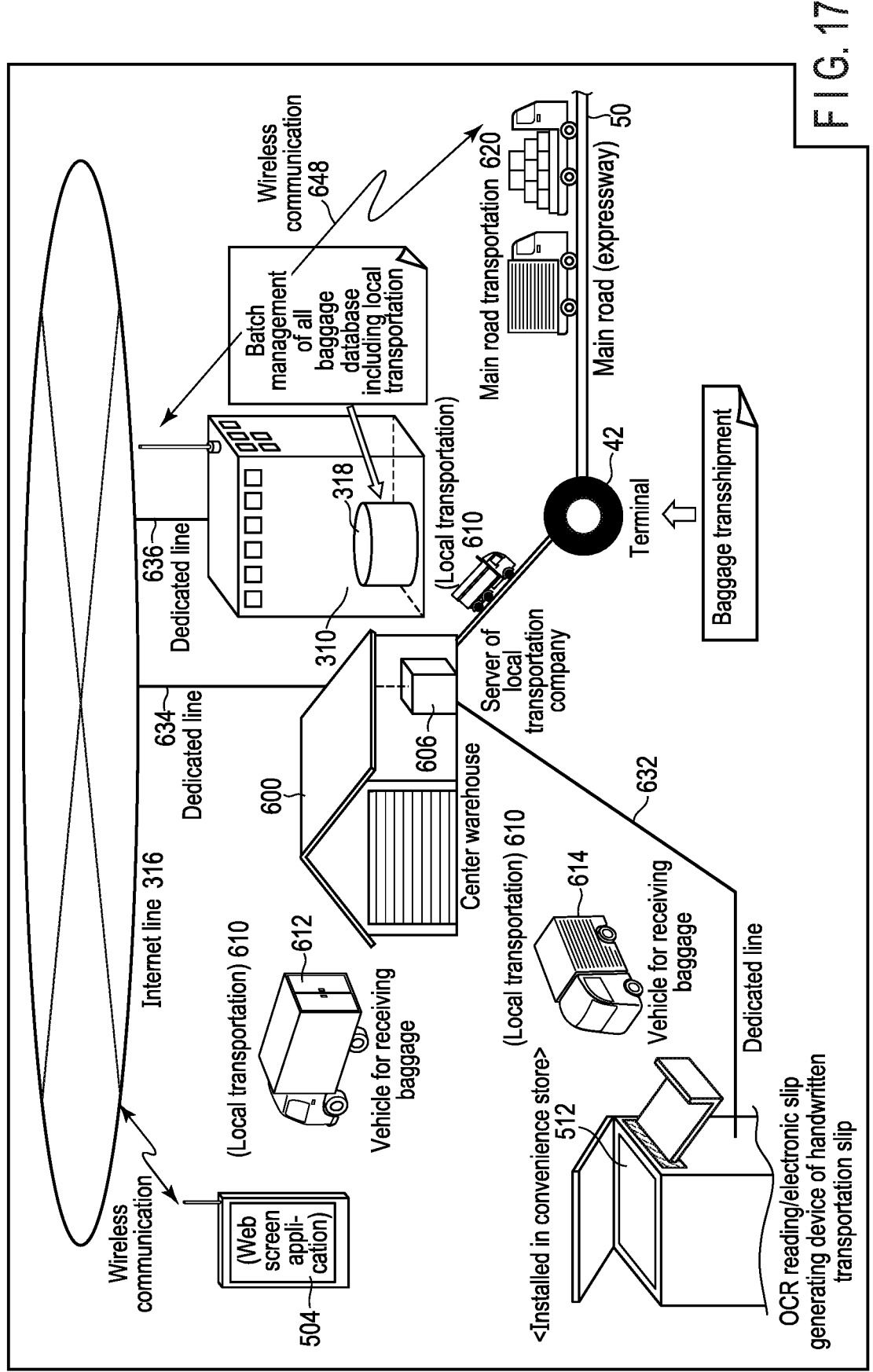
FIG. 17 is an explanatory view showing a route from a receipt of the package to a main road transportation.

The physical connection between the local transportation 610 and the main road transportation 620 is shown in FIG. 17. The above-described OCR reading and electronic ticket issuing device 512 of the handwritten transport slip is directly connected to a server 606 of a local transportation company via a dedicated line 632. As a result, the information of the handwritten transport slip 502 formed by the end user and carried to a convenience store by the user is transferred into the server 606 of the local transportation company as appropriate.

In addition, the server 606 of the local transportation company is connected to the Internet line 316 via a dedicated line 634. Then, the transport request information which the user inputs from a mobile terminal 504 is also transferred into the server 606 of the local transportation company via the Internet line 316.

The server 310 of the vehicle operation management company (corresponding to the main road) managing the main road transportation 620 also has a dedicated line 636 connected to the Internet line 316. Furthermore, by sharing the information with the server 606 of the local transportation company via the Internet line 316, the database batch management of all the baggage including the local transportation by the server 606 of the vehicle operation management company (corresponding to the main road).

When the user brings the handwritten transport slip 502 formed by the end user to the convenience store or makes a transport request using the mobile terminal 504, the baggage receiving vehicles 612 and 614 visit to receive the baggage from a center warehouse 600.

Once the baggage 216 is collected in the center warehouse 600, the baggage is consolidated and transported toward the terminal 42. Then, the baggage transshipment is performed again in the terminal 42. A route from the package delivery location of the convenience store or the end user to the terminal 42 falls within the range of the local transportation 610. In contrast, the transportation between the terminals 42 performed in the expressway (main road) 50 is the range of the main road transportation 620.

Figure 18A:
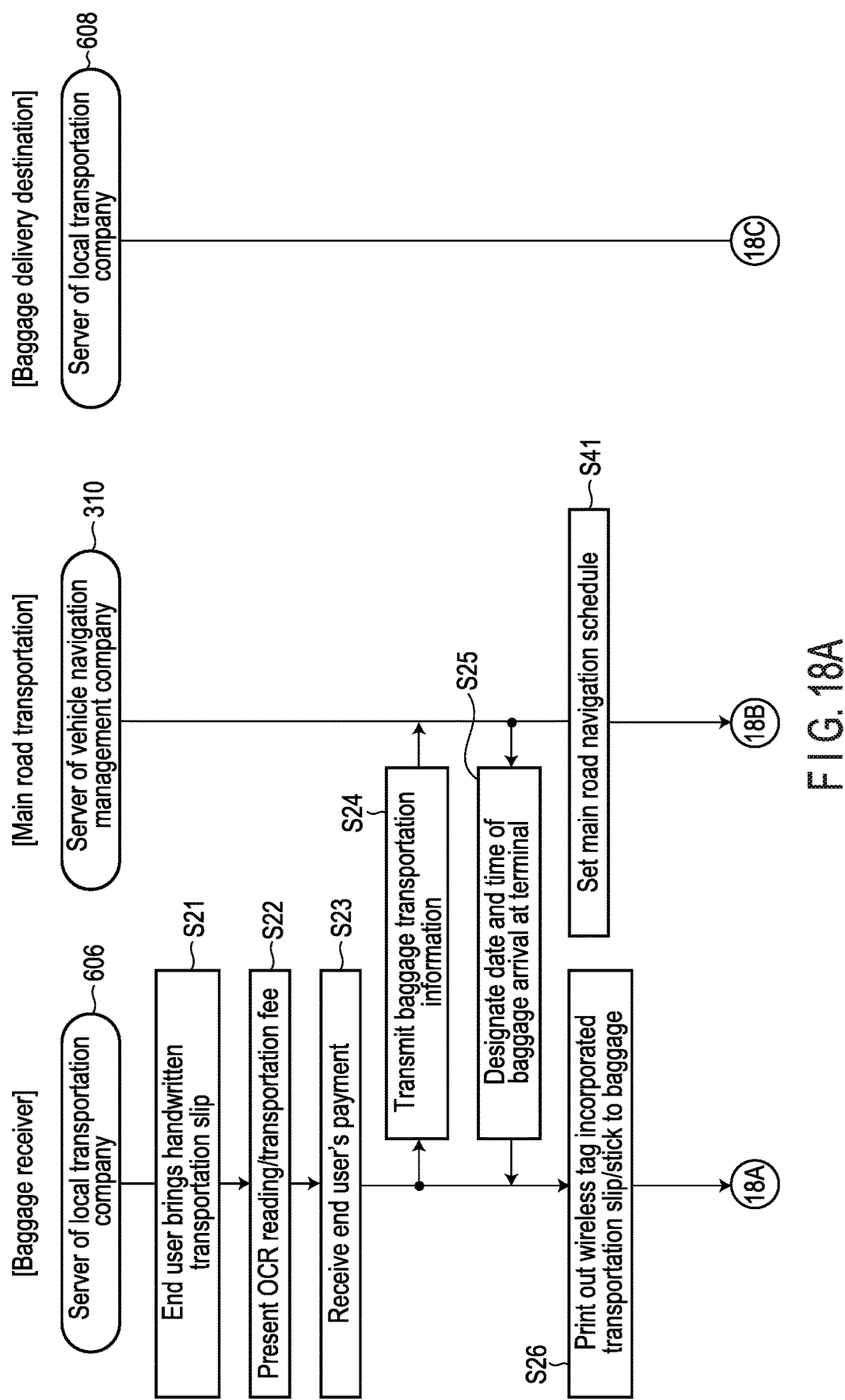
FIG. 18A is an explanatory view showing a processing method in a case where an end user directly carries a package along with a handwritten transport slip (FIG. 1).

A series of processing methods including the main road transportation 620 in a case where the end user has directly carried the baggage 216 together with the handwritten transport slip 502, is shown in FIG. 18A and FIG. 18B. First, in step S21, the end user brings the handwritten transport slip 502 to a convenience store or the like. Next, in step S22, this handwritten transport slip 502 formed by the end user is read by the OCR reading and electronic ticket issuing device 512 and the transport costs are presented to the user. When the end user pays the amount of the transport costs (S23), the baggage is received and a series of transportation processing is started.

The information of the handwritten transport slip 502 formed by the end user, which is read by the OCR reading and electronic ticket issuing device 512, is transferred into the database 318 of the server 310 of the vehicle operation management company via the server 606 of the local transportation company for baggage collection, and the transfer of the baggage transport information (S24) is performed.

In the main road transportation 620, a regular transport of the vehicle platoon 200 is basically operated. However, the operation plan of the vehicle platoon 200 is flexibly handled, and increase in temporary transport and cancellation of the regular transport are appropriately performed according to the increase or decrease in the total amount of the lot 218 (or the baggage 216) to be transported. That is, the server 310 of the vehicle operation management company (corresponding to the main road) determines the increase of temporary transport and the cancellation of regular transport in real time, based on the transport request information collected from the server 606 of the local transportation company.

In the system of the present embodiment, since the server 310 of the vehicle operation management company managing the main road transportation 620 can collect the nationwide transport request information in real time from the servers 606 of the local transportation companies for baggage collection of the nationwide area via the Internet line 316, the operation plan of the main road transportation 620 can be flexibly set. For this reason, efficient main road transportation 620 which suppresses necessary expenses to the lowest limit can be implemented.

In step S25, based on the operation plan of the above-mentioned flexible main road transportation 620, the date and time of the baggage arrival at the terminal 42 are designated for the server 606 of the local transportation company for baggage collection from the server 310 of the vehicle operation management company.

In step S26, the transport slip 542 equipped with the wireless IC tag for attachment to baggage is printed out from the OCR reading and electronic ticket issuing device 512, and is attached to the baggage 216. Then, in accordance with the date and time of the baggage arrival at the terminal 42 designated in step S25, the server 606 of the local transportation company for baggage collection performs arrangement of the local transport vehicle 614 for baggage collection and its driver (S27). In step S28, the server 606 of the local transportation company starts the operation of the local transport for baggage collection and the management of the baggage status.

In parallel, in step S41, the server 310 of the vehicle operation management company sets the main road operation schedule. Then, the server designates and notifies the date and time of baggage reception at the nearest terminal to the server 608 of the local transportation company for baggage delivery, based on the main road operation schedule (S42). In parallel therewith, in step S43, the arrangement of the main road vehicle and the driver is performed. In addition, the server 608 of the local transportation company for baggage delivery performs the arrangement of a local vehicle for baggage delivery and a driver, based on the above designation and notification (S61).

When finishing confirmation of the baggage delivery and the transshipment (consolidation) to the main road vehicle in the terminal 42 in step S29, the server 606 of the local transportation company for baggage collection finishes the operation management of the local transport vehicle for baggage collection (S30).

In the main road transportation 620 of the lot 218 and the baggage 216, the server 310 of the vehicle operation management company performs the main road vehicle operation and the baggage status management as indicated in step S44. Then, after finishing the baggage delivery and transshipment confirmation at the are completed at a terminal point (nearest terminal 44) of the main road transportation 620 for the predetermined lot 218 and baggage 216 (S45), the main road vehicle proceeds to the next terminal (S46).

When receiving a notification of baggage delivery completion from the server 608 of the local transportation company for baggage delivery in step S47, the server 310 of the vehicle operation management company finishes the baggage transportation management and stores the transportation history in the database 318 (S48).

On the other hand, when finishing the baggage delivery and the transshipment confirmation at the terminal point (nearest terminal 44) of the main road transportation 620 for the predetermined lot 218 and baggage 216 in step S45, the local transport vehicle for baggage delivery delivers the baggage the delivery destination (S62), and receives confirmation of the baggage reception from the delivery destination (S63).

After that, after transferring the notification of baggage delivery completion from the server 608 of the local transportation company for baggage delivery to the server 310 of the vehicle operation management company in step S47, the operation management of the local transport operation vehicle for baggage delivery is finished (S64).

In some cases, a user who has requested transportation designates "date and time of arrival at the delivery destination" as the arrival date and time designation field 538 is provided in the transport slip 530 equipped with wireless IC tag for attachment on baggage, which is shown in FIG. 15. A procedure of this case is shown in FIG. 19A and FIG. 19B.

The procedure shown in FIG. 19A and FIG. 19B basically matches the procedure described with reference to FIG. 18A and FIG. 18B. Then, an operation of storing the baggage for a predetermined period om in the warehouse in the nearest terminal 44 in step S50 in FIG. 19B is different from FIG. 18A and FIG. 18B. In the system of the present embodiment, a warehouse 704 for temporarily stored baggage (which will be described later with reference to FIG. 24) is installed in the terminal 44 nearest to the delivery destination. Therefore, the baggage is temporarily stored in the warehouse 704 for temporarily stored baggage so as to deliver the baggage on "the date and time of arrival at the delivery destination which are designated by the user".

Figure 20A:
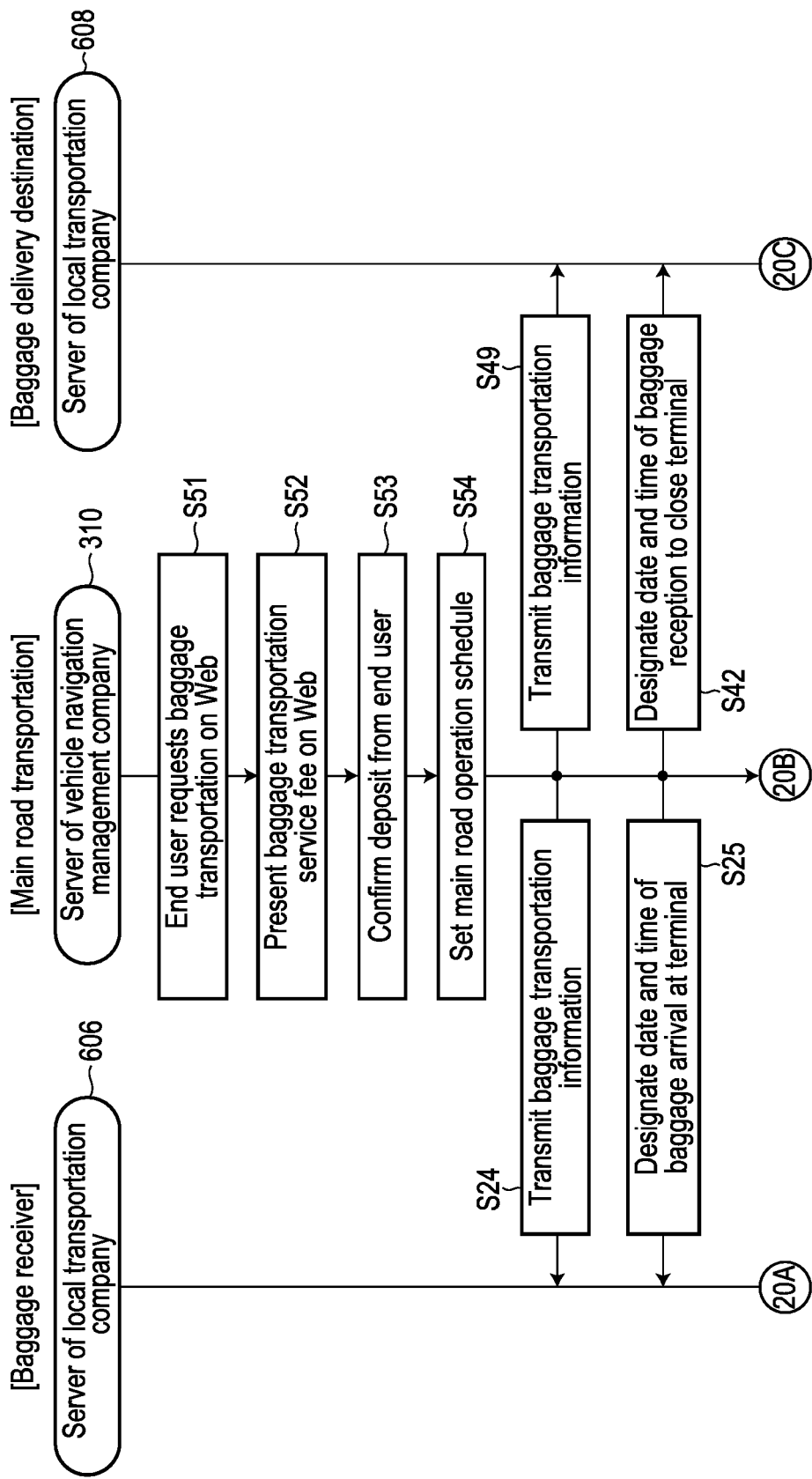
FIG. 20A is a first diagram showing a processing method including a baggage receiving service on a Web.

A procedure in a case where the user requests transport using the mobile terminal 504 is shown in FIG. 20A and FIG. 20B. A procedure of FIG. 20A and FIG. 20B also basically matches the procedure of FIGS. 18A and 18B. Therefore, only parts different from the procedure of FIG. 18A and FIG. 18B and the procedure of FIG. 19A and FIG. 19B will be described. In the procedures of FIG. 18A and FIG. 19B, and FIG. 19A and FIG. 19B, the server 606 of the local transportation company for baggage collection first receives the transport request information from the user. In comparison, the transport request information input to the mobile terminal 504 is directly transferred via the Internet line 316. Therefore, the server 310 of the vehicle operation management company (corresponding to the main road) can directly receive the transport request information transferred via the Internet line 316.

As indicated by step S51, the user directly requests the server 310 of the vehicle operation management company (corresponding to the main road) to transport the baggage by using the mobile terminal 504. Then, in step S52, the server 310 of the vehicle operation management company (corresponding to the main road) presents the charge of the baggage transportation service to the display screen of the user's mobile terminal 504.

Similarly, when the user confirms completion of the deposit process using the Internet line 316 (S53), the server 310 of the vehicle operation management company (corresponding to the main road) starts transportation service in which the local transportation 610 and the main road transportation 620 are combined.

First, a main road operation schedule is set in accordance with step S54. The transmission of the baggage transportation information (S24 and S49) and designation of the date and time of baggage arrival at the (nearest) terminals 42 and 44 and reception (S25 and S42) are performed for the servers 606 and 608 of the local transportation companies for baggage collection and baggage delivery, based on the main road operation schedule.

When receiving the information, the server 606 of the local transportation company for baggage collection performs the arrangement of the local vehicle for baggage collection and the driver in step S31. Then, the transport slip 530 equipped with wireless IC tag for attachment on baggage is printed out from the OCR reading and electronic ticket issuing device 512 arranged near the place where the driver is present, and the driver receives it (S32).

A vehicle for baggage reception 612 goes to a place designated by the user to receive the baggage, and the driver sticks the transport slip 530 equipped with wireless IC tag for attachment on baggage on the surface of the received baggage 216 (S33).

As described above, the server 310 of the vehicle operation management company which manages the main road transportation 620 performs the main road operation schedule setting (step S41 of FIG. 18A or FIG. 19A or step S54 of FIG. 20A). At this time, simulation is performed at a plurality of times to calculate an efficient allocation to the transport vehicle (transporter) 210 for each lot 218 or baggage 216 and to calculate an efficient layout between lots 218 and pieces of baggage 216 in the same transportation area (container) 212. The details will be described with reference to FIG. 21.

All elements of the transportation request information from the nationwide areas immediately before performing these simulations are stored in the database 318 of the server 310 of the vehicle operation management company. When the simulation is started (S100), the server 310 of the vehicle operation management company extracts necessary transportation baggage (lot) information from the database 318 in accordance with step S101.

First, in step S102, the total weight and total capacity of the baggage are calculated in each interval between terminals with respect to the amount of transported baggage. The minimum number of transport vehicles 210 required for baggage transportation (i.e., how many tons of trucks are required and how many trucks are required) can be understood from the values of the total weight and the total volume.

Next, in step S103, according to the method described with reference to FIG. 4 to FIG. 6, consolidation determination is performed for each item of the baggage 216 or each item in the lot 218 and the calculation of combination that can be consolidated based on the consolidation determination is performed. As a result, temporary information of the vehicles that need to be arranged (i.e., the load weight required for each type of transport vehicle 210 and the necessary number of vehicles) can be calculated.

In the same main road (expressway) 50, a plurality of terminals 42 and 44 are arranged at intervals within a predetermined range. Then, the vehicle platoon 200 performs the transshipment of the units of the baggage 216 and the lot 218 in the terminals 42 and 44. Therefore, the arrangement layout in units of the baggage 216 and the lot 218 in the transportation area (container) 212 is fixed in each interval between the terminals 42 and 44. That is, arrangement layout change does not occur during the transportation between the terminals 42 and 44.

For this reason, in step S104, simulation of arrangement layout in units of the baggage 216 and the lot 218 in each interval between the terminals is performed.

In particular, in the baggage arrangement simulation in step S104 described above, the shape (the shape of the baggage) of each piece of the baggage 216 and each lot 218 is taken into consideration. The baggage is not only limited to that packaged in a regular cardboard box, but may be an elongated shape such as a "golf bag".

In the above-described baggage arrangement simulation (S104), the information on the baggage dimensions which the user has input (described) at the time of a transportation request is utilized. In contrast, when the user does not describe the baggage dimensions at the time of the transportation request, the server 310 of the vehicle operation management company may estimate the form of baggage from the article name 542 (FIG. 15).

Calculation of the type and necessary number of the optimum transport vehicles can be performed in each interval between the terminals from the above simulation results of step S103 and step S104 (S105).

In the system of the present embodiment, the baggage is transshipped for each of the terminals 42 and 44. Then, the reduction in time required for the transshipment and the layout change leads to reduction in transportation costs.

For this reason, transshipment procedure simulation (S106) of the baggage in the transportation area (container) 212 for each provisional terminal, and simulation (S107) of the method of reducing transshipment at the terminals 42 and 44 as much as possible are performed to reduce the time for transshipment and the layout change.

Incidentally, the simulation performed in step S106 and step S107 is performed based on the calculation result in step S105. For this reason, large effect for reduction in time of transshipment or layout change may not be acquired depending on the calculation result in step S105. Therefore, it is necessary to determine whether or not rearrangement of the type and necessary number of transport vehicles (transporter) in each interval between terminals is necessary (S108). When a large time reduction effect cannot be acquired by the simulation result performed in step S106 and step S107, the determination result of step S108 is regard as Yes, and the process repeats again from step S103. On the other hand, when rearrangement of the type and necessary number of the transport vehicles (transporter) for each interval between the terminals is unnecessary (i.e., when the determination result in S108 is No), the process proceeds to step S109.

The contents of the transport requests from all parts of the country changes every moment. In addition, "a large number of urgent transport requests" frequently enter. The present embodiment includes step S109 of determining whether or not an urgent change in the transported baggage information occurs, so as to be able to respond to an "urgent transport request" which has entered while the series of processes from step S101 to step S107 is completed.

In step S109, the server 310 of the vehicle operation management company accesses the database 318 to confirm whether a large change on the transported baggage information has occurred while the above-described series of processes from step S101 to step S107 is completed. When the determination result in step S107 is Yes, the series of processes is repeated from step S101.

In contrast, when no urgent transport request is present (i.e., the determination result in S109 is No), the process proceeds to step S110. Then, allocation of transport vehicles (transporter) (i.e., the type and the necessary number of vehicles in each interval between the terminals) is confirmed in step S110.

Based on the result, a vehicle operation plan is established (S111) and the number of drivers required for each terminal is calculated (S112). Then, in step S113, an operation plan for each driver is established and the main road transport service 620 is started.

The operation management for each piece of baggage, each vehicle, and each driver is performed while the main road transport service 620 is continued (S114). Then, when the main road transport service 620 is completed, the series of processes is finished (S115).

By simulating the baggage arrangement (layout in units of lots) in the transportation area (container) 212 (S104), the loading ratio in the same transportation area (container) 212 is improved. As a result, the transport efficiency can be improved and the transport service costs can be reduced.

Furthermore, since the reduction in the baggage transshipment time is attempted in steps S106 and S107, the reduction in transport time and the reduction in transport service costs can be implemented.

Figure 22:
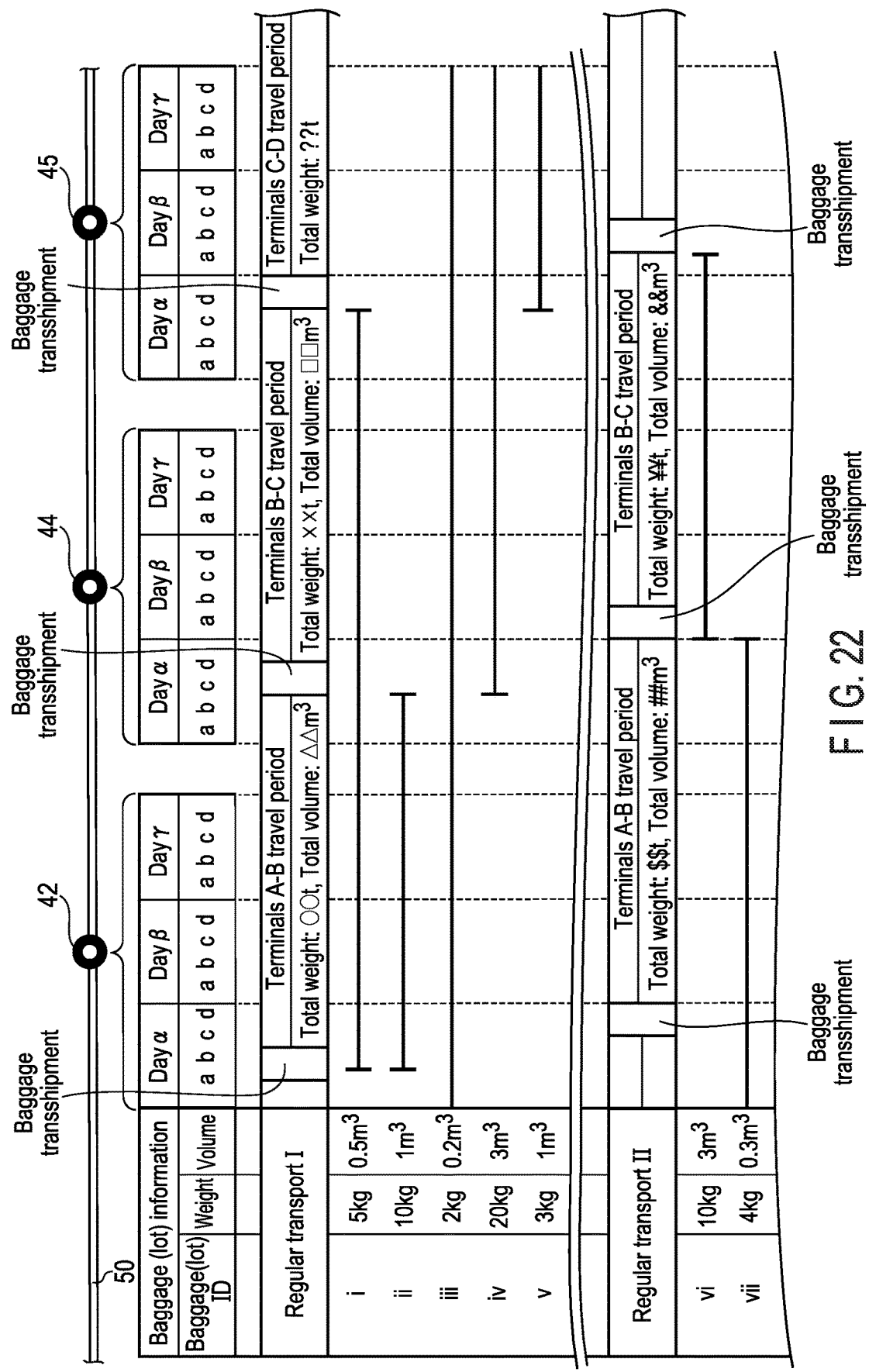
FIG. 22 is an explanatory view showing an example of a simulation method of the amount of transported baggage (total weight and total volume) at each interval between terminals before determining the consolidation and calculating the combination capable of consolidation.

A concrete example of the display screen during execution of step S102 is shown in FIG. 22. The terminal A 42, the terminal B 44, and the terminal C 45 are arranged at physically separated locations in the main road (expressway) 50.

Then, a time axis is individually set for each of the terminal A 42, the terminal B 44, and the terminal C 45 and the operation of the vehicle platoon 200 passing through the main road (expressway) 50 can be visualized. In addition, as regards the time axis set for each of the terminals A 42, B 44, and C 45, a schedule from day $\alpha$ to day $\gamma$ and a time zone divided by a and b, c and d are set.

In the description example of FIG. 22, an operation plan of regular transport (1) and regular transport (2) is described. That is, in the regular transport (1), the baggage transshipment is scheduled in the time zone b on the day $\alpha$ at the terminal A 42. Then, after the baggage is transshipped in the time zone c of the day $\alpha$ at the terminal B 44, the baggage transshipment is scheduled in the time zone d of the day $\alpha$ at the terminal C 45.

In contrast, in the regular transport (2), the baggage transshipment is scheduled in the time zone d on the day $\alpha$ at the terminal A 42. Then, after the baggage is transshipped in the time zone a of the day $\beta$ at the terminal B 44, the baggage transshipment is scheduled in the time zone b of the day $\beta$ at the terminal C 45.

Baggage (lot) IDs described as "i" to "vii" in FIG. 22 are indicative of the identification information (e.g., lot name, baggage item, item name 542) for respective lot 218 units or pieces of baggage 216. Then, the terminal where loading and unloading are performed in the regular transports (1) and (2) (vehicle platoon (200)) for each baggage (lot) ID can be recognized from FIG. 22.

The server 310 of the vehicle operation management company designates the date and time of delivery to the close terminal and the date and time of reception, to the server 606 of the local transportation company, based on the transport request information collected from every part of the country (S25 in FIG. 18A to FIG. 20A and S42 in FIG. 18B to FIG. 20B). As a result, the vehicle platoon 200 (e.g., the regular transports (1) and (2)) corresponding to each piece of the baggage (lot) IDs is automatically set, and the baggage (lot) ID information to be loaded is automatically displayed for each of the corresponding vehicle platoon 200 (e.g., the regular transports (1) and (2)).

Then, the total weight and the total volume of the baggage (lots) stacked on the vehicle platoon 200 (e.g., the regular transports (1) and (2)) are automatically calculated, for each inter-terminal travel period, and displayed as shown in FIG. 22 (e.g., total weight: ◯◯ t, total volume: ΔΔ m³).

Thus, since the total weight and the total volume of the baggage (lot) of each inter-terminal travel period are automatically displayed, the number (per load eight and volume) of the transport vehicles (transporter) required at minimum for each inter-terminal travel period can be recognized.

In the system of the present embodiment, the consolidation determination and the allocation to the transport vehicles (transporter) based thereon are performed by the method already described with reference to FIG. 4 to FIG. 6. A concrete example of the display screen during execution of step S103 of FIG. 21 corresponding thereto is shown in FIG. 23.

Figure 21:
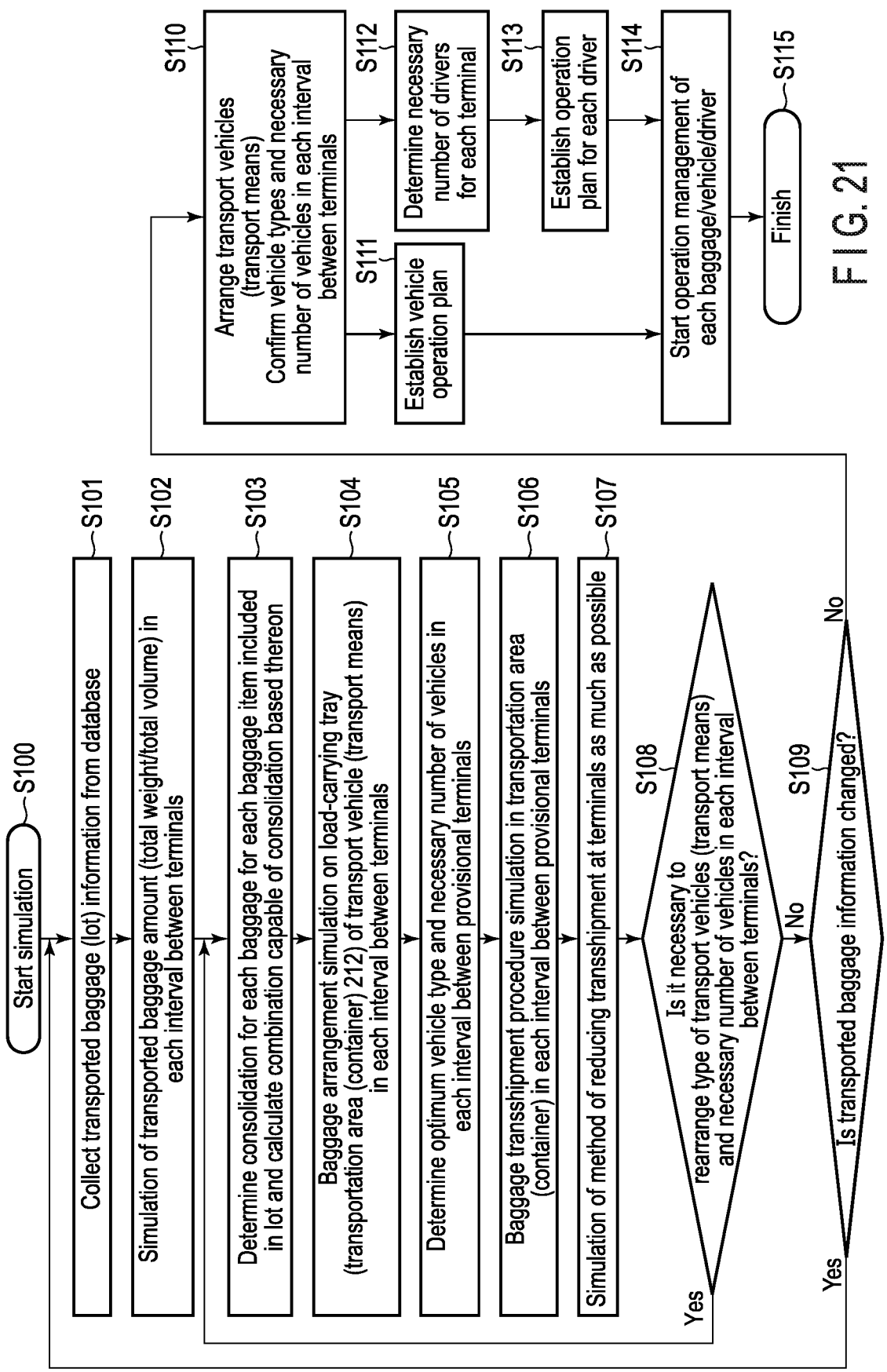
FIG. 21 is a view illustrating a method of calculating the number of main road vehicles and required drivers based on the transportation baggage information performed in a server of a vehicle operation management company.

In FIG. 22 corresponding to step S102 of FIG. 21, only the total weight and the total volume of the terminals in each travel period between the terminals, of the regular transports (1) and (2) are shown. In FIG. 23 where the process proceeds from FIG. 22 to next step S103, the identification of the transport vehicle (transporter) allocated for each baggage (lot) ID is shown.

In the display example of FIG. 23, lots 218 (or baggage 216) of the baggage (lot) IDs "i" and "ii" are consolidated in the transport vehicle B_8. Then, lots 218 (or baggage 216) of the baggage (lot) IDs "iv" and "v" are consolidated in the transport vehicle C_10. However, lot 218 (or baggage 216) of the baggage (lot) ID "iii" is individually consolidated in the transport vehicle A_6 and transported.

In the system of the present embodiment, the automatically performed consolidation determination and the result of allocation to the transport vehicles (transporter) based thereon are displayed as shown in FIG. 23. For this reason, the "necessary number of transport vehicles (transporter) per type" required for allocation of the vehicles (S43 in FIG. 18B to FIG. 20B) can be immediately recognized and the effects of efficiency and saving in time of allocation of the vehicles can be achieved.

In the display example of FIG. 23, pairing (for example, combination (pairing) of "i" and "ii") between the lots 218 (or the baggage 216) consolidated in the same transportation area (container) 212 matches and is fixed at any places in the same main road (expressway) 50 (or in the consolidation period). However, the present invention is not limited thereto, but the pairing between the lots 218 (or the baggage 216) to be consolidated in the same transportation area (container) 212 may be changed within a predetermined period range in the same main road (expressway) 50 (or in the consolidation period), based on the relationship of the other lots 218 (or the baggage 216) to be consolidated.

Figure 24:
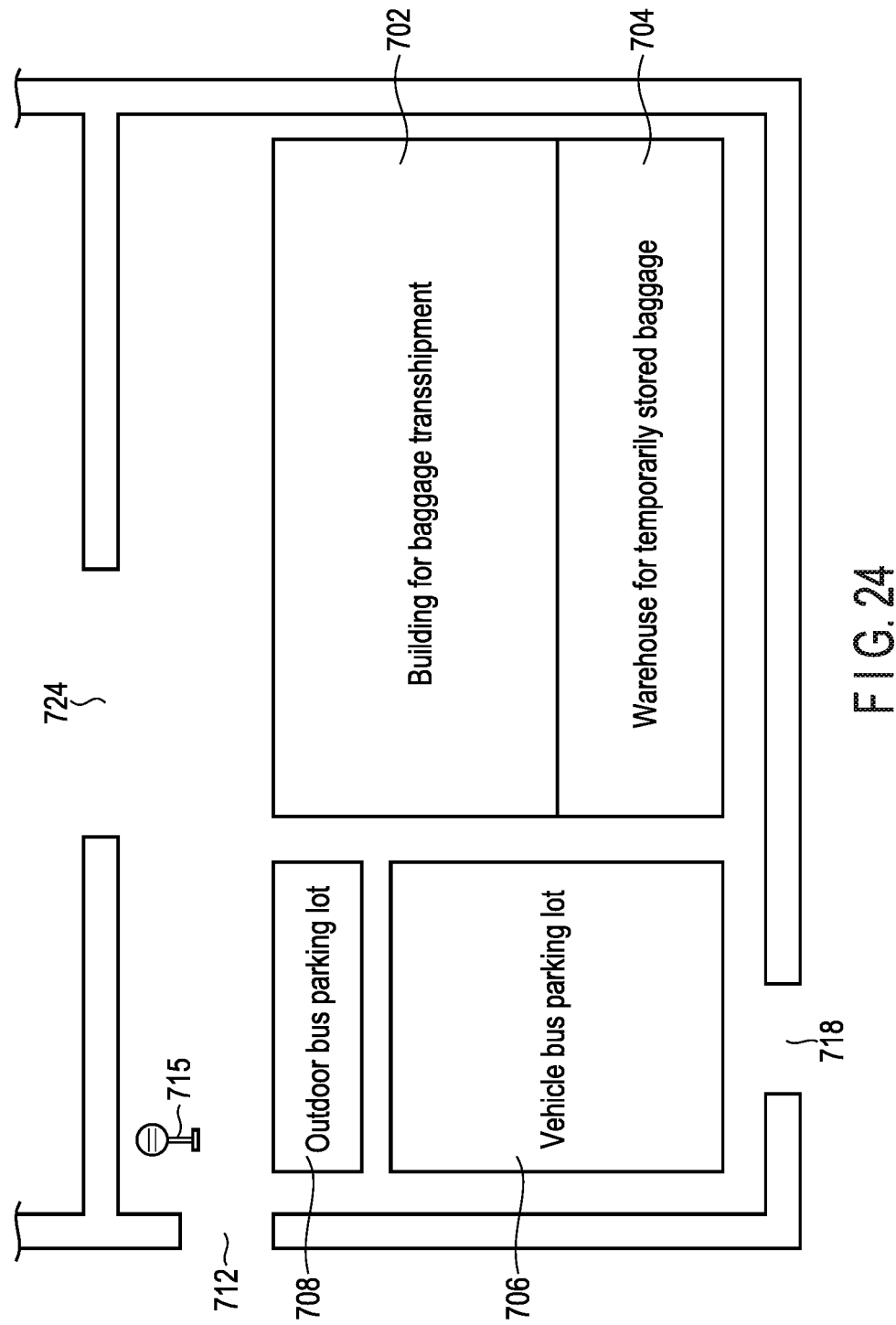
FIG. 24 is an explanatory view showing an example of an internal structure of a terminal in the system of the present embodiment.

An example of the structure in the terminal A 42 or the terminal B 44 or the terminal C 45 distributed on the main road (expressway) 50 of FIG. 23 is shown in FIG. 24. Each of the terminals 42, 44, and 45 is located at an intermediate position between an inbound lane and an outbound lane of the main road (expressway) 50.

In FIG. 24, only an entrance 712 and an exit 718 from either the inbound lane or the outbound lane are shown. Although illustration in FIG. 24 is omitted, the entrance 712 and the exit 718 from the other lane are also provided, in the same terminals 42, 44 and 45. Then, they are connected via a passageway 724 in the opposite direction.

A bus stop 715 of an express bus traveling in the main road (expressway) 50 and an outdoor parking lot 708 where express buses park are provided. In addition to the outdoor bus parking lot 708, an outdoor vehicle parking lot 706 where the vehicle platoon 200 parks is also provided.

Furthermore, a warehouse 704 for temporary storage baggage is also provided. When the arrival date and time 538 of the baggage from the user is designated, temporary storage of the baggage is performed in the terminals 42, 44, and 45 in accordance with the designated date and time. In this example, the baggage is temporarily stored in the warehouse 704 for temporarily stored in the terminals 42, 44, and 45 located at the closest place to the delivery destination (corresponding to S50 in FIG. 19B).

In the system of the present embodiment, the terminals 42, 44, are 45 are utilized as contacts between the main road transportation 620 and the local transportation 610. That is, the consolidation (baggage transshipment) is performed in a building 702 for baggage transshipment. The target of the main road transportation 620 is changed to the target of the local transportation 610 by the baggage transshipment process (consolidation process).

Figure 25:
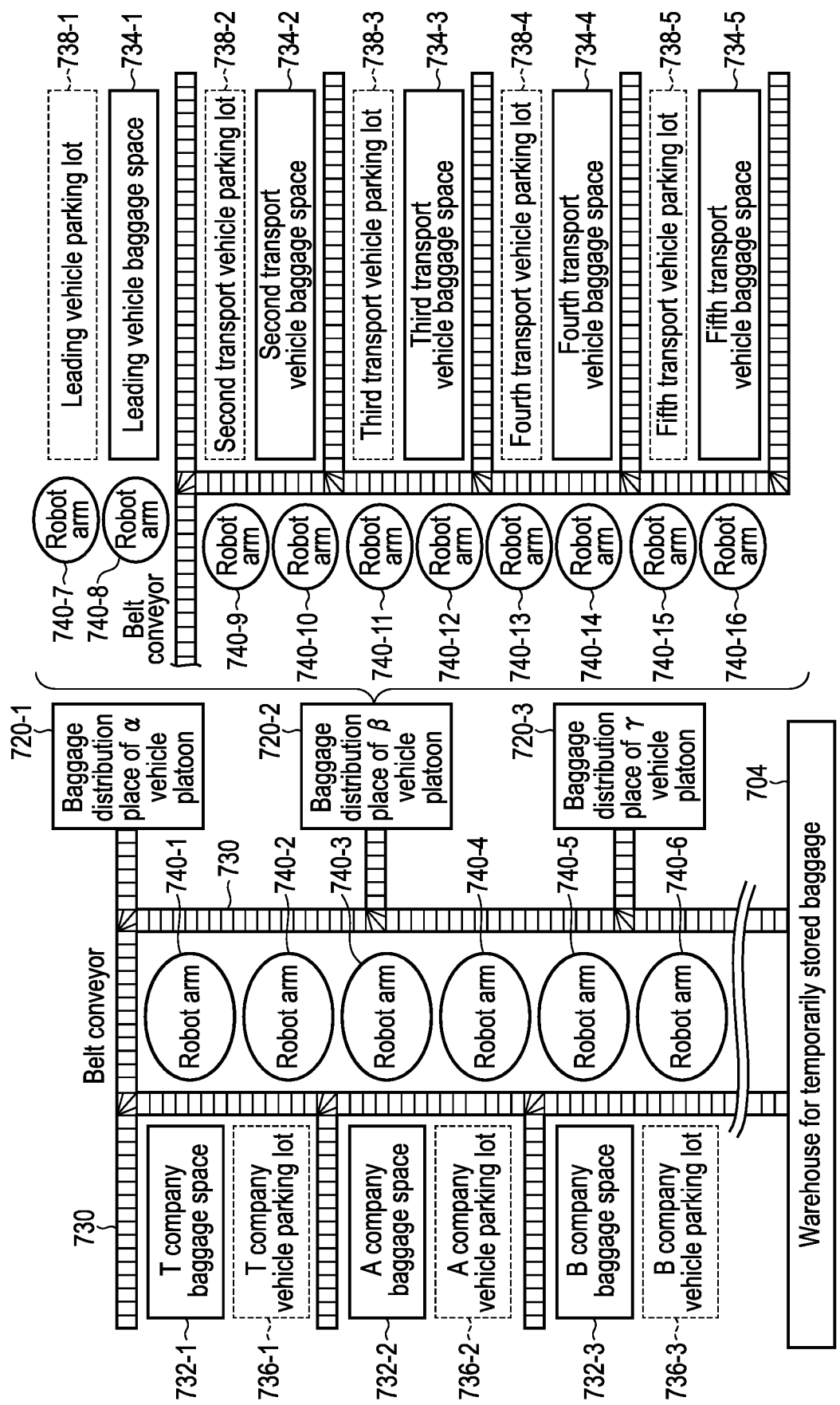
FIG. 25 is an explanatory view showing an example of arrangement in a building for baggage replacement installed in the terminal.

An example of the structure of the building 702 for baggage transshipment is shown in FIG. 25. The transshipment in units of the lots 218 (or each piece of the baggage 216) between the main road transportation 620 and the local transportation 610 is automatically performed in the cooperative operation of a belt conveyor 730 and robot arms 740-1 to 740-16.

In the system of the present embodiment, a difference in traveling speed between the vehicle trains 200 in charge of the main road transportation 620 is permitted. That is, a vehicle platoon traveling at a normal speed and a vehicle platoon traveling at a high speed are present, and an "overtaking process" is performed between them in terminals 42, 44, and 45. To enable this, baggage distribution places 720-1 to 720-3 for a plurality of vehicle platoons are installed as shown in FIG. 25.

In addition, to provide flexibility in the number of transport vehicles constituting the same vehicle platoon 200, parking lots 738-1 to 738-5 for respective transport vehicles are installed. In this example of FIG. 25, up to five transport vehicles can be connected in the same vehicle platoon 200. In contrast, as regards the local transportation 610, vehicle parking lots 736-1 to 736-3 corresponding to individual transport vehicles (transporter) are provided.

In the example shown in FIG. 25, the lots 218 or the pieces of baggage 216 transported by the transportation companies, company T 90, company A 92, and company B 94 in charge of the local transportation 610, are consolidated and transported in each of the transport vehicles (transporter) 210 constituting the vehicle platoon 200 after once placed on the belt conveyor 730.

The consolidation determination item is preliminarily defined in the server 310 of the vehicle operation management company which manages the main road transportation 620. Then, it is discriminated whether or not each of (the baggage 217 in) the lots 218 or each piece of the baggage 216 placed on the belt conveyor 730 corresponds to the easily transferred baggage item and the highly sensitive baggage item of each consolidation determination item. A method of handling a case where, as a result of this discrimination, (baggage 217 in) the lot 218 or individual baggage 216 corresponding to the easily transferred baggage item in the same consolidation determination item, and (baggage 217 in) the lot 218 or individual baggage 216 corresponding to the highly sensitive baggage item, need to be subjected to the main road transportation 620 in the same vehicle platoon 200 (or the same vehicle platoon 300), will be described.

In this case, in the system of the present embodiment, the lot 218 including the baggage 217 or individual baggage 216 corresponding to the easily transferred baggage item, and the lot 218 including the baggage 217 or individual baggage 216 corresponding to the highly sensitive baggage item, are separately arranged in each transportation area (container) 212 of different transport vehicles (transportation means) 210 constituting the same vehicle platoon 200 (or the same vehicle group 300). This separation arrangement is implemented by the cooperation work of the belt conveyor 730 and the robot arms 740-1 to 740-16.

A concrete example of the above processing method will be described below. It is assumed that a transport vehicle 210 of company T 90 performs the local transportation 610 of a hydraulically operated machine and parks in a company T vehicle parking lot 736-1 in the terminal 42. Similarly, a transport vehicle 210 of company A 92 performs the local transportation 610 of packaged chocolate and parks in a company A vehicle parking lot 736-2 in the terminal 42. Furthermore, a transport vehicle 210 of company B 94 performs the local transportation 610 of an oxidation heating element (such as iron powder) and parks in a company B vehicle parking lot 736-3 in the terminal 42.

As shown in FIG. 6(*a*), the hydraulically operated machine corresponds to the easily transferred baggage item TOUT in "movement of odor SML" of the consolidation determination items JITM. Similarly, the packaged chocolate corresponds to the highly sensitive baggage item TIN of baggage TIN as compared with both the consolidation determination items JITM, "movement of odor SML" and "propagation of heat (temperature) HET". Furthermore, an oxidation heating element (such as iron powder) corresponds to the easily transferred baggage item TOUT in relation to the "propagation of heat (temperature) HET" of the consolidation determination items JITM.

A case of adopting combination example 2 shown in FIG. 6(*c*) for these pieces of the baggage 216 (or lots 218) will be described. That is, the transport vehicle A_6 parks in the lead vehicle parking lot 738-1 in the baggage distribution place 720-2 of the β vehicle platoon in FIG. 25. In addition, the transport vehicle B_8 parks in the second transport vehicle parking lot 738-2. Then, the transport vehicle C_10 parks in the third transport vehicle parking lot 738-3.

The hydraulically operated machine loaded in the transport vehicle 210 of company T 90 parking in the company T vehicle parking lot 736-1 is moved onto the belt conveyor 730 by the operation of the robot arm 740-2. The baggage (hydraulically operated machine) on the belt conveyor 730 is moved into the baggage distribution place 720-2 of the β vehicle platoon. After that, the robot arm 740-8 works and the baggage is loaded into the transport vehicle A_6 parking in the leading vehicle parking lot 738-1. In the transportation area (container) 212 of the transport vehicle A_6, the baggage is consolidated with the baggage 216 (or the lot 218 containing the same) which does not correspond to the highly sensitive baggage item TIN in the consolidation determination item JITM of "movement of odor SML".

Similarly, the packaged chocolate loaded in the transport vehicle 210 of company A 92 parking in the company A vehicle parking lot 736-2 is moved onto the belt conveyor 730 by the operation of the robot arm 740-4. The baggage (packaged chocolate) on the belt conveyor 730 is loaded into the transportation area (container) 212 of the transport vehicle B_8 parking in the second transport vehicle parking lot 738-2 by the operation of the robot arm 740-9. Then, the packaged oxidation heating element loaded in the transport vehicle 210 of company B 94 parking in the company B vehicle parking lot 736-3 is loaded in the transportation area (container) 212 of the transport vehicle C_10 parking in the third transport vehicle parking lot 738-3.

As described above, each piece of the baggage 216 is transshipped from the inside of the transportation area (container) 212 of the transport vehicle (transporter) 210 onto the belt conveyor 730 using the robot arms 740-1 to 740-16. A detailed structure of this part will be described with reference to FIG. 26.

The transport vehicle 242 moves backward as viewed from the direction of the driver's seat 242 and parks in the designated vehicle parking lots 732-1 to 732-3 and 738-1 to 738-5. After parking, the load-carrying tray 750 is opened such that the loaded baggage can be moved by using the robot arm 740. After that, a bottom plate in the load-carrying tray 750 (i.e., a bottom plate 754 of the load-carrying tray in the slide-type platoon vehicle) moves in the direction of a baggage space 734 of the transport vehicle.

A roller part 758 is arranged under the bottom plate 754 of the load-carrying tray in the slide-type platoon vehicle. Then, when the movement to the direction of the baggage space 734 of the bottom plate 754 of the load-carrying tray in the slide-type platoon vehicle is completed, the rotatable plate 756 arranged at the bottom part of the roller unit 758 is rotated at 90 degrees and a plate 760 to be used as a temporary baggage space is inserted.

A plurality of pieces of the baggage can be efficiently stacked on the bottom plate 754 of the load-carrying tray in the slide-type platoon vehicle by utilizing the space of the plate 760 to be used as the temporary baggage space and the baggage space 734 of the transport vehicle. In addition, when a plurality of pieces of baggage stacked on the bottom plate 754 of the load-carrying platform in the slide type platoon vehicle in advance, the space of the plate 760 for use as the temporary baggage space and the space of the baggage space 734 of the transport vehicle are used to enable transshipment of the only necessary baggage onto the belt conveyor 730.

In addition, the unit 742 of reading information from the wireless IC tag is provided at the distal end of the robot arm 740. When the unit 742 of reading information from the wireless IC tag approaches the transport slip 530 equipped with wireless IC tag for attachment on baggage (FIG. 15), the unit performs information communication with the transport slip 530 by using the wireless communication or near field communication. The transshipment history in the terminal 42 in units of baggage 216 or units of lots 218 can be automatically managed by using the information communication.

Thus, in the system of the present embodiment, a series of processes from the transshipment process of the baggage 216 and the lot 218 to the history management thereof is automatically processed by using the belt conveyor 730 and the robot arm 740 (and the unit 742 of reading information from the wireless IC tag). Thus, labor costs are saved since persons are not intervened in the series of processes (or a very small number of persons are intervened). As a result, the effect of remarkably reducing the consolidated transportation costs can be achieved.

The method using the belt conveyor 730 has been explained as an example of the conveying means of the baggage 216 (or the lot 218) in the above descriptions. However, the present invention is not limited thereto, but any transporter (e.g., a linear motor, a platform truck, etc.) may be used.

In addition, the method of using the robot arm 740 has been explained as the example of the local moving means of the baggage 216 (or lot 218). However, the present invention is not limited thereto, but any moving means may be used.

FIG. 27 shows an example of data of a transshipment history 780 in units of baggage 216 or units of lots 218 automatically managed by the above method. By using the attribute information in baggage (or lot) information 770 and upper loading possibility information shown in FIG. 27, the baggage arrangement layout in the transportation area (container) 212 (e.g., whether or not other piece of the baggage or other lot is to be stacked on the target baggage 216 or lot 218) is determined.

An example of contents of the grouped vehicle operation management data (including the history) 322 stored in the database 318 that the server 310 of the vehicle operation management company manages is shown in FIG. 28.

Previously stored grouped vehicle operation history data 350 is stored in the grouped vehicle operation management data (including the history) 322. A time zone of one day is divided into a, b, c, d, e, . . . in the grouped vehicle operation history data 350. In addition, points C 46, D 47, and E 48 are defined in accordance with the arrangement place of an interchange which exists between the terminals A 42 and B 44. In addition, a history of the number of vehicle trains that has passed between the respective points (e.g., between C-D 54) for each time zone is displayed as a bar graph.

Since the frequency of reservation is varied depending on a season and a day, the frequency of reservation is graphed in each season and day. The "group types" are classified for each vehicle platoon in which the parameter values inherent to vehicles (such as the overtaking acceleration and the gross weight) fall within predetermined ranges.

An example of a method in which the server 310 of the vehicle operation management company estimates the frequency of reservation using the data will be described. For example, it is assumed that the number of reservations in time periods a and b between E-B 58 is extremely low. However, the grouped vehicle operation history data 350 shows a tendency that frequency of occurrence 238 radically increases in time zone c. Therefore, the server 310 of the vehicle operation management company can prepare for hailing vehicles soon using the demand forecast.

In addition, not only the grouped vehicle operation history data 350, but also various types of data illustrated in FIG. 28 are stored in the grouped vehicle operation management data (including the history) 322.

In the transport service indicated in the present embodiment, fees are different depending on group type, season, day of the week, time zone, and service form. Therefore, at the acceptance of reservation (using, for example, the Internet), the server 310 of the vehicle operation management company performs informing the fees or requesting fees by referring to the group type, season, day of the week, time zone, and a service charge table 340.

Figure 29:
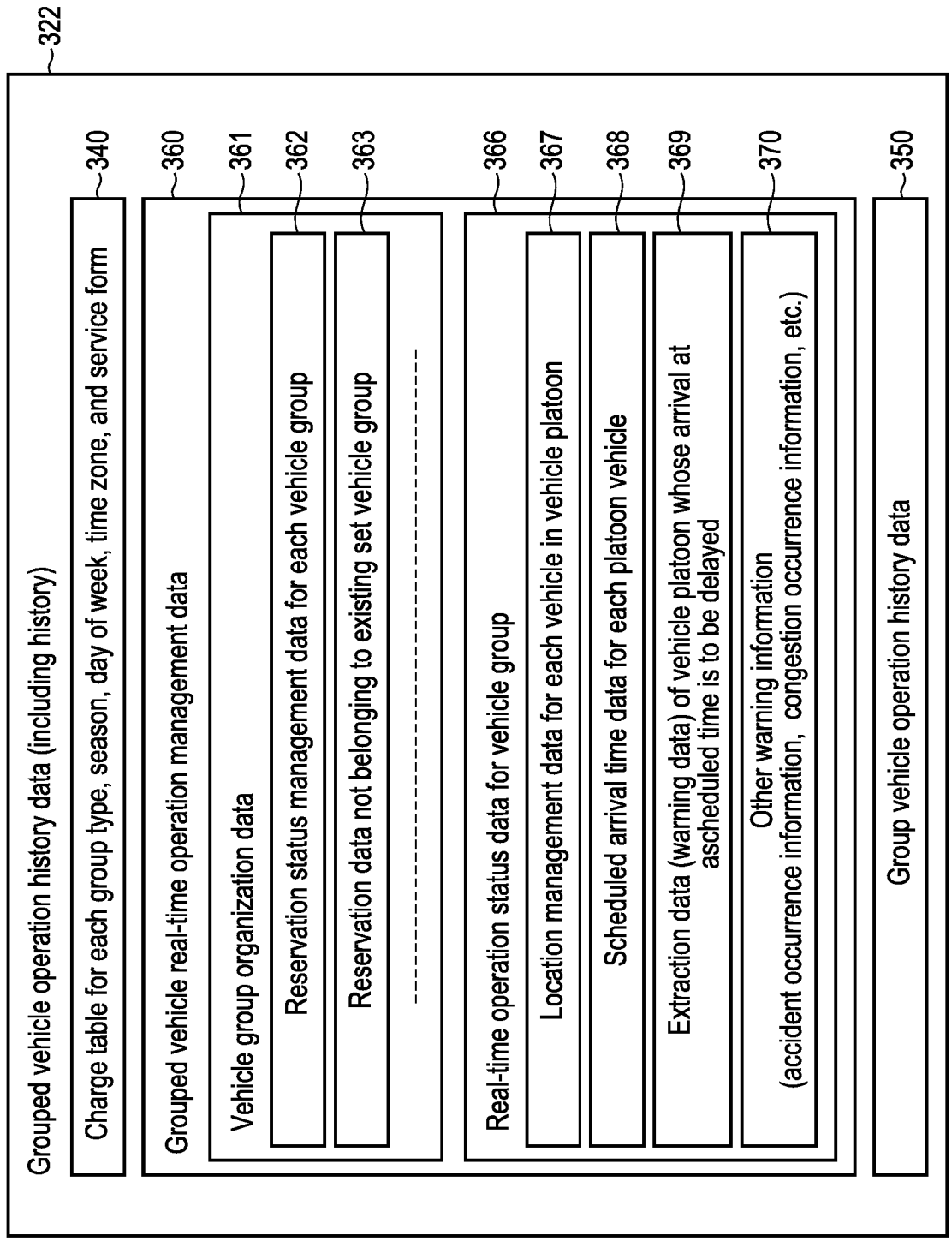
FIG. 29 is an explanatory view showing an example of details in operation management data of the grouped vehicle.

Grouped vehicle real-time operation management data 360 in FIG. 29 include vehicle group organization data 361 related to a service plan of the transport service which is appropriately changed in response to the user reservation, and real-time operation condition data of each vehicle group 366 indicative of a monitoring result of the operation condition.

In addition, the vehicle group organization data 361 include reservation condition management data of each vehicle group 362 and reservation data 363 that do not belong to the existing set vehicle group excluded from the vehicle group organization at present.

The real-time operation status data 366 for each vehicle group includes the location management data 367 for each vehicle in the vehicle group, the expected arrival time data 368 for each vehicle train, the vehicle train extraction data 369 which tends to be delayed in arrival at the scheduled time corresponding to the warning data, and other warning information 370.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A consolidated transportation method of a consolidation terminal which arranges a plurality of pieces of baggage in a same transportation area for transportation, the method comprising:
    arranging a first piece of the baggage corresponding to an easily transferred baggage item in a consolidation determination item in a first transportation area, the consolidation determination item being an item of a characteristic that can move when the baggage is made to be placed together in an enclosed space for greater than a time; and
    arranging a second piece of the baggage corresponding to a highly sensitive baggage item in the consolidation determination item in a second transportation area, wherein
    the first transportation area is included in a first transporter,
    the second transportation area is included in a second transporter, and
    the first transportation area and the second transportation area being physically separated.

2. A consolidated transportation method of a consolidation terminal which arranges a plurality of different lots in a same transportation area for transportation, each lot being composed of one or more pieces of baggage, the method comprising:
    arranging a first lot including a piece of baggage corresponding to an easily transferred baggage item in a consolidation determination item in a first transportation area, the consolidation determination item being an item of a characteristic that can move when the baggage is made to be placed together in an enclosed space for greater than a time; and
    arranging a second lot including a piece of the baggage corresponding to a highly sensitive baggage item in the consolidation determination item in a second transportation area, wherein
    the first transportation area is included in a first transporter,
    the second transportation area is included in a second transporter, and
    the first transportation area and the second transportation area being physically separated.

3. A consolidation terminal enabling baggage transshipment between a plurality of transporters, comprising:
    a first transportation area; and
    a second transportation area, wherein:
        a first piece of the baggage corresponding to an easily transferred baggage item in a consolidation determination item is arranged in the first transportation area, the consolidation determination item being an item of a characteristic that can move when the baggage is made to be placed together in an enclosed space for greater than a time; and
        a second piece of the baggage corresponding to a highly sensitive baggage item in the consolidation determination item is arranged in the second transportation area,
    the first transportation area is included in a first transporter,
    the second transportation area is included in a second transporter, and baggage transshipment being performed so as to allow the first transportation area and the second transportation area to be physically separated.

4. A consolidation terminal enabling transshipment in units of lots between a plurality of transporters, each lot being composed of one or more pieces of baggage, comprising:

a first transportation area; and a second transportation area, wherein:

a first lot including a piece of baggage corresponding to an easily transferred baggage item in a consolidation determination item is arranged in the first transportation area, the consolidation determination item being an item of a characteristic that can move when the baggage is made to be placed together in an enclosed space for greater than a time; and a second lot including a piece of the baggage corresponding to a highly sensitive baggage item in the consolidation determination item is arranged in the second transportation area, the first transportation area is included in a first transporter, the second transportation area is included in a second transporter, and baggage transshipment being performed so as to allow the first transportation area and the second transportation area to be physically separated.

* * * * *